United States Patent
Zhang et al.

(10) Patent No.: US 12,219,576 B2
(45) Date of Patent: *Feb. 4, 2025

(54) ENHANCED UPLINK BEAM MANAGEMENT

(71) Applicant: Apple Inc., Cupertino, CA (US)

(72) Inventors: Yushu Zhang, Beijing (CN); Alexei Davydov, Nizhny Novgorod NIZ (RU); Guotong Wang, Beijing (CN); Gang Xiong, Portland, OR (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/352,324

(22) Filed: Jul. 14, 2023

(65) Prior Publication Data
US 2023/0362947 A1    Nov. 9, 2023

Related U.S. Application Data

(63) Continuation of application No. 16/419,367, filed on May 22, 2019, now Pat. No. 11,729,782.

(60) Provisional application No. 62/683,518, filed on Jun. 11, 2018.

(51) Int. Cl.
*H04W 72/23* (2023.01)
*H04L 5/00* (2006.01)
*H04W 52/08* (2009.01)
*H04W 52/24* (2009.01)
*H04W 72/0446* (2023.01)

(52) U.S. Cl.
CPC ........... *H04W 72/23* (2023.01); *H04L 5/0051* (2013.01); *H04W 52/08* (2013.01); *H04W 52/242* (2013.01); *H04W 72/0446* (2013.01)

(58) Field of Classification Search
CPC ... H04W 72/23; H04W 52/08; H04W 52/242; H04W 72/0446; H04L 5/0051
See application file for complete search history.

(56) References Cited

U.S. PATENT DOCUMENTS

| | | | |
|---|---|---|---|
| 11,729,782 B2 * | 8/2023 | Zhang | H04W 52/242 370/336 |
| 2013/0121297 A1 | 5/2013 | Kim et al. | |
| 2018/0206132 A1 | 7/2018 | Guo et al. | |
| 2019/0281588 A1 | 9/2019 | Zhang et al. | |
| 2019/0312698 A1 | 10/2019 | Akkarakaran et al. | |
| 2019/0349059 A1 | 11/2019 | John Wilson et al. | |

OTHER PUBLICATIONS

3GPP, "Technical Specification Group Radio Access Network; NR; Physical layer procedures for control (Release 15)," 3GPP TS 38.213 V15.1.0 (Mar. 2018), 5G, 77 pages.

(Continued)

*Primary Examiner* — Mohammad S Anwar
(74) *Attorney, Agent, or Firm* — Sterne, Kessler, Goldstein & Fox P.L.L.C.

(57) ABSTRACT

Systems, apparatuses, methods, and computer-readable media are provided for uplink beam management and power control in wireless communications systems. Disclosed embodiments include beam management and power control enhancements for Physical Uplink Shared Channel (PUSCH), Sounding Reference Signal (SRS), and Physical Uplink Control Channel (PUSCH) transmissions. Other embodiments may be described and/or claimed.

20 Claims, 11 Drawing Sheets

(56) References Cited

OTHER PUBLICATIONS

3GPP, "Technical Specification Group Radio Access Network; NR; Physical layer procedures for data (Release 15)," 3GPP TS 38.214 V15.1.0 (Mar. 2018), 77 pages.
3GPP, "Technical Specification Group Radio Access Network; NR; Medium Access Control (MAC) protocol specification (Release 15)," 3GPP TS 38.321 V15.1.0 (Mar. 2018), 67 pages.

* cited by examiner

ENHANCED UPLINK BEAM MANAGEMENT

RELATED APPLICATIONS

The present application is a continuation of U.S. Nonprovisional App. Ser. No. 16/419,367, filed May 22, 2019, which claims priority under 35 U.S.C. § 119 to U.S. Provisional App. No. 62/683,518, filed Jun. 11, 2018, the contents of both of which are hereby incorporated by reference in their entireties.

FIELD

Various embodiments of the present application generally relate to the field of wireless communications, and in particular, to beam management and/or power control for physical channels such as physical uplink control channel and physical uplink shared channel, and physical signals such as sounding reference signals.

BACKGROUND

In 5G systems, two different transmission schemes are supported for UL transmissions. One transmission scheme is codebook based transmission, and the other transmission scheme is non-codebook based transmission. 5G systems may also support beam management for PUSCH, PUCCH, and SRS signaling. The beam management for PUSCH is defined in an SRS-centric manner, and includes a two-stage beam indication including a beam indication for SRS in a first stage (stage 1) and beam indication for PUSCH based on an indicated SRS resource indicator (SRI) (stage 2). Currently, only two SRS resources are supported for codebook based transmissions and only four SRS resources are supported for non-codebook based transmissions. Only one SRS resource set is supported for each transmission scheme. Moreover, SRS beams can only be updated using RRC signaling.

DETAILED DESCRIPTION

The present disclosure provides embodiments that enhance uplink beam management and power control mechanisms. Embodiments include PUSCH beam management and power control enhancements; SRS beam management and power control enhancements; and PUCCH power control enhancements. Other embodiments may be described and/or claimed.

Figure 1:
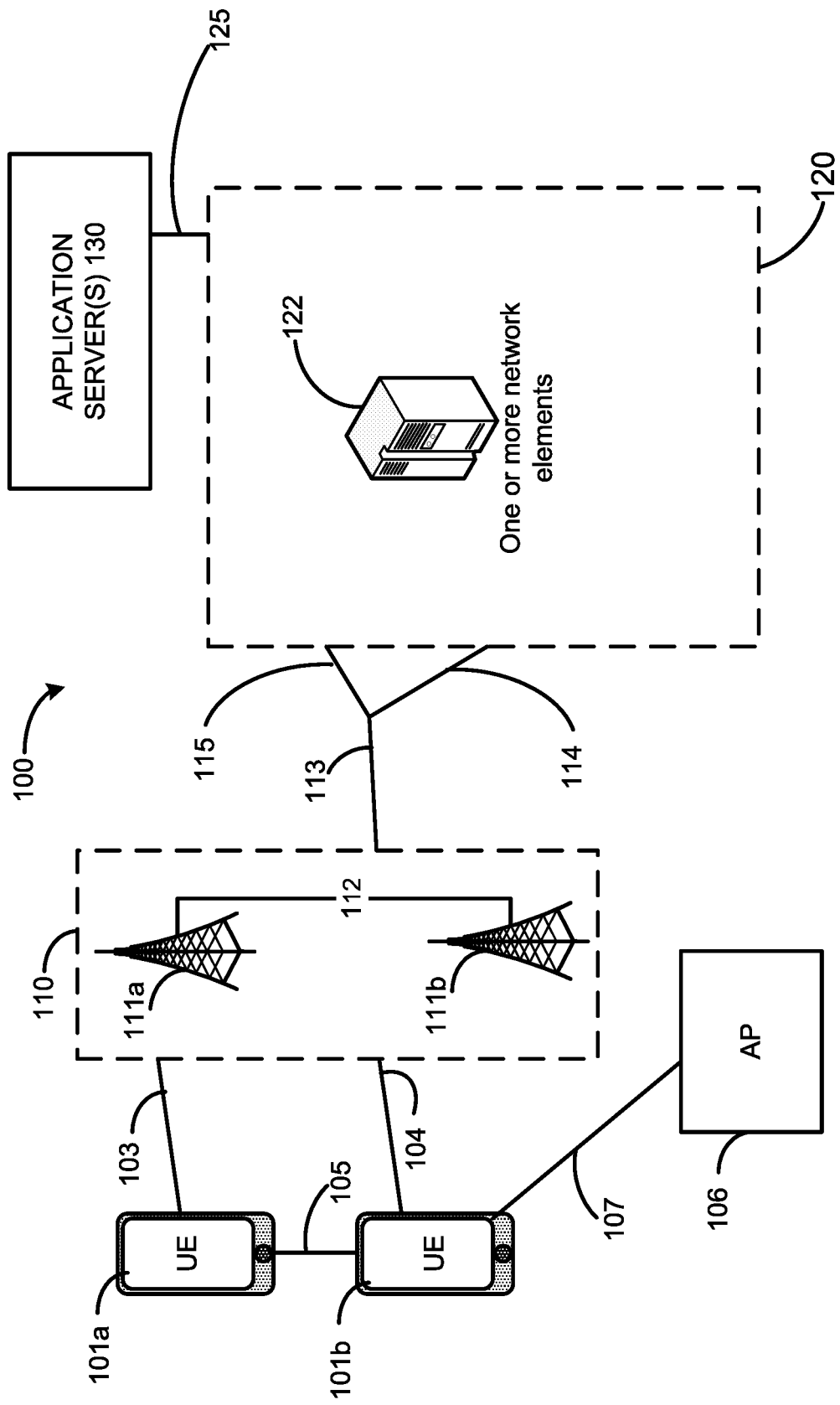
FIG. 1 depicts an architecture of a system of a network in accordance with some embodiments.

Referring now to FIG. 1, in which an example architecture of a system 100 of a network according to various embodiments, is illustrated. The following description is provided for an example system 100 that operates in conjunction with the LTE system standards and 5G or NR system standards as provided by 3GPP technical specifications. However, the example embodiments are not limited in this regard and the described embodiments may apply to other networks that benefit from the principles described herein, such as future 3GPP systems (e.g., Sixth Generation (6G)) systems, IEEE 802.16 protocols (e.g., WMAN, WiMAX, etc.), or the like.

As shown by FIG. 1, the system 100 includes UE 101a and UE 101b (collectively referred to as "UEs 101" or "UE 101"). In this example, UEs 101 are illustrated as smartphones (e.g., handheld touchscreen mobile computing devices connectable to one or more cellular networks), but may also comprise any mobile or non-mobile computing device, such as consumer electronics devices, cellular phones, smartphones, feature phones, tablet computers, wearable computer devices, personal digital assistants (PDAs), pagers, wireless handsets, desktop computers, laptop computers, in-vehicle infotainment (IVI), in-car entertainment (ICE) devices, an Instrument Cluster (IC), head-up display (HUD) devices, onboard diagnostic (OBD) devices, dashtop mobile equipment (DME), mobile data terminals (MDTs), Electronic Engine Management System (EEMS), electronic/engine control units (ECUs), electronic/engine control modules (ECMs), embedded systems, microcontrollers, control modules, engine management systems (EMS), networked or "smart" appliances, MTC devices, M2M, IoT devices, and/or the like. As discussed in more detail infra, the UEs 101 and RAN nodes 111 incorporate the beam management and power control enhancements for PUSCH, SRS, and PUCCH transmissions.

In some embodiments, any of the UEs 101 may be IoT UEs, which may comprise a network access layer designed for low-power IoT applications utilizing short-lived UE connections. An IoT UE can utilize technologies such as M2M or MTC for exchanging data with an MTC server or device via a PLMN, ProSe or D2D communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

The UEs 101 may be configured to connect, for example, communicatively couple, with an or RAN 110. In embodiments, the RAN 110 may be an NG RAN or a 5G RAN, an E-UTRAN, or a legacy RAN, such as a UTRAN or GERAN. As used herein, the term "NG RAN" or the like refers to a RAN 110 that operates in an NR or 5G system 100, and the term "E-UTRAN" or the like refers to a RAN 110 that operates in an LTE or 4G system 100. The UEs 101 utilize connections (or channels) 103 and 104, respectively, each of which comprises a physical communications interface or layer (discussed in further detail below).

In this example, the connections 103 and 104 are illustrated as an air interface to enable communicative coupling, and can be consistent with cellular communications protocols, such as a GSM protocol, a CDMA network protocol, a PTT protocol, a POC protocol, a UMTS protocol, a 3GPP LTE protocol, a 5G protocol, a NR protocol, and/or any of the other communications protocols discussed herein. In embodiments, the UEs 101 may directly exchange communication data via a ProSe interface 105. The ProSe interface 105 may alternatively be referred to as a SL interface 105 and may comprise one or more logical channels, including but not limited to a PSCCH, a PSSCH, a PSDCH, and a PSBCH.

The UE 101$b$ is shown to be configured to access an AP 106 (also referred to as "WLAN node 106," "WLAN 106," "WLAN Termination 106," "WT 106" or the like) via connection 107. The connection 107 can comprise a local wireless connection, such as a connection consistent with any IEEE 802.11 protocol, wherein the AP 106 would comprise a WiFi® router. In this example, the AP 106 is shown to be connected to the Internet without connecting to the core network of the wireless system (described in further detail below). In various embodiments, the UE 101$b$, RAN 110, and AP 106 may be configured to utilize LWA operation and/or LWIP operation. The LWA operation may involve the UE 101$b$ in RRC CONNECTED being configured by a RAN node 111$a$-$b$ to utilize radio resources of LTE and WLAN. LWIP operation may involve the UE 101$b$ using WLAN radio resources (e.g., connection 107) via IPsec protocol tunneling to authenticate and encrypt packets (e.g., IP packets) sent over the connection 107. IPsec tunneling may include encapsulating the entirety of original IP packets and adding a new packet header, thereby protecting the original header of the IP packets.

The RAN 110 can include one or more AN nodes or RAN nodes 111$a$ and 111$b$ (collectively referred to as "RAN nodes 111" or "RAN node 111") that enable the connections 103 and 104. As used herein, the terms "access node," "access point," or the like may describe equipment that provides the radio baseband functions for data and/or voice connectivity between a network and one or more users. These access nodes can be referred to as BS, gNBs, RAN nodes, eNBs, NodeBs, RSUs, TRxPs or TRPs, and so forth, and can comprise ground stations (e.g., terrestrial access points) or satellite stations providing coverage within a geographic area (e.g., a cell). As used herein, the term "NG RAN node" or the like refers to a RAN node 111 that operates in an NR or 5G system 100 (for example, a gNB), and the term "E-UTRAN node" or the like refers to a RAN node 111 that operates in an LTE or 4G system 100 (e.g., an eNB). According to various embodiments, the RAN nodes 111 may be implemented as one or more of a dedicated physical device such as a macrocell base station, and/or a low power (LP) base station for providing femtocells, picocells or other like cells having smaller coverage areas, smaller user capacity, or higher bandwidth compared to macrocells.

In some embodiments, all or parts of the RAN nodes 111 may be implemented as one or more software entities running on server computers as part of a virtual network, which may be referred to as a CRAN and/or a virtual baseband unit pool (vBBUP). In these embodiments, the CRAN or vBBUP may implement a RAN function split, such as a PDCP split wherein RRC and PDCP layers are operated by the CRAN/vBBUP and other L2 protocol entities are operated by individual RAN nodes 111; a MAC/PHY split wherein RRC, PDCP, RLC, and MAC layers are operated by the CRAN/vBBUP and the PHY layer is operated by individual RAN nodes 111; or a "lower PHY" split wherein RRC, PDCP, RLC, MAC layers and upper portions of the PHY layer are operated by the CRAN/vBBUP and lower portions of the PHY layer are operated by individual RAN nodes 111. This virtualized framework allows the freed-up processor cores of the RAN nodes 111 to perform other virtualized applications. In some implementations, an individual RAN node 111 may represent individual gNB-DUs that are connected to a gNB-CU via individual F 1 interfaces (not shown by FIG. 1). In these implementations, the gNB-DUs may include one or more remote radio heads or RFEMs (see, e.g., FIG. 3), and the gNB-CU may be operated by a server that is located in the RAN 110 (not shown) or by a server pool in a similar manner as the CRAN/vBBUP. Additionally or alternatively, one or more of the RAN nodes 111 may be next generation eNBs (ng-eNBs), which are RAN nodes that provide E-UTRA user plane and control plane protocol terminations toward the UEs 101, and are connected to a 5GC (e.g., CN 620 of FIG. 6) via an NG interface (discussed infra).

Any of the RAN nodes 111 can terminate the air interface protocol and can be the first point of contact for the UEs 101. In some embodiments, any of the RAN nodes 111 can fulfill various logical functions for the RAN 110 including, but not limited to, radio network controller (RNC) functions such as radio bearer management, uplink and downlink dynamic radio resource management and data packet scheduling, and mobility management.

In embodiments, the UEs 101 can be configured to communicate using OFDM communication signals with each other or with any of the RAN nodes 111 over a multicarrier communication channel in accordance with various communication techniques, such as, but not limited to, an OFDMA communication technique (e.g., for downlink communications) or a SC-FDMA communication technique (e.g., for uplink and ProSe or sidelink communications), although the scope of the embodiments is not limited in this respect. The OFDM signals can comprise a plurality of orthogonal subcarriers.

Downlink and uplink transmissions may be organized into frames with 10 ms durations, where each frame includes ten 1 ms subframes. A slot duration is 14 symbols with Normal CP and 12 symbols with Extended CP, and scales in time as a function of the used sub-carrier spacing so that there is always an integer number of slots in a subframe. In LTE implementations, a DL resource grid can be used for DL transmissions from any of the RAN nodes 111 to the UEs 101, while UL transmissions from the UEs 101 to RAN nodes 111 can utilize a suitable UL resource grid in a similar manner. These resource grids may refer to time-frequency grids, and indicate physical resource in the DL or UL in each slot. Each column and each row of the DL resource grid corresponds to one OFDM symbol and one OFDM subcarrier, respectively, and each column and each row of the UL resource grid corresponds to one SC-FDMA symbol and one SC-FDMA subcarrier, respectively. The duration of the resource grid in the time domain corresponds to one slot in a radio frame. The resource grids comprises a number of RBs, which describe the mapping of certain physical channels to REs. In the frequency domain, this may represent the smallest quantity of resources that currently can be allocated. Each RB comprises a collection of REs. An RE is the smallest time-frequency unit in a resource grid. Each RE is uniquely identified by the index pair (k,l) in a slot where $k=0, \ldots, N_{RB}^{DL}N_{sc}^{RB}-1$ and $l=0, \ldots, N_{symb}^{DL}-1$ are the indices in the frequency and time domains, respectively. RE (k,l) on antenna port p corresponds to the complex value $\alpha_{k,l}^{(p)}$. An antenna port is defined such that the channel over which a symbol on the antenna port is conveyed can be inferred from the channel over which another symbol on the same antenna port is conveyed. There is one resource grid per antenna port. The set of antenna ports supported depends on the reference signal configuration in the cell, and these aspects are discussed in more detail in 3GPP TS 36.211 v15.1.0 (2018-04) and/or 3GPP TS 38.211 v15.1.0 (2018-04).

In NR/5G implementations, DL and UL transmissions are organized into frames with 10 ms durations each of which includes ten 1 ms subframes. The number of consecutive OFDM symbols per subframe is $N_{symb}^{subframe,\mu}=N_{symb}^{slot}N_{slot}^{subframe,\mu}$. Each frame is divided into two equally-sized half-frames of five subframes each with half-frame 0 comprising subframes 0-4 and half-frame 1 comprising subframes 5-9. There is one set of frames in the UL and one set of frames in the DL on a carrier. Uplink frame number i for transmission from the UE shall start $T_{TA}=(N_{TA}+N_{TA,offset})T_c$ before the start of the corresponding downlink frame at the UE where $N_{TA,offset}$ is given by 3GPP TS 38.213 v15.1.0 (2018-04). For subcarrier spacing configuration μ, slots are numbered $n_s^\mu \in \{0, \ldots, N_{slot}^{subframe,\mu}-1\}$ in increasing order within a subframe and $n_{s,f}^\mu \in \{0, \ldots, N_{slot}^{frame,\mu}-1\}$ in increasing order within a frame. There are $N_{symb}^{slot}$ consecutive OFDM symbols in a slot where $N_{symb}^{slot}$ depends on the cyclic prefix as given by tables 4.3.2-1 and 4.3.2-2 of 38.211 v15.1.0 (2018-04). The start of slot $n_s^\mu$ in a subframe is aligned in time with the start of OFDM symbol $n_s^\mu N_{symb}^{slot}$ in the same subframe. OFDM symbols in a slot can be classified as 'downlink', 'flexible', or 'uplink', where downlink transmissions only occur in 'downlink' or 'flexible' symbols and the UEs 101 only transmit in 'uplink' or 'flexible' symbols. For each numerology and carrier, a resource grid of $N_{grid,x}^{size,\mu}N_{sc}^{RB}$ subcarriers and $N_{symb}^{subframe,\mu}$ OFDM symbols is defined, starting at common RB $N_{grid}^{start,\mu}$ indicated by higher-layer signaling. There is one set of resource grids per transmission direction (i.e., uplink or downlink) with the subscript x set to DL for downlink and x set to UL for uplink. There is one resource grid for a given antenna port p, subcarrier spacing configuration μ, and transmission direction (i.e., downlink or uplink). An RB is defined as $N_{sc}^{RB}=12$ consecutive subcarriers in the frequency domain, and an RB may be a PRB or a VRB. A PRB for subcarrier configuration μ are defined within a BWP and numbered from 0 to $N_{BWP,i}^{size,\mu}-1$ where i is the number of the BWP. The relation between the physical resource block $n_{PRB}^\mu$ in BWPi and the common RB $n_{CRB}^\mu$ is given by $n_{CRB}^\mu=n_{PRB}^\mu+N_{BWP,i}^{start,\mu}$ where $N_{BWP,i}^{start,\mu}$ is the common RB where BWP starts relative to common RB 0. VRBs are defined within a BWP and numbered from 0 to $N_{BWP,i}^{size}-1$ where i is the number of the BWP.

Each element in the resource grid for antenna port p and subcarrier spacing configuration μ is called an RE and is uniquely identified by $(k,l)_{p,\mu}$ where k is the index in the frequency domain and l refers to the symbol position in the time domain relative to some reference point. Resource element $(k,l)_{p,\mu}$ corresponds to a physical resource and the complex value $a_{k,l}^{(p,\mu)}$. An antenna port is defined such that the channel over which a symbol on the antenna port is conveyed can be inferred from the channel over which another symbol on the same antenna port is conveyed. Two antenna ports are said to be quasi co-located if the large-scale properties of the channel over which a symbol on one antenna port is conveyed can be inferred from the channel over which a symbol on the other antenna port is conveyed. The large-scale properties include one or more of delay spread, Doppler spread, Doppler shift, average gain, average delay, and spatial Rx parameters.

A BWP is a subset of contiguous common resource blocks defined in subclause 4.4.4.3 of 3GPP TS 38.211 v15.1.0 (2018-04) for a given numerology $\mu_i$ in bandwidth part i on a given carrier. The starting position $NB_{BWP,i}^{start,\mu}$ and the number of resource blocks $N_{BWP,i}^{size,\mu}$ in a bandwidth part shall fulfil $N_{grid,x}^{start,\mu} \leq N_{BWP,i}^{start,\mu} < N_{grid,x}^{start,\mu} + N_{grid,x}^{size,\mu}$ and $N_{grid,x}^{start,\mu} < N_{BWP,i}^{start,\mu} + N_{BWP,i}^{size,\mu} \leq N_{grid,x}^{start,\mu} + N_{grid,x}^{size,\mu}$, respectively. Configuration of a BWP is described in clause 12 of 3GPP TS 38.213 v15.1.0 (2018-04). The UEs 101 can be configured with up to four BWPs in the DL with a single DL BWP being active at a given time. The UEs 101 are not expected to receive PDSCH, PDCCH, or CSI-RS (except for RRM) outside an active BWP. The UEs 101 can be configured with up to four BWPs in the UL with a single UL BWP being active at a given time. If a UE 101 is configured with a supplementary UL, the UE 101 can be configured with up to four additional BWPs in the supplementary UL with a single supplementary UL BWP being active at a given time. The UEs 101 do not transmit PUSCH or PUCCH outside an active BWP, and for an active cell, the UEs do not transmit SRS outside an active BWP.

There are several different physical channels and physical signals that are conveyed using RBs and/or individual REs. A physical channel corresponds to a set of REs carrying information originating from higher layers. Physical UL channels may include PUSCH, PUCCH, PRACH, and/or any other physical UL channel(s) discussed herein, and physical DL channels may include PDSCH, PBCH, PDCCH, and/or any other physical DL channel(s) discussed herein. A physical signal is used by the physical layer (e.g., PHY 710 of FIG. 7) but does not carry information originating from higher layers. Physical UL signals may include DMRS, PTRS, SRS, and/or any other physical UL signal(s) discussed herein, and physical DL signals may include DMRS, PTRS, CSI-RS, PSS, SSS, and/or any other physical DL signal(s) discussed herein.

The PDSCH carries user data and higher-layer signaling to the UEs 101. Typically, downlink scheduling (assigning control and shared channel resource blocks to the UE 101b within a cell) may be performed at any of the RAN nodes 111 based on channel quality information fed back from any of the UEs 101. The downlink resource assignment information may be sent on the PDCCH used for (e.g., assigned to) each of the UEs 101. The PDCCH uses CCEs to convey control information (e.g., DCI), and a set of CCEs may be referred to a "control region." Control channels are formed by aggregation of one or more CCEs, where different code rates for the control channels are realized by aggregating different numbers of CCEs. The CCEs are numbered from 0 to $N_{CCE,k}-1$, where $N_{CCE,k}-1$ is the number of CCEs in the control region of subframe k. Before being mapped to REs, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical REs known as REGs. Four QPSK symbols may be mapped to each REG. The PDCCH can be transmitted using one or more CCEs, depending on the size of the DCI and the channel condition. There can be four or more different PDCCH formats defined with different numbers of CCEs (e.g., aggregation level, L=1, 2, 4, or 8 in LTE and L=1, 2, 4, 8, or 16 in NR). The UE 101 monitors a set of PDCCH candidates on one or more activated serving cells as configured by higher layer signaling for control information (e.g., DCI), where monitoring implies attempting to decode each of the PDCCHs (or PDCCH candidates) in the set according to all the monitored DCI formats (e.g., DCI formats 0 through 6-2 as discussed in section 5.3.3 of 3GPP TS 38.212 v15.1.1 (2018-04), DCI formats 0_0 through 2_3 as discussed in section 7.3 of 3GPP TS 38.212 v15.1.1 (2018-04), or the like). The UEs 101 monitor (or attempt to decode) respective sets of PDCCH candidates in one or more configured monitoring occasions according to the corresponding search space configurations. A DCI transports DL, UL, or SL scheduling information, requests for aperiodic CQI reports, LAA common information, notifications of MCCH change, UL power control commands for one cell and/or one RNTI, notification of a group of UEs 101 of a slot format, notification of a group of UEs of the PRB(s) and OFDM symbol(s) where UE may assume no transmission is intended for the UE, TPC commands for PUCCH and PUSCH, and/or TPC commands for PUCCH and PUSCH. The DCI coding steps are discussed in 3GPP TS 38.212 v15.1.1 (2018-04).

As alluded to previously, the PDCCH can be used to schedule DL transmissions on PDSCH and UL transmissions on PUSCH. wherein the DCI on PDCCH includes, inter alia, downlink assignments containing at least modulation and coding format, resource allocation, and HARQ information related to DL-SCH; and/or uplink scheduling grants containing at least modulation and coding format, resource allocation, and HARQ information related to UL-SCH. In addition to scheduling, the PDCCH can be used to for activation and deactivation of configured PUSCH transmission(s) with configured grant; activation and deactivation of PDSCH semi-persistent transmission; notifying one or more UEs 101 of a slot format; notifying one or more UEs 101 of the PRB(s) and OFDM symbol(s) where a UE 101 may assume no transmission is intended for the UE; transmission of TPC commands for PUCCH and PUSCH; transmission of one or more TPC commands for SRS transmissions by one or more UEs; switching an active BWP for a UE 101; and initiating a random access procedure.

In NR implementations, the UEs 101 monitor (or attempt to decode) respective sets of PDCCH candidates in one or more configured monitoring occasions in one or more configured CORESETs according to the corresponding search space configurations. A CORESET may include a set of PRBs with a time duration of 1 to 3 OFDM symbols. A CORESET may additionally or alternatively include $N_{RB}^{CORESET}$ RBs in the frequency domain and $N_{symb}^{CORESET} \in \{1,2,3\}$ symbols in the time domain. A CORESET includes six REGs numbered in increasing order in a time-first manner, wherein an REG equals one RB during one OFDM symbol. The UEs 101 can be configured with multiple CORESETS where each CORESET is associated with one CCE-to-REG mapping only. Interleaved and non-interleaved CCE-to-REG mapping are supported in a CORESET. Each REG carrying a PDCCH carries its own DMRS.

The UE 101, upon detection of a PDCCH with a configured DCI (e.g., DCI format 0_0 or 0_1), transmits the corresponding PUSCH as indicated by that DCI. PUSCH transmission(s) can be dynamically scheduled by an UL grant in a DCI, or the transmission can correspond to a configured grant type including Type 1 or Type 2. The configured grant Type 1 PUSCH transmission is semi-statically configured to operate upon the reception of higher layer parameter of configuredGrantConfig including rrc-ConfiguredUplinkGrant without the detection of an UL grant in a DCI. The configured grant Type 2 PUSCH transmission is semi-persistently scheduled by an UL grant in a valid activation DCI after the reception of higher layer parameter configurdGrantConfig not including rrc-ConfiguredUplinkGrant. Various aspects of the procedures for transmitting PUSCH transmissions is discussed in more detail in section 6.1 of 3GPP TS 38.214 v15.1.0 (2018-04).

In NR implementations, DCI formats 0_0 and 0_1 are used for the scheduling of PUSCH in one cell. DCI format 0_1 includes, inter alia, a 0 to 3 bit carrier indicator as defined in subclause 10.1 of 3GPP TS 38.213 v15.1.0 (2018-04); a 0 to 2 bit BWP indicator as determined by the number of UL BWPs $n_{BWP,RRC}$ configured by higher layers, excluding the initial UL bandwidth part, wherein the bitwidth for this field is determined as $\lceil \log_2(n_{BWP}) \rceil$ bits, where $n_{BWP}=n_{BWP,RRC}+1$ if $n_{BWP,RRC} \leq 3$, in which case the bandwidth part indicator is equivalent to the ascending order of the higher layer parameter BWP-Id, otherwise $n_{BWP}=n_{BWP,RRC}$, in which case the bandwidth part indicator is defined in table 7.3.1.1.2-1 of 3GPP TS 38.212 v15.1.1 (2018-04); and an SRS resource indicator with $$\left\lceil \log_2\left( \sum_{k=1}^{min\{L_{max},N_{SRS}\}} \binom{N_{SRS}}{k} \right) \right\rceil$$

or $\lceil \log_2(N_{SRS}) \rceil$ bits, where $N_{SRS}$ is the number of configured SRS resources in the SRS resource set associated with the higher layer parameter usage of value 'codeBook' or 'nonCodeBook', $$\left\lceil \log_2\left( \sum_{k=1}^{min\{L_{max},N_{SRS}\}} \binom{N_{SRS}}{k} \right) \right\rceil$$

bits according to tables 7.3.1.1.2-28/29/30/31 of 3GPP TS 38.212 v15.1.1 (2018-04) if the higher layer parameter txConfig=nonCodebook, where $N_{SRS}$ is the number of configured SRS resources in the SRS resource set associated with the higher layer parameter usage of value 'nonCodeBook' and if the UE 101 supports operation with maxMIMO-Layers and the higher layer parameter maxMIMO-Layers of PUSCH-ServingCellConfig of the serving cell is configured, $L_{max}$ is given by that parameter, otherwise, $L_{max}$ is given by the maximum number of layers for PUSCH supported by the UE for the serving cell for non-codebook based operation, $\lceil \log_2(N_{SRS}) \rceil$ bits according to table 7.3.1.1.2-32 of 3GPP TS 38.212 v15.1.1 (2018-04) if the higher layer parameter txConfig=codebook, where $N_{SRS}$ is the number of configured SRS resources in the SRS resource set associated with the higher layer parameter usage of value 'codeBook'.

Additionally, DCI formats 1_0 and 1_1 are used for the scheduling of PDSCH in one cell. DCI format 1_1 includes, inter alia, a carrier indicator of 0 to 3 bits as defined in subclause 10.1 of 3GPP TS 38.213 v15.1.0 (2018-04); a 0 to 2 bit BWP indicator as determined by the number of DL BWPs $n_{BWP,RRC}$ configured by higher layers, excluding the initial DL bandwidth part, wherein the bitwidth for this field is determined as $\log_2\lceil(n_{BWP})\rceil$ bits, where $n_{BWP}=n_{BWP,RRC}+1$ if $n_{BWP,RRC}\leq 3$, in which case the bandwidth part indicator is equivalent to the ascending order of the higher layer parameter BWP-Id, otherwise $n_{BWP}=n_{BWP,RRC}$, in which case the bandwidth part indicator is defined in table 7.3.1.1.2-1 of 3GPP TS 38.212 v15.1.1 (2018-04); a PUCCH resource indicator, which includes 3 bits as defined by subclause 9.2.3 of 3GPP TS 38.213 v15.1.0 (2018-04); and an SRS request having 2 bits and is defined by table 7.3.1.1.2-24 of 3GPP TS 38.212 v15.1.1 (2018-04) for UEs 101 not configured with supplementaryUplink in ServingCellConfig in the cell, 3 bits for UEs 101 configured with supplementaryUplink in ServingCellConfig in the cell where the first bit is the non-SUL/SUL indicator as defined in table 7.3.1.1.1-1 of 3GPP TS 38.212 v15.1.1 (2018-04) and the second and third bits are defined by table 7.3.1.1.2-24 of 3GPP TS 38.212 v15.1.1 (2018-04). This bit field may also indicate the associated CSI-RS according to subclause 6.1.1.2 of 3GPP TS 38.214 v15.1.0 (2018-04).

The UE 101 may be configured with one or more SRS resource sets as configured by the higher layer parameter SRS-ResourceSet. For each SRS resource set, the UE 101 may be configured with K≥1 SRS resources via higher layer parameter SRS-Resource, where the maximum value of K is indicated by UE capability (see e.g., 3GPP TS 38.306 v15.1.0 (2018-04)). An SRS resource is configured by the SRS-Resource IE and comprises $N_{ap}^{SRS}\in\{1,2,4\}$ antenna ports $\{p_i\}_{i=0}^{N_{ap}^{SRS}-1}$, where the number of antenna ports is given by the higher layer parameter nrofSRS-Ports, $p_i=1000+i$ when the SRS resource is in a SRS resource set with higher-layer parameter usage in SRS-ResourceSet not set to 'nonCodebook', or determined according to 3GPP TS 38.214 v15.1.0 (2018-04) when the SRS resource is in a SRS resource set with higher-layer parameter usage in SRS-ResourceSet set to 'nonCodebook'; $N_{symb}^{SRS}\in\{1,2,4\}$ consecutive OFDM symbols given by the field nrofSymbols contained in the higher layer parameter resourceMapping; $l_0$, the starting position in the time domain given by $l_0=N_{symb}^{slot}-1-l_{offset}$ where the offset $l_{offset}\in\{0, 1, \ldots, 5\}$ counts symbols backwards from the end of the slot and is given by the field startPosition contained in the higher layer parameter resourceMapping and $l_{offset}\geq N_{symb}^{SRS}-1$; and $k_0$ is the frequency-domain starting position of the sounding reference signal.

An individual SRS resource can be used for different purposes: codebook based transmission, non-codebook based transmission, beam management, and/or antenna switching. Different SRS resources can have a different configurations of resource mapping pattern including frequency offset, comb and number of symbols, antenna port(s), and time domain behavior (e.g., periodic, aperiodic, or SPS based transmission) by RRC signaling. Currently, only two SRS resources are supported for codebook based transmissions and only four SRS resources are supported for non-codebook based transmissions, wherein only one SRS resource set is supported for each transmission scheme. Further, the SRS beam can only be updated using RRC signaling, which has a relatively large latency. Therefore, the latency for PUSCH/SRS beam management is relatively high while the number of candidate beams is relatively small. Therefore, one issue is to reduce the beam management latency and increase the flexibility for uplink beam indication for PUSCH and SRS. PUCCH beams can be updated based on MAC CEs, which have a lower latency than RRC signaling. Currently, a gNB 111 can indicate one of 8 beams per PUCCH resource using a MAC CE. Further, UL power control is performed on a per-beam basis, where the power control parameters for PUSCH can be configured based on the indicated SRI and power control parameters for SRS are configured per SRS resource set. Therefore, some enhancements for UL power control could be necessary if UL beam management is enhanced.

Figure 2:
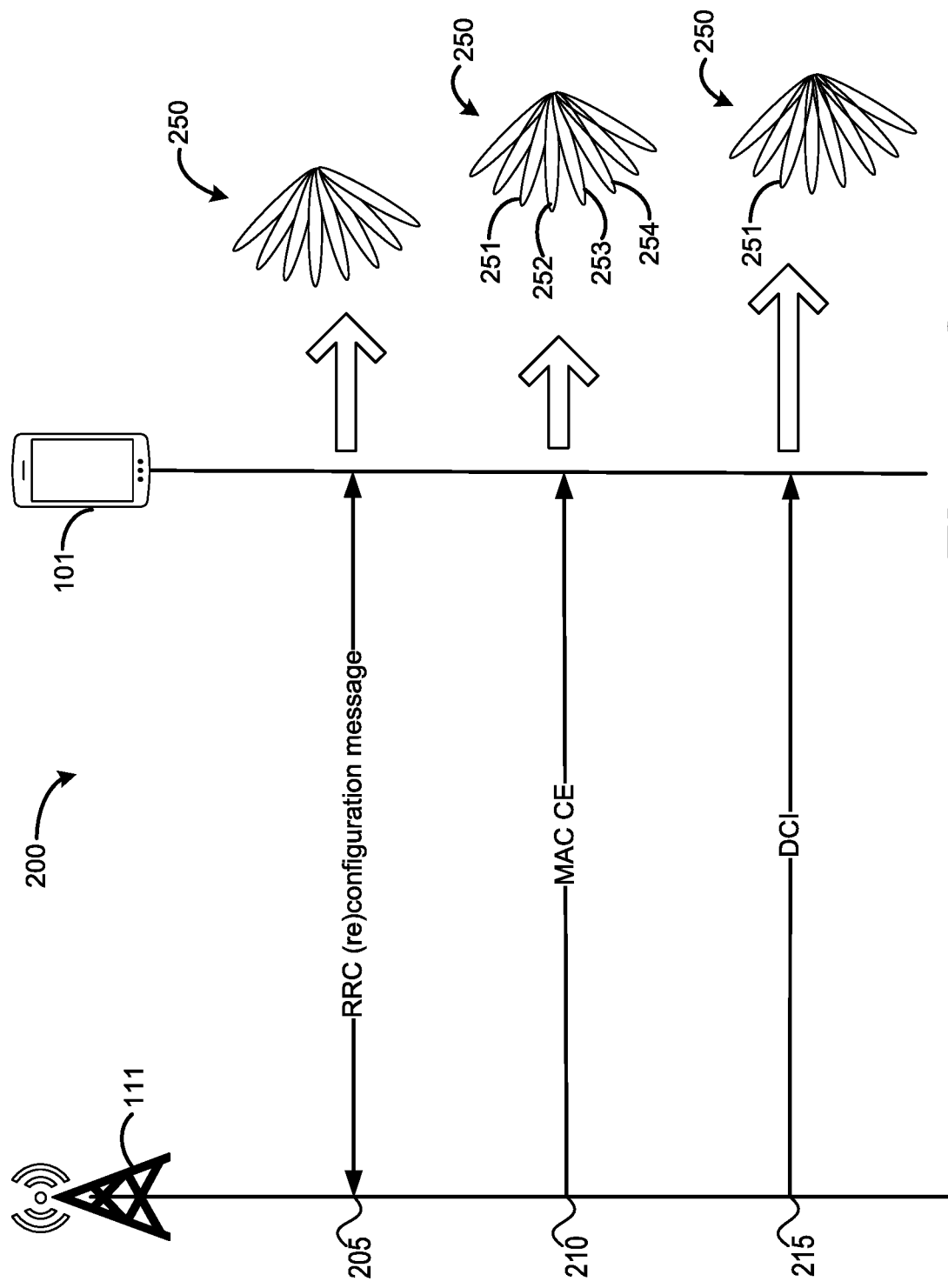
FIG. 2 illustrates an example procedure for PUSCH beam management according to various embodiments.

FIG. 2 illustrates an example PUSCH beam management procedure 200 according to various embodiments. Procedure 200 begins at operation 205 where an RRC (re)configuration is performed between a RAN node 111 and UE 101 for all SRS resources for codebook or non-codebook based transmissions. As shown by FIG. 2, the SRS resources include a set of beams 250 for all RRC configured SRS resources. At operation 210, the RAN node 111 signals/transmits a MAC CE to update, reconfigure, or otherwise indicate a subset of the RRC configured SRS resources for the codebook or non-codebook based transmission(s). In this example, the MAC CE indicates beams (of BWPs) 251, 252, 253, and 254 from the set of beams 250. The beams 251-254 may be referred to as a "subset of beams," "beam subset," "subset of SRS resources," "candidate SRS resources," or the like. In embodiments, to indicate the beam subset, the MAC CE may include an SRS resource ID of each SRS resource in the beam subset, an SRI of each SRS resource in the beam subset, or a spatial relation info parameter of each SRS resource in the beam subset. At operation 215, the RAN node 111 signals/transmits a DCI message to indicate a selected SRS beam to be used for PUSCH transmission or SRS transmission. In the example of FIG. 2, the DCI message indicates an SRS resource corresponding to beam 251. In embodiments, to indicate the selected SRS resource, the DCI message may include an SRS resource ID of the selected SRS resource, an SRI of the selected SRS resource, or a spatial relation info parameter of the selected SRS resource.

In various embodiments, procedure 200 may be used to reduce latency for PUSCH beam management and power control configuration. In a first PUSCH embodiment, the RAN node 111 configures a group of SRS resources for a current transmission scheme (e.g., codebook or non-codebook) using RRC signaling at operation 205, and then uses the MAC CE to down-select a subset of the configured SRS resources at operation 210. The SRS resources may be configured via the higher layer parameter SRS-ResourceSet in the RRC message sent at operation 205. The number of RRC configured SRS resources for codebook or non-codebook based transmission may be extended to N, and as an example, N=8, 16, 32, or 64. The SRS resources can be transmitted in one or more resource sets. The MAC CE obtained by the UE 101 at operation 210 may indicate M number of candidate SRS resources, and as an example, M=8. The MAC CE may include one or more of the following parameters: CC index, BWP ID, and one or more SRS resource IDs, which may be labeled SRS resource ID 0, SRS resource ID 1, and so forth to SRS resource ID M−1. At operation 215, the RAN node 111 sends a DCI, which indicates one of the SRS resources that were updated or changed by the MAC CE. In other words, the SRS resource ID included in the DCI is used to indicate the Tx beam for PUSCH.

In a second PUSCH embodiment, the spatial relation info is configured via RRC at operation 205, and the MAC CE obtained by the UE 101 at operation 210 includes a spatial relation info for each SRI in the beam subset. In the second PUSCH embodiment, there can be N spatial relation info parameters (e.g., higher layer parameter spatialRelationInfo)

configured by the RRC message at operation 205. The spatial relation info for each SRI may be based on SSB, CSI-RS, and/or SRS. The MAC CE obtained at operation 210 may include one or more of a CC index, BWP ID, and Spatial Relation Info when SRI=0, Spatial Relation Info when SRI=1, and so forth to Spatial Relation Info when SRI=M−1. In this example, M is the number of candidate SRS resources and/or SRIs, or the number of beams in the beam subset.

In the first and second PUSCH embodiments, the CC index and BWP ID may be configured on a per-MAC CE basis, on a per-SRS resource ID basis, or on a per-SRI basis. Additionally, the spatial relation info indicated by the DCI obtained at operation 215 is a Tx beam indication for the UE 101. The SRS Resource Index field in the DCI can be selected from the M candidate SRS resources, where the SRS Resource Index field may be $\lceil \log_2 M \rceil$ bits in length or some other length as discussed herein. Furthermore, the numbers N and M may be pre-defined, configured by higher layer signaling, and/or based on a UE reported capabilities.

In a third PUSCH embodiment, MAC CE in the first or second PUSCH embodiments is/are used to update or change uplink power control parameters. As the power control parameters set may be tied to each SRI in the DCI, when candidate SRS resources are updated by the MAC CE at operation 210, a power control parameters set may also be updated using the same MAC CE. In this embodiment, the power control parameters set may include information such as P0 and alpha, RS for pathloss estimation, and closed loop power control index. For example, the MAC CE may include one or more of the following elements/parameters: P0 and alpha set ID when SRI=0, P0 and alpha set ID when SRI=1, and so forth to P0 and alpha set ID when SRI=M−1; Pathloss reference RS ID when SRI=0, Pathloss reference RS ID when SRI=1, and so forth to Pathloss reference RS when SRI=M−1; and Closed-loop index when SRI=0, Closed-loop index when SRI=1, and so forth to Closed-loop index when SRI=M−1. In this embodiment, P0 and alpha is/are used to calculate the transmission power, and the Pathloss reference RS ID is/are used to measure the DL RSRP. In this way, the UE 101 can derive the path loss based on the RSRP as well as the transmission power.

In various embodiments, procedure 200 may be used to reduce latency for SRS beam management and power control. In these embodiments, the MAC CE obtained at operation 210 is used to update SRS beams including periodic and/or aperiodic SRS beams. This is in contrast to existing solutions for periodic SRS and aperiodic SRS that require RRC reconfiguration to update periodic SRS and aperiodic SRS beam, which has a relatively large latency.

In a first SRS embodiment, the MAC CE obtained at operation 210 is used to update the beam for each configured SRS resource. In the first SRS embodiment, the MAC CE can include one or more of the following information/parameters: CC index; BWP ID; Spatial Relation Info 0, Spatial Relation Info 1, and so forth, to Spatial Relation Info M−1; and/or SRS resource ID 0, SRS resource ID 1, and so forth, to SRS resource ID M−1. In this embodiment, M is the number of candidate SRS resources and/or SRIs, or the number of beams in the beam subset.

In a second SRS embodiment, the MAC CE obtained at operation 210 is used to update the beam(s) for all SRS resources in a particular SRS resource set. In this embodiment, the MAC CE can include one or more of the following information/parameters: CC index; BWP ID; Spatial Relation Info for SRS resource 0 in the set, Spatial Relation Info for SRS resource 1 in the set, and so forth, to Spatial Relation Info for SRS resource M−1 in the set; and/or an SRS resource set ID.

In a third SRS embodiment, the MAC CE obtained at operation 210 is used to update a power control parameters set for individual SRS resource sets. In this embodiment, the MAC CE can include one or more of the following parameters for each SRS resource set: CC index; BWP ID; P0 and alpha set ID; Pathloss reference RS ID; closed-loop index; and SRS resource set ID. In this embodiment, the P0 and alpha set ID is used to calculate the transmission power, and the Pathloss reference RS ID is used to measure the DL RSRP, which allow the UE 101 to derive the path loss based on the RSRP and the transmission power.

In any of the aforementioned embodiments, the beam indication for PUSCH/SRS and power control parameters/configurations can be indicated by one MAC CE at operation 210, or using two independent MAC CEs. Further, the spatial relation info in the aforementioned embodiments may include more than one reference signal resource, where the reference signal may be SSB, CSI-RS, or SRS.

Referring back to FIG. 1, as mentioned previously, an individual SRS resource can be used for codebook based transmission, non-codebook based transmission, beam management, and/or antenna switching. In NR implementations, beam management refers to a set of L1/L2 procedures to acquire and maintain a set of TRxP(s) 111 and/or UE 101 beams that can be used for DL and UL transmission including beam determination (i.e., the TRxP 111 or UE 101 ability to select of its own Tx/Rx beams); beam measurement (i.e., the TRxP 111 or UE 101 ability to measure characteristics of received beamformed signals and/or one or more reference signals); beam reporting (i.e., UE 101 ability to report information of beamformed signal(s) based on beam measurement(s)); and beam sweeping (i.e., operation(s) of covering a spatial area with beams transmitted and/or received during a time interval in a predetermined manner).

As mentioned previously, the UE 101 may be configured with one or more SRS resource sets as configured by the higher layer parameter SRS-ResourceSet where the UE 101 may be configured with K≥1 SRS resources for each SRS resource set via higher layer parameter SRS-Resource, wherein the maximum value of K is indicated by UE capability (see e.g., 3GPP TS 38.306 v15.1.0 (2018-04)). The SRS resource set applicability is configured by the higher layer parameter usage in SRS-ResourceSet. When the higher layer parameter usage is set to 'beamManagement', only one SRS resource in each of multiple SRS sets may be transmitted at a given time instant, but the SRS resources in different SRS resource sets with the same time domain behaviour in the same BWP may be transmitted simultaneously.

For aperiodic SRS at least one state of the DCI field is used to select at least one out of the configured SRS resource set(s). The following SRS parameters are semi-statically configurable by higher layer parameter SRS-Resource: srs-ResourceId determines SRS resource configuration identify; Number of SRS ports as defined by the higher layer parameter nrofSRS-Ports; Time domain behaviour of SRS resource configuration as indicated by the higher layer parameter resource Type, which can be periodic, semi-persistent, aperiodic SRS transmission; Slot level periodicity and slot level offset as defined by the higher layer parameters periodicityAndOffset-p or periodicityAndOffset-sp for an SRS resource of type periodic or semi-persistent, wherein the UE 101 does not expect to be configured with SRS resources in the same SRS resource set SRS-ResourceSet with different slot level periodicities, and for an SRS-ResourceSet configured with higher layer parameter resource Type set to 'aperiodic', a slot level offset is defined by the higher layer parameter slotOffset; Number of OFDM symbols in the SRS resource, starting OFDM symbol of the SRS resource within a slot including repetition factor R as defined by the higher layer parameter resourceMapping; SRS bandwidth $B_{SRS}$ and $C_{SRS}$, as defined by the higher layer parameter freqHopping; Frequency hopping bandwidth, $b_{hop}$, as defined by the higher layer parameter freqHopping; Defining frequency domain position and configurable shift as defined by the higher layer parameters freqDomainPosition and freqDomainShift, respectively; Cyclic shift, as defined by the higher layer parameter cyclicShift-n2 or cyclicShift-n4 for transmission comb value 2 and 4, respectively; Transmission comb value as defined by the higher layer parameter transmissionComb; Transmission comb offset as defined by the higher layer parameter combOffset-n2 or combOffset-n4 for transmission comb value 2 or 4, respectively; SRS sequence ID as defined by the higher layer parameter sequenceId; the configuration of the spatial relation between a reference RS and the target SRS, where the higher layer parameter spatialRelationInfo, if configured, contains the ID of the reference RS, wherein the reference RS can be an SS/PBCH block, CSI-RS configured on serving cell indicated by higher layer parameter servingCellId if present, same serving cell as the target SRS otherwise, or an SRS configured on uplink BWP indicated by the higher layer parameter uplinkBWP, and serving cell indicated by the higher layer parameter servingCellId if present, same serving cell as the target SRS otherwise.

The UE 101 may be configured by the higher layer parameter resourceMapping in SRS-Resource with an SRS resource occupying $N_S \in \{1,2,4\}$ adjacent symbols within the last 6 symbols of the slot, where all antenna ports of the SRS resources are mapped to each symbol of the resource. When PUSCH and SRS are transmitted in the same slot, the UE 101 can only be configured to transmit SRS after the transmission of the PUSCH and the corresponding DM-RS. When the UE 101 is configured with one or more SRS resource configuration(s), and when the higher layer parameter resourceType in SRS-Resource is set to 'periodic', and if the UE 101 is configured with the higher layer parameter spatialRelationInfo containing the ID of a reference 'ssb-Index', the UE 101 transmits the target SRS resource with the same spatial domain transmission filter used for the reception of the reference SS/PBCH block. If the higher layer parameter spatialRelationInfo contains the ID of a reference 'csi-RS-Index', the UE 101 transmits the target SRS resource with the same spatial domain transmission filter used for the reception of the reference periodic CSI-RS or of the reference semi-persistent CSI-RS. If the higher layer parameter spatialRelationInfo containing the ID of a reference 'srs', the UE 101 transmits the target SRS resource with the same spatial domain transmission filter used for the transmission of the reference periodic SRS.

When the UE 101 is configured with one or more SRS resource configuration(s), when the higher layer parameter resourceType in SRS-Resource is set to 'semi-persistent', when the UE 101 receives an activation command (e.g., a DCI) for an SRS resource, and when the HARQ-ACK corresponding to the PDSCH carrying the selection command is transmitted in slot n, the corresponding actions and the UE assumptions on SRS transmission corresponding to the configured SRS resource set are applied starting from slot $n+3N_{slot}^{subframe,\mu}+1$. The activation command also contains spatial relation assumptions provided by a list of references to reference signal IDs, one per element of the activated SRS resource set. Each ID in the list refers to a reference SS/PBCH block, NZP CSI-RS resource configured on serving cell indicated by Resource Serving Cell ID field in the activation command if present, same serving cell as the SRS resource set otherwise, or SRS resource configured on serving cell and uplink bandwidth part indicated by Resource Serving Cell ID field and Resource BWP ID field in the activation command if present, same serving cell and bandwidth part as the SRS resource set otherwise.

If an SRS resource in the activated resource set is configured with the higher layer parameter spatialRelationInfo, the UE 101 assumes that the ID of the reference signal in the activation command overrides the one configured in spatialRelationInfo.

When the UE 101 receives a deactivation command for an activated SRS resource set, and when the HARQ-ACK corresponding to the PDSCH carrying the selection command is transmitted in slot n, the corresponding actions and UE assumption(s) on cessation of SRS transmission corresponding to the deactivated SRS resource set are applied starting from slot $n+3N_{slot}^{subframe,\mu}+1$.

If the UE 101 is configured with the higher layer parameter spatialRelationInfo containing the ID of a reference 'ssb-Index', the UE 101 transmits the target SRS resource with the same spatial domain transmission filter used for the reception of the reference SS/PBCH block. If the higher layer parameter spatialRelationInfo contains the ID of a reference 'csi-RS-Index', the UE 101 transmits the target SRS resource with the same spatial domain transmission filter used for the reception of the reference periodic CSI-RS or of the reference semi-persistent CSI-RS. If the higher layer parameter spatialRelationInfo contains the ID of a reference 'srs', the UE 101 transmits the target SRS resource with the same spatial domain transmission filter used for the transmission of the reference periodic SRS or of the reference semi-persistent SRS. If the UE 101 has an active semi-persistent SRS resource configuration and has not received a deactivation command, the semi-persistent SRS configuration is considered to be active in the UL BWP which is active, otherwise it is considered suspended.

When the UE 101 is configured with one or more SRS resource configuration(s), and when the higher layer parameter resource Type in SRS-Resource is set to 'aperiodic', the UE 101 receives a configuration of SRS resource sets, and/or the UE 101 receives a downlink DCI, a group common DCI, or an uplink DCI based command where a codepoint of the DCI may trigger one or more SRS resource set(s). For SRS in a resource set with usage set to 'codebook' or 'antennaSwitching', the minimal time interval between the last symbol of the PDCCH triggering the aperiodic SRS transmission and the first symbol of SRS resource is N2, for which the minimal time interval in units of OFDM symbols is counted based on the minimum subcarrier spacing between the PDCCH and the aperiodic SRS. Otherwise, the minimal time interval between the last symbol of the PDCCH triggering the aperiodic SRS transmission and the first symbol of SRS resource is $N_2+14$.

If the UE 101 receives a DCI triggering aperiodic SRS in slot n, the UE 101 transmits aperiodic SRS in each of the triggered SRS resource set(s) in slot $$\left\lfloor n \cdot \frac{2^{\mu_{SRS}}}{2^{\mu_{PDCCH}}} \right\rfloor,$$

where k is configured via higher layer parameter slotoffset for each triggered SRS resources set and is based on the subcarrier spacing of the triggered SRS transmission, $\mu_{SRS}$ and $\mu_{PDCCH}$ are the subcarrier spacing configurations for triggered SRS and PDCCH carrying the triggering command respectively.

If the UE 101 is configured with the higher layer parameter spatialRelationInfo containing the ID of a reference 'ssb-Index', the UE 101 transmits the target SRS resource with the same spatial domain transmission filter used for the reception of the reference SS/PBCH block. If the higher layer parameter spatialRelationInfo contains the ID of a reference 'csi-RS-Index', the UE 101 transmits the target SRS resource with the same spatial domain transmission filter used for the reception of the reference periodic CSI-RS or of the reference semi-persistent CSI-RS, or of the latest reference aperiodic CSI-RS. If the higher layer parameter spatialRelationInfo contains the ID of a reference 'srs', the UE 101 transmits the target SRS resource with the same spatial domain transmission filter used for the transmission of the reference periodic SRS or of the reference semi-persistent SRS or of the reference aperiodic SRS.

The UE 101 is not expected to be configured with different time domain behavior for SRS resources in the same SRS resource set. The UE is also not expected to be configured with different time domain behavior between SRS resource and associated SRS resources set. The 2-bit SRS request field in DCI format 0_1, 1_1 indicates the triggered SRS resource set, and the 2-bit SRS request field in DCI format 2_3 indicates the triggered SRS resource set. If the UE 101 is configured with higher layer parameter srs-TPC-PDCCH-Group set to 'typeB', or indicates the SRS transmission on a set of serving cells configured by higher layers if the UE is configured with higher layer parameter srs-TPC-PDCCH-Group set to 'typeA'.

For PUCCH and SRS on the same carrier, the UE 101 does not transmit SRS when semi-persistent and periodic SRS are configured in the same symbol(s) with PUCCH carrying only CSI report(s), or only L1-RSRP report(s). The UE 101 does not transmit an SRS when semi-persistent or periodic SRS is configured or aperiodic SRS is triggered to be transmitted in the same symbol(s) with PUCCH carrying HARQ-ACK and/or SR. In the case that SRS is not transmitted due to overlap with PUCCH, only the SRS symbol(s) that overlap with PUCCH symbol(s) are dropped. The PUCCH is not transmitted when aperiodic SRS is triggered to be transmitted to overlap in the same symbol with PUCCH carrying semi-persistent/periodic CSI report(s) or semi-persistent/periodic L1-RSRP report(s) only.

In case of intra-band carrier aggregation or in inter-band CA band-band combination where simultaneous SRS and PUCCH/PUSCH transmissions are not allowed, the UE 101 is not expected to be configured with SRS from a carrier and PUSCH/UL DM-RS/UL PT-RS/PUCCH formats from a different carrier in the same symbol. In case of intra-band carrier aggregation or in inter-band CA band-band combination where simultaneous SRS and PRACH transmissions are not allowed, the UE 101 does not transmit simultaneously SRS resource(s) from a carrier and PRACH from a different carrier.

In case a SRS resource with SRS-resource Type set as 'aperiodic' is triggered on the OFDM symbol configured with periodic/semi-persistent SRS transmission, the UE 101 transmits the aperiodic SRS resource and not transmit the periodic/semi-persistent SRS resource(s) overlapping within the symbol(s). In case a SRS resource with SRS-resource Type set as 'semi-persistent' is triggered on the OFDM symbol configured with periodic SRS transmission, the UE 101 transmits the semi-persistent SRS resource and not transmit the periodic SRS resource(s) overlapping within the symbol(s). When the UE 101 is configured with the higher layer parameter usage in SRS-ResourceSet set to 'antennaSwitching,' and a guard period of Y symbols is configured, the UE 101 uses the same priority rules as defined above during the guard period as if SRS was configured.

As alluded to previously, two transmission schemes are supported for PUSCH including a codebook based transmission scheme and non-codebook based transmission scheme. The UE 101 is configured with the codebook based transmission scheme when the higher layer (e.g., RRC) parameter txConfig in pusch-Config is set to 'codebook', and the UE 101 is configured for the non-codebook based transmission scheme when the higher layer parameter txConfig is set to 'nonCodebook'. If the higher layer parameter txConfig is not configured, the UE 101 is not expected to be scheduled by DCI format 0_1. If PUSCH is scheduled by DCI format 0_0, the PUSCH transmission is based on a single antenna port, and the UE 101 does not expect PUSCH scheduled by DCI format 0_0 in a BWP without configured PUCCH resource with PUCCH-SpatialRelationInfo in frequency range 2 in RRC connected mode.

For codebook based transmission, the PUSCH is scheduled by DCI format 0_0, DCI format 0_1, or semi-statically configured to operate. If the PUSCH is scheduled by DCI format 0_1, or semi-statically configured to operate, the UE 101 determines its PUSCH transmission precoder based on SRI, TPMI and the transmission rank, where the SRI, TPMI and the transmission rank are provided the SRS resource indicator field and the precoding information and number of layers field of the DCI, or given by the higher layer parameters srs-ResourceIndicator and precodingAndNumberOfLayers. The TPMI is used to indicate the precoder to be applied over the antenna ports and/or layers $\{0 \ldots v-1\}$ and that corresponds to the SRS resource selected by the SRI when multiple SRS resources are configured, or if a single SRS resource is configured TPMI is used to indicate the precoder to be applied over the antenna ports and/or layers $\{0 \ldots v-1\}$ and that corresponds to the SRS resource. The transmission precoder is selected from the uplink codebook that has a number of antenna ports equal to higher layer parameter nrofSRS-Ports in SRS-Config. When the UE 101 is configured with the higher layer parameter txConfig set to 'codebook', the UE 101 is configured with at least one SRS resource. The indicated SRI in slot n is associated with the most recent transmission of SRS resource identified by the SRI, where the SRS resource is prior to the PDCCH carrying the SRI. In some embodiments, the SRS resource is prior to the PDCCH carrying the SRI before slot n.

For codebook based transmissions, the UE 101 determines its codebook subsets based on TPMI and upon the reception of higher layer parameter codebookSubset in pusch-Config which may be configured with 'fullyAndPartialAndNonCoherent', 'partialAndNonCoherent', or 'nonCoherent' depending on the UE capability. The maximum transmission rank may be configured by the higher parameter maxRank in pusch-Config. When the UE 101 reports a UE capability of 'partialAndNonCoherent' transmission, the UE 101 does not expect to be configured by codebookSubset with 'fullyAndPartialAndNonCoherent'. When the UE 101 reports a UE capability of 'nonCoherent' transmission, the UE 101 does not expect to be configured by codebookSubset with 'fullyAndPartialAndNonCoherent' or with 'partialAndNonCoherent'. The UE 101 does not expect to be configured with the higher layer parameter codebookSubset set to 'partialAndNonCoherent' when higher layer parameter nrofSRS-Ports in an SRS-ResourceSet with usage set to 'codebook' indicates that two SRS antenna ports are configured.

For codebook based transmissions, the UE 101 may be configured with a single SRS-ResourceSet with usage set to 'codebook' and only one SRS resource can be indicated based on the SRI from within the SRS resource set. The maximum number of configured SRS resources for codebook based transmission is 2. If aperiodic SRS is configured for the UE 101, the SRS request field in the DCI triggers the transmission of aperiodic SRS resources. The UE 101 transmits PUSCH using the same antenna port(s) as the SRS port(s) in the SRS resource indicated by the DCI format 0_1 or by configuredGrantConfig. When multiple SRS resources are configured by SRS-ResourceSet with usage set to 'codebook', the UE 101 is to expect that higher layer parameters nrofSRS-Ports in SRS-Resource in SRS-ResourceSet shall be configured with the same value for all these SRS resources.

The SRS request field in DCI format 0_1 and 1_1 is 2 bits as defined by table 1 for UEs 101 not configured with SUL in the cell; 3 bits for UEs 101 configured SUL in the cell where the first bit is the non-SUL/SUL indicator and the second and third bits are defined by table 1. This bit field may also indicate the associated CSI-RS as discussed elsewhere herein. Additionally, DCI format 2_3 may also have a 2 bit SRS request field as defined by table 1.

SRS-ResourceSet set to 'nonCodebook'. The maximum number of SRS resources that can be configured for non-codebook based uplink transmission is 4. The indicated SRI in slot n is associated with the most recent transmission of SRS resource(s) identified by the SRI, where the SRS transmission is prior to the PDCCH carrying the SRI. In some embodiments, the SRS transmission is prior to the PDCCH carrying the SRI before slot n.

For non-codebook based transmission, the UE 101 can calculate the precoder used for the transmission of SRS based on measurement of an associated NZP CSI-RS resource. The UE 101 can be configured with only one NZP CSI-RS resource for the SRS resource set with higher layer parameter usage in SRS-ResourceSet set to 'nonCodebook' if configured.

If aperiodic SRS resource set is configured, the associated NZP-CSI-RS is indicated via SRS request field in DCI format 0_1 and 1_1, where AperiodicSRS-ResourceTrigger indicates the association between aperiodic SRS triggering state and SRS resource sets, triggered SRS resource(s) srs-ResourceSetId, csi-RS indicating the associated NZP-CSI-RS-ResourceId are higher layer configured in SRS-ResourceSet. The UE 101 is not expected to update the SRS precoding information if the gap from the last symbol of the reception of the aperiodic NZP-CSI-RS resource and the first symbol of the aperiodic SRS transmission is less than 42 OFDM symbols.

TABLE 1

| | SRS request | |
|---|---|---|
| Value of SRS request field | Triggered aperiodic SRS resource set(s) for DCI format 0_1, 1_0, and 2_3 configured with higher layer parameter srs-TPC-PDCCH-Group set to 'typeB' | Triggered aperiodic SRS resource set(s) for DCI format 2_3 configured with higher layer parameter srs-TPC-PDCCH-Group set to 'typeA' |
| 00 | No aperiodic SRS resource set triggered | No aperiodic SRS resource set triggered |
| 01 | SRS resource set(s) configured with higher layer parameter aperiodicSRS-ResourceTrigger set to 1 | SRS resource set(s) configured with higher layer parameter SRS-SetUse set to 'antenna switching' and resourceType in SRS-ResourceSet set to 'aperiodic' for a $1^{st}$ set of serving cells configured by higher layers |
| 10 | SRS resource set(s) configured with higher layer parameter aperiodicSRS-ResourceTrigger set to 2 | SRS resource set(s) configured with higher layer parameter SRS-SetUse set to 'antenna switching' and resourceType in SRS-ResourceSet set to 'aperiodic' for a $2^{nd}$ set of serving cells configured by higher layers |
| 11 | SRS resource set(s) configured with higher layer parameter aperiodicSRS-ResourceTrigger set to 3 | SRS resource set(s) configured with higher layer parameter SRS-SetUse set to 'antenna switching' and resourceType in SRS-ResourceSet set to 'aperiodic' for a $3^{rd}$ set of serving cells configured by higher layers |

For non-codebook based transmission, PUSCH can be scheduled by DCI format 0_0, DCI format 0_1, or semi-statically configured to operate. The UE 101 can determine its PUSCH precoder and transmission rank based on the SRI when multiple SRS resources are configured, where the SRI is given by the SRS resource indicator in DCI, or the SRI is given by srs-ResourceIndicator. The UE 101 uses one or multiple SRS resources for SRS transmission, where, in a SRS resource set, the maximum number of SRS resources which can be configured to the UE for simultaneous transmission in the same symbol and the maximum number of SRS resources are UE capabilities. Only one SRS port for each SRS resource is configured. Only one SRS resource set can be configured with higher layer parameter usage in If the UE 101 is configured with aperiodic SRS associated with aperiodic NZP CSI-RS resource, the presence of the associated CSI-RS is indicated by the SRS request field if the value of the SRS request field is not '00' and if the scheduling DCI is not used for cross carrier or cross bandwidth part scheduling. The CSI-RS is located in the same slot as the SRS request field. If the UE configured with aperiodic SRS associated with aperiodic NZP CSI-RS resource, any of the TCI states configured in the scheduled CC shall not be configured with 'QCL-TypeD'.

If periodic or semi-persistent SRS resource set is configured, the NZP-CSI-RS-ResourceConfigID for measurement is indicated via higher layer parameter associatedCSI-RS in SRS-ResourceSet. The UE 101 performs one-to-one mapping from the indicated SRI(s) to the indicated DM-RS ports(s) and their corresponding PUSCH layers {0 ... v−1} given by DCI format 0_1 or by configuredGrantConfig in increasing order. The UE 101 transmits PUSCH using the same antenna ports as the SRS port(s) in the SRS resource(s) indicated by SRI(s) given by DCI format 0_1 or by configuredGrantConfig, where the SRS port in (i+1)-th SRS resource in the SRS resource set is indexed as $p_i=1000+i$.

For non-codebook based transmission, the UE 101 does not expect to be configured with both spatialRelationInfo for SRS resource and associatedCSI-RS in SRS-ResourceSet for SRS resource set. For non-codebook based transmission, the UE 101 can be scheduled with DCI format 0_1 when at least one SRS resource is configured in SRS-ResourceSet with usage set to 'nonCodebook'.

Referring back to FIG. 1, the RAN nodes 111 may be configured to communicate with one another via interface 112. In embodiments where the system 100 is an LTE system (e.g., when CN 120 is an EPC 120), the interface 112 may be an X2 interface 112. The X2 interface may be defined between two or more RAN nodes 111 (e.g., two or more eNBs and the like) that connect to EPC 120, and/or between two eNBs connecting to EPC 120. In some implementations, the X2 interface may include an X2-U and an X2-C. The X2-U may provide flow control mechanisms for user data packets transferred over the X2 interface, and may be used to communicate information about the delivery of user data between eNBs. For example, the X2-U may provide specific sequence number information for user data transferred from an MeNB to an SeNB; information about successful in sequence delivery of PDCP PDUs to a UE 101 from an SeNB for user data; information of PDCP PDUs that were not delivered to a UE 101; information about a current minimum desired buffer size at the SeNB for transmitting to the UE user data; and the like. The X2-C may provide intra-LTE access mobility functionality, including context transfers from source to target eNBs, user plane transport control, etc.; load management functionality; as well as inter-cell interference coordination functionality.

In embodiments where the system 100 is a 5G or NR system (e.g., when CN 120 is an 5GC 120), the interface 112 may be an Xn interface 112. The Xn interface is defined between two or more RAN nodes 111 (e.g., two or more gNBs and the like) that connect to 5GC 120, between a RAN node 111 (e.g., a gNB) connecting to 5GC 120 and an eNB, and/or between two eNBs connecting to 5GC 120. In some implementations, the Xn interface may include an Xn-U interface and an Xn-C interface. The Xn-U may provide non-guaranteed delivery of user plane PDUs and support/provide data forwarding and flow control functionality. The Xn-C may provide management and error handling functionality, functionality to manage the Xn-C interface; mobility support for UE 101 in a CM-CONNECTED mode including functionality to manage the UE mobility for connected mode between one or more RAN nodes 111. The mobility support may include context transfer from an old (source) serving RAN node 111 to new (target) serving RAN node 111; and control of user plane tunnels between old (source) serving RAN node 111 to new (target) serving RAN node 111. A protocol stack of the Xn-U may include a transport network layer built on IP transport layer, and a GTP-U layer on top of a UDP and/or IP layer(s) to carry user plane PDUs. The Xn-C protocol stack may include an application layer signaling protocol (referred to as XnAP) and a transport network layer that is built on SCTP. The SCTP may be on top of an IP layer, and may provide the guaranteed delivery of application layer messages. In the transport IP layer, point-to-point transmission is used to deliver the signaling PDUs. In other implementations, the Xn-U protocol stack and/or the Xn-C protocol stack may be same or similar to the user plane and/or control plane protocol stack(s) shown and described herein.

The RAN 110 is shown to be communicatively coupled to a core network—in this embodiment, CN 120. The CN 120 may comprise one or more network elements 122, which are configured to offer various data and telecommunications services to customers/subscribers (e.g., users of UEs 101) who are connected to the CN 120 via the RAN 110. The CN 120 includes one or more servers 122, which may implement various core network elements or AFs such as those discussed herein. The components of the CN 120 may be implemented in one physical node or separate physical nodes including components to read and execute instructions from a machine-readable or computer-readable medium (e.g., a non-transitory machine-readable storage medium). In some embodiments, NFV may be utilized to virtualize any or all network node functions via executable instructions stored in one or more computer-readable storage mediums (described in further detail below). A logical instantiation of the CN 120 may be referred to as a network slice, and a logical instantiation of a portion of the CN 120 may be referred to as a network sub-slice. NFV architectures and infrastructures may be used to virtualize one or more network functions, alternatively performed by proprietary hardware, onto physical resources comprising a combination of industry-standard server hardware, storage hardware, or switches. In other words, NFV systems can be used to execute virtual or reconfigurable implementations of one or more EPC components/functions.

In embodiments where the CN 120 is an EPC 120, the one or more network elements 122 may include or operate one or more MMEs, SGSNs, S-GWs, P-GWs, HSSs, PCRFs, and/or other like LTE core network elements. Additionally, the RAN 110 (referred to as "E-UTRAN 110" or the like) may be connected with the EPC 120 via an S1 interface 113. In embodiments, the S1 interface 113 may be split into two parts, an S1-U interface 114, which carries traffic data between the RAN nodes 111 and the S-GW, and the S1-MME interface 115, which is a signaling interface between the RAN nodes 111 and MMES. Additionally, the P-GW within the EPC 120 may route data packets between the EPC 120 and external networks such as a network including a PDN 130 via an IP interface 125. The PDN 130 may be an operator external public, a private PDN (e.g., enterprise network, etc.), or an intra-operator PDN (e.g., for provision of IMS and/or IP-CAN services).

In embodiments where the CN 120 is a 5GC 120, the network elements 122 may implement, inter alia, an AUSF, AMF, SMF, NEF, PCF, NRF, UDM, AF, UPF, SMSF, N3IWF, NSSF and/or other like NRNFs. Additionally, the RAN 110 (referred to as "5G-RAN 110," "NG-RAN 110," or the like) may be connected with the 5GC 120 via an NG interface 113. In these embodiments, the NG interface 113 may be split into two parts, an NG-U interface 114, which carries traffic data between the RAN nodes 111 and a UPF, and the NG-C interface 115, which is a signaling interface between the RAN nodes 111 and AMFs. Additionally, the UPF within the 5GC 120 may perform packet routing, filtering, inspection, forwarding, etc., between the 5GC 120 and external networks such as a DN 130 via an IP interface 125. The DN 130 may represent one or more data networks, including one or more LADNs, and may be an operator external public, a private PDN (e.g., enterprise network, etc.), or an intra-operator PDN, for example, for provision of IMS and/or IP-CAN services.

The CN 120 includes one or more servers 122, which may implement various core network elements or AFs such as those discussed herein. The CN 120 is shown to be communicatively coupled to PDN/DN 130 via an IP communications interface 125. The PDN/DN 130 may include one or more application servers. The application server(s) comprise one or more physical and/or virtualized systems for providing functionality (or services) to one or more clients (e.g., UEs 101) over a network. The server(s) within PDN/DN 130 and/or the server(s) 122 may include various computer devices with rack computing architecture component(s), tower computing architecture component(s), blade computing architecture component(s), and/or the like. The server(s) may represent a cluster of servers, a server farm, a cloud computing service, or other grouping or pool of servers, which may be located in one or more datacenters. The server(s) may also be connected to, or otherwise associated with one or more data storage devices (not shown). Moreover, the server(s) may include an operating system (OS) that provides executable program instructions for the general administration and operation of the individual server computer devices, and may include a computer-readable medium storing instructions that, when executed by a processor of the servers, may allow the servers to perform their intended functions. Suitable implementations for the OS and general functionality of servers are known or commercially available, and are readily implemented by persons having ordinary skill in the art. Generally, the server(s) offer applications or services that use IP/network resources. As examples, the server(s) may provide traffic management services, cloud analytics, content streaming services, immersive gaming experiences, social networking and/or microblogging services, and/or other like services. In addition, the various services provided by the server(s) 130 may include initiating and controlling software and/or firmware updates for applications or individual components implemented by the UEs 101. The server(s) can also be configured to support one or more communication services (e.g., VoIP sessions, PTT sessions, group communication sessions, social networking services, etc.) for the UEs 101 via the CN 120.

Figure 3:
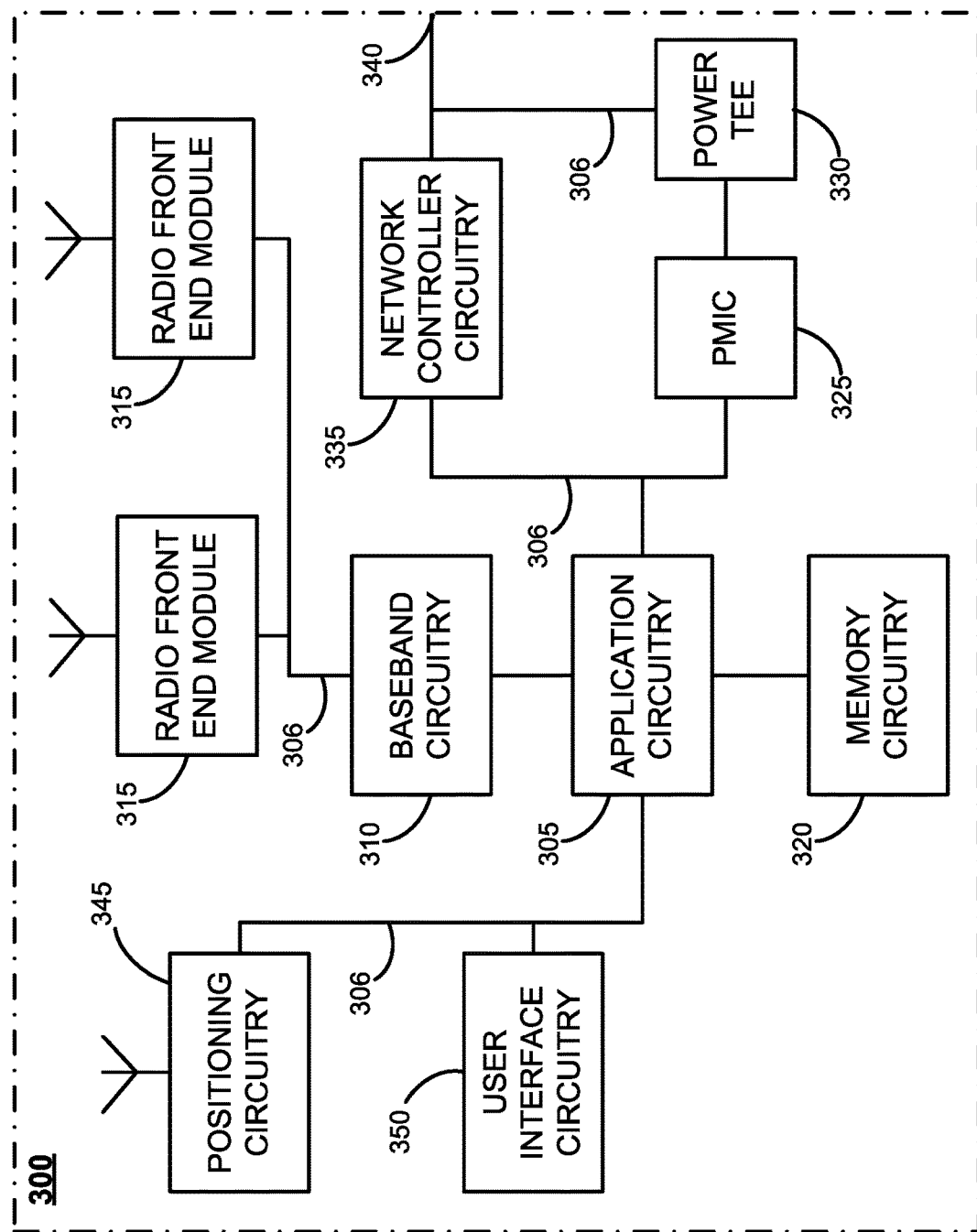
FIG. 3 depicts an example of infrastructure equipment in accordance with various embodiments.

FIG. 3 illustrates an example of infrastructure equipment 300 in accordance with various embodiments. The infrastructure equipment 300 (or "system 300") may be implemented as a base station, radio head, RAN node such as the RAN nodes 111 and/or AP 106 shown and described previously, application server(s) 130, and/or any other element/device discussed herein. In other examples, the system 300 could be implemented in or by a UE 101.

The system 300 includes application circuitry 305, baseband circuitry 310, one or more radio front end modules (RFEMs) 315, memory circuitry 320, power management integrated circuitry (PMIC) 325, power tee circuitry 330, network controller circuitry 335, network interface connector 340, satellite positioning circuitry 345, and user interface 350. In some embodiments, the device 300 may include additional elements such as, for example, memory/storage, display, camera, sensor, or input/output (I/O) interface. In other embodiments, the components described below may be included in more than one device. For example, said circuitries may be separately included in more than one device for CRAN, vBBU, or other like implementations.

Application circuitry 305 includes circuitry such as, but not limited to one or more processors (or processor cores), cache memory, and one or more of low drop-out voltage regulators (LDOs), interrupt controllers, serial interfaces such as SPI, I$^2$C or universal programmable serial interface module, real time clock (RTC), timer-counters including interval and watchdog timers, general purpose input/output (I/O or IO), memory card controllers such as Secure Digital (SD) MultiMediaCard (MMC) or similar, Universal Serial Bus (USB) interfaces, Mobile Industry Processor Interface (MIPI) interfaces and Joint Test Access Group (JTAG) test access ports. The processors (or cores) of the application circuitry 305 may be coupled with or may include memory/storage elements and may be configured to execute instructions stored in the memory/storage to enable various applications or operating systems to run on the system 300. In some implementations, the memory/storage elements may be on-chip memory circuitry, which may include any suitable volatile and/or non-volatile memory, such as DRAM, SRAM, EPROM, EEPROM, Flash memory, solid-state memory, and/or any other type of memory device technology, such as those discussed herein.

The processor(s) of application circuitry 305 may include, for example, one or more processor cores (CPUs), one or more application processors, one or more graphics processing units (GPUs), one or more reduced instruction set computing (RISC) processors, one or more Acorn RISC Machine (ARM) processors, one or more complex instruction set computing (CISC) processors, one or more digital signal processors (DSP), one or more FPGAs, one or more PLDs, one or more ASICs, one or more microprocessors or controllers, or any suitable combination thereof. In some embodiments, the application circuitry 305 may comprise, or may be, a special-purpose processor/controller to operate according to the various embodiments herein. As examples, the processor(s) of application circuitry 305 may include one or more Intel Pentium®, Core®, or Xeon® processor(s); Advanced Micro Devices (AMD) Ryzen® processor(s), Accelerated Processing Units (APUs), or Epyc® processors; ARM-based processor(s) licensed from ARM Holdings, Ltd. such as the ARM Cortex-A family of processors and the ThunderX2® provided by Cavium™, Inc.; a MIPS-based design from MIPS Technologies, Inc. such as MIPS Warrior P-class processors; and/or the like. In some embodiments, the system 300 may not utilize application circuitry 305, and instead may include a special-purpose processor/controller to process IP data received from an EPC or 5GC, for example.

In some implementations, the application circuitry 305 may include one or more hardware accelerators, which may be microprocessors, programmable processing devices, or the like. The one or more hardware accelerators may include, for example, computer vision (CV) and/or deep learning (DL) accelerators. As examples, the programmable processing devices may be one or more a field-programmable devices (FPDs) such as field-programmable gate arrays (FPGAs) and the like; programmable logic devices (PLDs) such as complex PLDs (CPLDs), high-capacity PLDs (HCPLDs), and the like; ASICs such as structured ASICs and the like; programmable SoCs (PSoCs); and the like. In such implementations, the circuitry of application circuitry 305 may comprise logic blocks or logic fabric, and other interconnected resources that may be programmed to perform various functions, such as the procedures, methods, functions, etc. of the various embodiments discussed herein. In such embodiments, the circuitry of application circuitry 305 may include memory cells (e.g., erasable programmable read-only memory (EPROM), electrically erasable programmable read-only memory (EEPROM), flash memory, static memory (e.g., static random access memory (SRAM), anti-fuses, etc.)) used to store logic blocks, logic fabric, data, etc. in look-up-tables (LUTs) and the like.

The baseband circuitry 310 may be implemented, for example, as a solder-down substrate including one or more integrated circuits, a single packaged integrated circuit soldered to a main circuit board or a multi-chip module containing two or more integrated circuits. The various hardware electronic elements of baseband circuitry 310 are discussed infra with regard to FIG. 6.

User interface circuitry 350 may include one or more user interfaces designed to enable user interaction with the system 300 or peripheral component interfaces designed to enable peripheral component interaction with the system 300. User interfaces may include, but are not limited to, one or more physical or virtual buttons (e.g., a reset button), one or more indicators (e.g., light emitting diodes (LEDs)), a physical keyboard or keypad, a mouse, a touchpad, a touchscreen, speakers or other audio emitting devices, microphones, a printer, a scanner, a headset, a display screen or display device, etc. Peripheral component interfaces may include, but are not limited to, a nonvolatile memory port, a universal serial bus (USB) port, an audio jack, a power supply interface, etc.

The radio front end modules (RFEMs) 315 may comprise a millimeter wave (mmWave) RFEM and one or more sub-mmWave radio frequency integrated circuits (RFICs). In some implementations, the one or more sub-mmWave RFICs may be physically separated from the mmWave RFEM. The RFICs may include connections to one or more antennas or antenna arrays (see e.g., antenna array 611 of FIG. 6 infra), and the RFEM may be connected to multiple antennas. In alternative implementations, both mmWave and sub-mmWave radio functions may be implemented in the same physical RFEM 315, which incorporates both mmWave antennas and sub-mmWave.

The memory circuitry 320 may include one or more of volatile memory including dynamic random access memory (DRAM) and/or synchronous dynamic random access memory (SDRAM), and nonvolatile memory (NVM) including high-speed electrically erasable memory (commonly referred to as Flash memory), phase change random access memory (PRAM), magnetoresistive random access memory (MRAM), etc., and may incorporate the three-dimensional (3D) cross-point (XPOINT) memories from Intel® and Micron®. Memory circuitry 320 may be implemented as one or more of solder down packaged integrated circuits, socketed memory modules and plug-in memory cards.

The PMIC 325 may include voltage regulators, surge protectors, power alarm detection circuitry, and one or more backup power sources such as a battery or capacitor. The power alarm detection circuitry may detect one or more of brown out (under-voltage) and surge (over-voltage) conditions. The power tee circuitry 330 may provide for electrical power drawn from a network cable to provide both power supply and data connectivity to the infrastructure equipment 300 using a single cable.

The network controller circuitry 335 may provide connectivity to a network using a standard network interface protocol such as Ethernet, Ethernet over GRE Tunnels, Ethernet over Multiprotocol Label Switching (MPLS), or some other suitable protocol. Network connectivity may be provided to/from the infrastructure equipment 300 via network interface connector 340 using a physical connection, which may be electrical (commonly referred to as a "copper interconnect"), optical, or wireless. The network controller circuitry 335 may include one or more dedicated processors and/or FPGAs to communicate using one or more of the aforementioned protocols. In some implementations, the network controller circuitry 335 may include multiple controllers to provide connectivity to other networks using the same or different protocols.

The positioning circuitry 345 includes circuitry to receive and decode signals transmitted/broadcasted by a positioning network of a global navigation satellite system (GNSS). Examples of navigation satellite constellations (or GNSS) include United States' Global Positioning System (GPS), Russia's Global Navigation System (GLONASS), the European Union's Galileo system, China's BeiDou Navigation Satellite System, a regional navigation system or GNSS augmentation system (e.g., Navigation with Indian Constellation (NAVIC), Japan's Quasi-Zenith Satellite System (QZSS), France's Doppler Orbitography and Radio-positioning Integrated by Satellite (DORIS), etc.), or the like. The positioning circuitry 345 comprises various hardware elements (e.g., including hardware devices such as switches, filters, amplifiers, antenna elements, and the like to facilitate OTA communications) to communicate with components of a positioning network, such as navigation satellite constellation nodes. In some embodiments, the positioning circuitry 345 may include a Micro-Technology for Positioning, Navigation, and Timing (Micro-PNT) IC that uses a master timing clock to perform position tracking/estimation without GNSS assistance. The positioning circuitry 345 may also be part of, or interact with, the baseband circuitry 310 and/or RFEMs 315 to communicate with the nodes and components of the positioning network. The positioning circuitry 345 may also provide position data and/or time data to the application circuitry 305, which may use the data to synchronize operations with various infrastructure (e.g., RAN nodes 111, etc.), or the like.

The components shown by FIG. 3 communicate with one another using interface circuitry, which may include interconnect (IX) 306. The IX 306 may include any number of bus and/or IX technologies such as industry standard architecture (ISA), extended ISA (EISA), inter-integrated circuit (I²C), an serial peripheral interface (SPI), point-to-point interfaces, power management bus (PMBus), peripheral component interconnect (PCI), PCI express (PCIe), Intel® Ultra Path Interface (UPI), Intel® Accelerator Link (IAL), Common Application Programming Interface (CAPI), Intel® QuickPath interconnect (QPI), Ultra Path Interconnect (UPI), Intel® Omni-Path Architecture (OPA) IX, RapidIO™ system IXs, Cache Coherent Interconnect for Accelerators (CCIA), Gen-Z Consortium IXs, Open Coherent Accelerator Processor Interface (OpenCAPI) IX, a HyperTransport interconnect, and/or any number of other IX technologies. The IX technology may be a proprietary bus, for example, used in an SoC based system.

Figure 4:
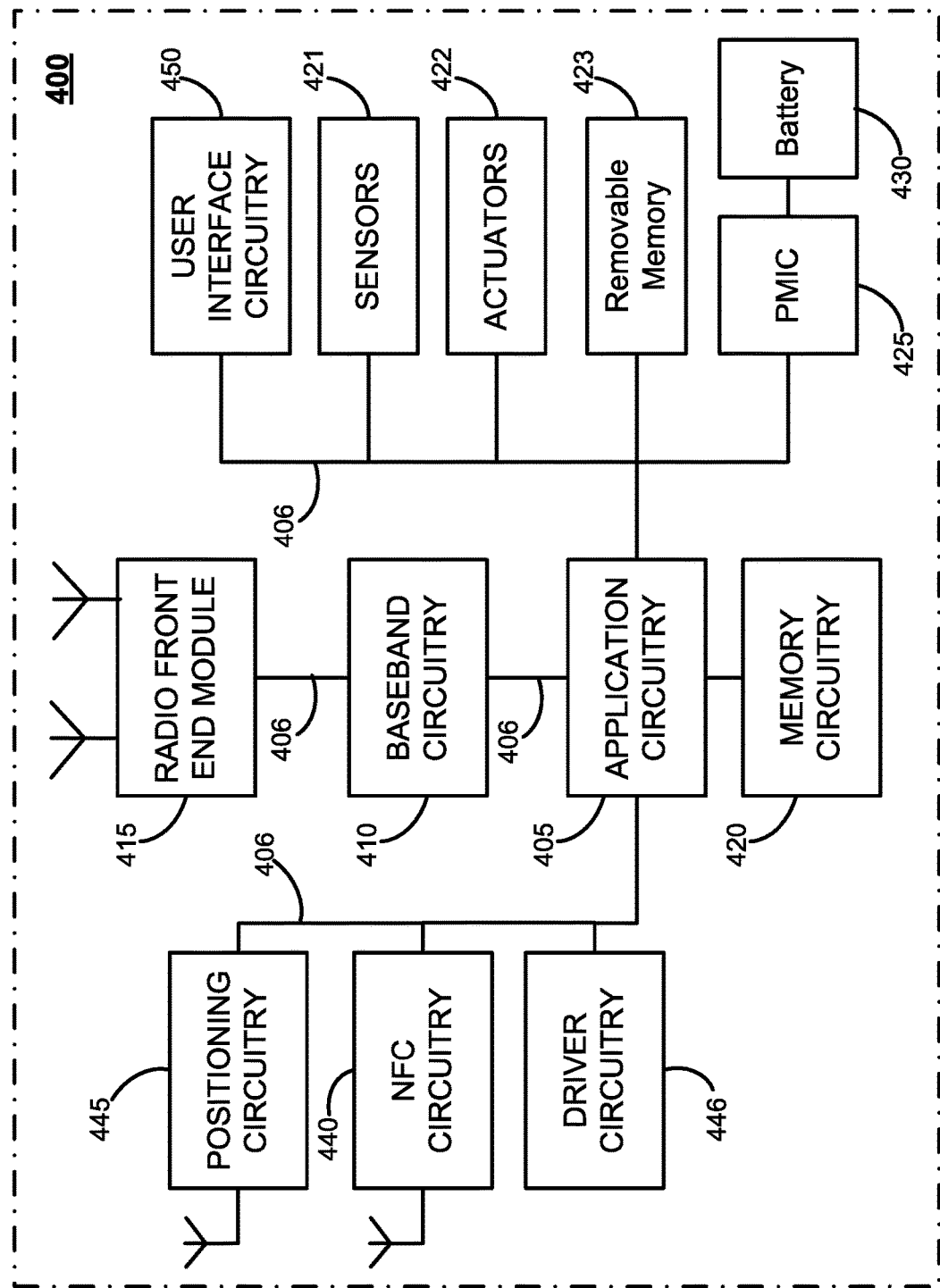
FIG. 4 depicts example components of a computer platform in accordance with various embodiments.

FIG. 4 illustrates an example of a platform 400 (or "device 400") in accordance with various embodiments. In embodiments, the computer platform 400 may be suitable for use as UEs 101, application servers 130, and/or any other element/device discussed herein. The platform 400 may include any combinations of the components shown in the example. The components of platform 400 may be implemented as integrated circuits (ICs), portions thereof, discrete electronic devices, or other modules, logic, hardware, software, firmware, or a combination thereof adapted in the computer platform 400, or as components otherwise incorporated within a chassis of a larger system. The block diagram of FIG. 4 is intended to show a high level view of components of the computer platform 400. However, some of the components shown may be omitted, additional components may be present, and different arrangement of the components shown may occur in other implementations.

Application circuitry 405 includes circuitry such as, but not limited to one or more processors (or processor cores), cache memory, and one or more of LDOs, interrupt controllers, serial interfaces such as SPI, I²C or universal programmable serial interface module, RTC, timer-counters including interval and watchdog timers, general purpose I/O, memory card controllers such as SD MMC or similar, USB interfaces, MIPI interfaces, and JTAG test access ports. The processors (or cores) of the application circuitry 405 may be coupled with or may include memory/storage elements and may be configured to execute instructions stored in the memory/storage to enable various applications or operating systems to run on the system 400. In some implementations, the memory/storage elements may be on-chip memory circuitry, which may include any suitable volatile and/or non-volatile memory, such as DRAM, SRAM, EPROM, EEPROM, Flash memory, solid-state memory, and/or any other type of memory device technology, such as those discussed herein.

The processor(s) of application circuitry 405 may include, for example, one or more processor cores, one or more application processors, one or more GPUs, one or more RISC processors, one or more ARM processors, one or more CISC processors, one or more DSP, one or more FPGAs, one or more PLDs, one or more ASICs, one or more microprocessors or controllers, a multithreaded processor, an ultra-low voltage processor, an embedded processor, some other known processing element, or any suitable combination thereof. The processors (or cores) of the application circuitry 405 may be coupled with or may include memory/storage and may be configured to execute instructions stored in the memory/storage to enable various applications or operating systems to run on the system 400. In these embodiments, the processors (or cores) of the application circuitry 405 are configured to operate application software to provide a specific service to a user of the system 400. In some embodiments, the application circuitry 405 may comprise, or may be, a special-purpose processor/controller to operate according to the various embodiments herein.

As examples, the processor(s) of application circuitry 405 may include an Intel® Architecture Core™ based processor, such as a Quark™, an Atom™, an i3, an i5, an i7, or an MCU-class processor, or another such processor available from Intel® Corporation, Santa Clara, CA. The processors of the application circuitry 405 may also be one or more of Advanced Micro Devices (AMD) Ryzen® processor(s) or Accelerated Processing Units (APUs); A5-A9 processor(s) from Apple® Inc., Snapdragon™ processor(s) from Qualcomm® Technologies, Inc., Texas Instruments, Inc.® Open Multimedia Applications Platform (OMAP)™ processor(s); a MIPS-based design from MIPS Technologies, Inc. such as MIPS Warrior M-class, Warrior I-class, and Warrior P-class processors; an ARM-based design licensed from ARM Holdings, Ltd., such as the ARM Cortex-A, Cortex-R, and Cortex-M family of processors; or the like. In some implementations, the application circuitry 405 may be a part of a system on a chip (SoC) in which the application circuitry 405 and other components are formed into a single integrated circuit, or a single package, such as the Edison™ or Galileo™ SoC boards from Intel® Corporation. Other examples of the processor circuitry of application circuitry 405 are mentioned elsewhere in the present disclosure.

Additionally or alternatively, application circuitry 405 may include circuitry such as, but not limited to, one or more a field-programmable devices (FPDs) such as FPGAs and the like; programmable logic devices (PLDs) such as complex PLDs (CPLDs), high-capacity PLDs (HCPLDs), and the like; ASICs such as structured ASICs and the like; programmable SoCs (PSoCs); and the like. In such embodiments, the circuitry of application circuitry 405 may comprise logic blocks or logic fabric, and other interconnected resources that may be programmed to perform various functions, such as the procedures, methods, functions, etc. of the various embodiments discussed herein. In such embodiments, the circuitry of application circuitry 405 may include memory cells (e.g., erasable programmable read-only memory (EPROM), electrically erasable programmable read-only memory (EEPROM), flash memory, static memory (e.g., static random access memory (SRAM), anti-fuses, etc.)) used to store logic blocks, logic fabric, data, etc. in look-up tables (LUTs) and the like.

The baseband circuitry 410 may be implemented, for example, as a solder-down substrate including one or more integrated circuits, a single packaged integrated circuit soldered to a main circuit board or a multi-chip module containing two or more integrated circuits. The baseband circuitry 410 may include circuitry such as, but not limited to, one or more single-core or multi-core processors (e.g., one or more baseband processors) or control logic to process baseband signals received from a receive signal path of the RFEMs 415, and to generate baseband signals to be provided to the RFEMs 415 via a transmit signal path. In various embodiments, the baseband circuitry 410 may implement a real-time OS (RTOS) to manage resources of the baseband circuitry 410, schedule tasks, etc. Examples of the RTOS may include Operating System Embedded (OSE)™ provided by Enea®, Nucleus RTOS™ provided by Mentor Graphics®, Versatile Real-Time Executive (VRTX) provided by Mentor Graphics®, ThreadX™ provided by Express Logic®, FreeRTOS, REX OS provided by Qualcomm®, OKL4 provided by Open Kernel (OK) Labs®, or any other suitable RTOS, such as those discussed herein. The various hardware electronic elements of baseband circuitry 410 are discussed infra with regard to FIG. 6.

The RFEMs 415 may comprise a millimeter wave (mmWave) RFEM and one or more sub-mmWave radio frequency integrated circuits (RFICs). In some implementations, the one or more sub-mmWave RFICs may be physically separated from the mmWave RFEM. The RFICs may include connections to one or more antennas or antenna arrays (see e.g., antenna array 611 of FIG. 6 infra), and the RFEM may be connected to multiple antennas. In alternative implementations, both mmWave and sub-mmWave radio functions may be implemented in the same physical RFEM 415, which incorporates both mmWave antennas and sub-mmWave.

The memory circuitry 420 may include any number and type of memory devices used to provide for a given amount of system memory. As examples, the memory circuitry 420 may include one or more of volatile memory including random access memory (RAM), dynamic RAM (DRAM) and/or synchronous dynamic RAM (SDRAM), and nonvolatile memory (NVM) including high-speed electrically erasable memory (commonly referred to as Flash memory), phase change random access memory (PRAM), magnetoresistive random access memory (MRAM), etc. The memory circuitry 420 may be developed in accordance with a Joint Electron Devices Engineering Council (JEDEC) low power double data rate (LPDDR)-based design, such as LPDDR2, LPDDR3, LPDDR4, or the like. Memory circuitry 420 may be implemented as one or more of solder down packaged integrated circuits, single die package (SDP), dual die package (DDP) or quad die package (Q17P), socketed memory modules, dual inline memory modules (DIMMs) including microDIMMs or MiniDIMMs, and/or soldered onto a motherboard via a ball grid array (BGA). In low power implementations, the memory circuitry 420 may be on-die memory or registers associated with the application circuitry 405. To provide for persistent storage of information such as data, applications, operating systems and so forth, memory circuitry 420 may include one or more mass storage devices, which may include, inter alia, a solid state disk drive (SSDD), hard disk drive (HDD), a micro HDD, resistance change memories, phase change memories, holographic memories, or chemical memories, among others. For example, the computer platform 400 may incorporate the three-dimensional (3D) cross-point (XPOINT) memories from Intel® and Micron®.

Removable memory circuitry 423 may include devices, circuitry, enclosures/housings, ports or receptacles, etc. used to couple portable data storage devices with the platform 400. These portable data storage devices may be used for mass storage purposes, and may include, for example, flash memory cards (e.g., Secure Digital (SD) cards, microSD cards, xD picture cards, and the like), and USB flash drives, optical discs, external HDDs, and the like.

In some implementations, the memory circuitry 420 and/or the removable memory 423 provide persistent storage of information such as data, applications, operating systems (OS), and so forth. The persistent storage circuitry is configured to store computational logic (or "modules") in the form of software, firmware, or hardware commands to implement the techniques described herein. The computational logic may be employed to store working copies and/or permanent copies of computer programs (or data to create the computer programs) for the operation of various components of platform 400 (e.g., drivers, etc.), an operating system of platform 400, one or more applications, and/or for carrying out the embodiments discussed herein. The computational logic may be stored or loaded into memory circuitry 420 as instructions (or data to create the instructions) for execution by the application circuitry 405 to provide the functions described herein. The various elements may be implemented by assembler instructions supported by processor circuitry or high-level languages that may be compiled into such instructions (or data to create the instructions). The permanent copy of the programming instructions may be placed into persistent storage devices of persistent storage circuitry in the factory or in the field through, for example, a distribution medium (not shown), through a communication interface (e.g., from a distribution server (not shown)), or OTA.

Figure 10:
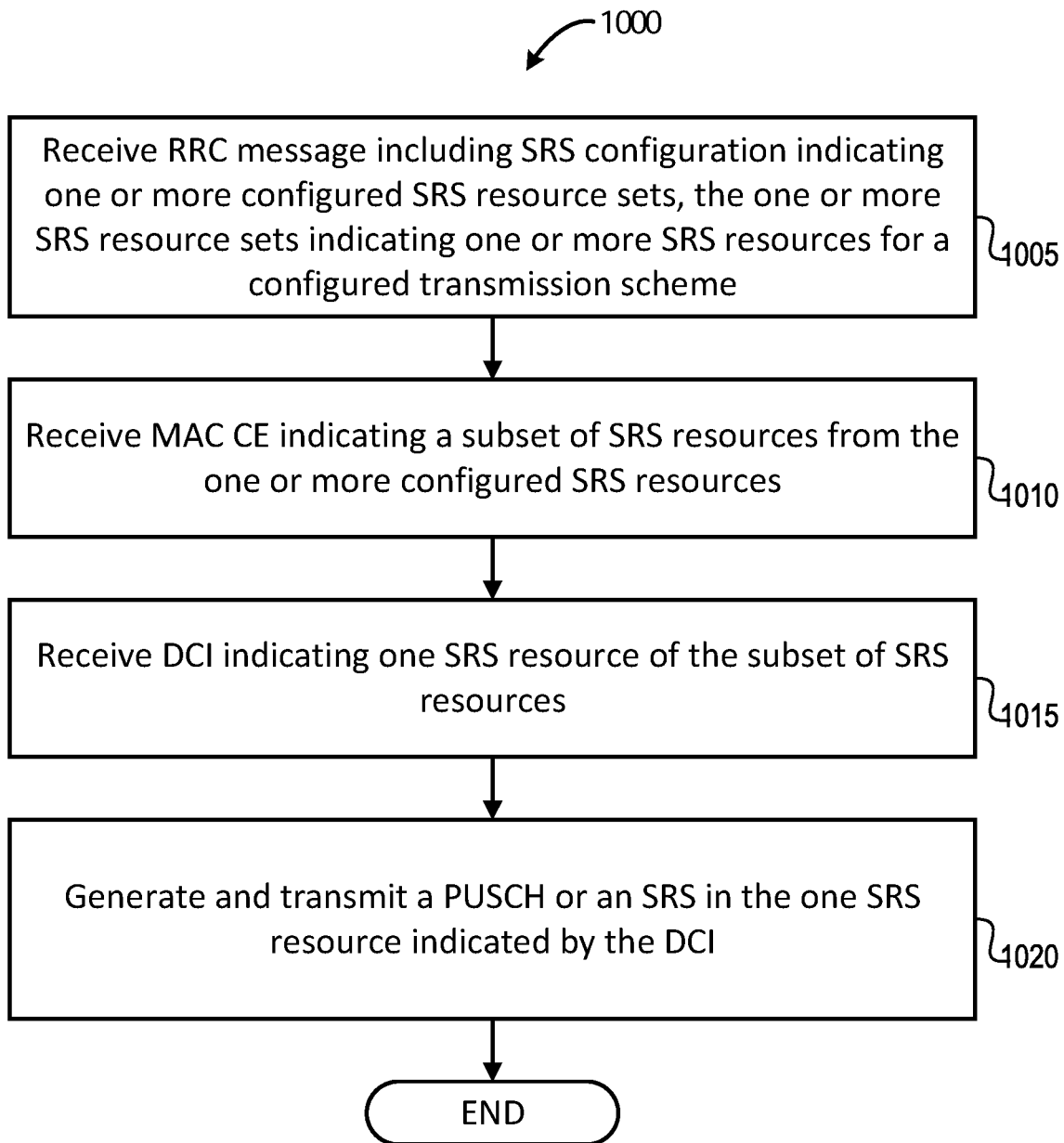
FIGS. 10-11 depict example processes for practicing the various embodiments discussed herein.
Figure 11:
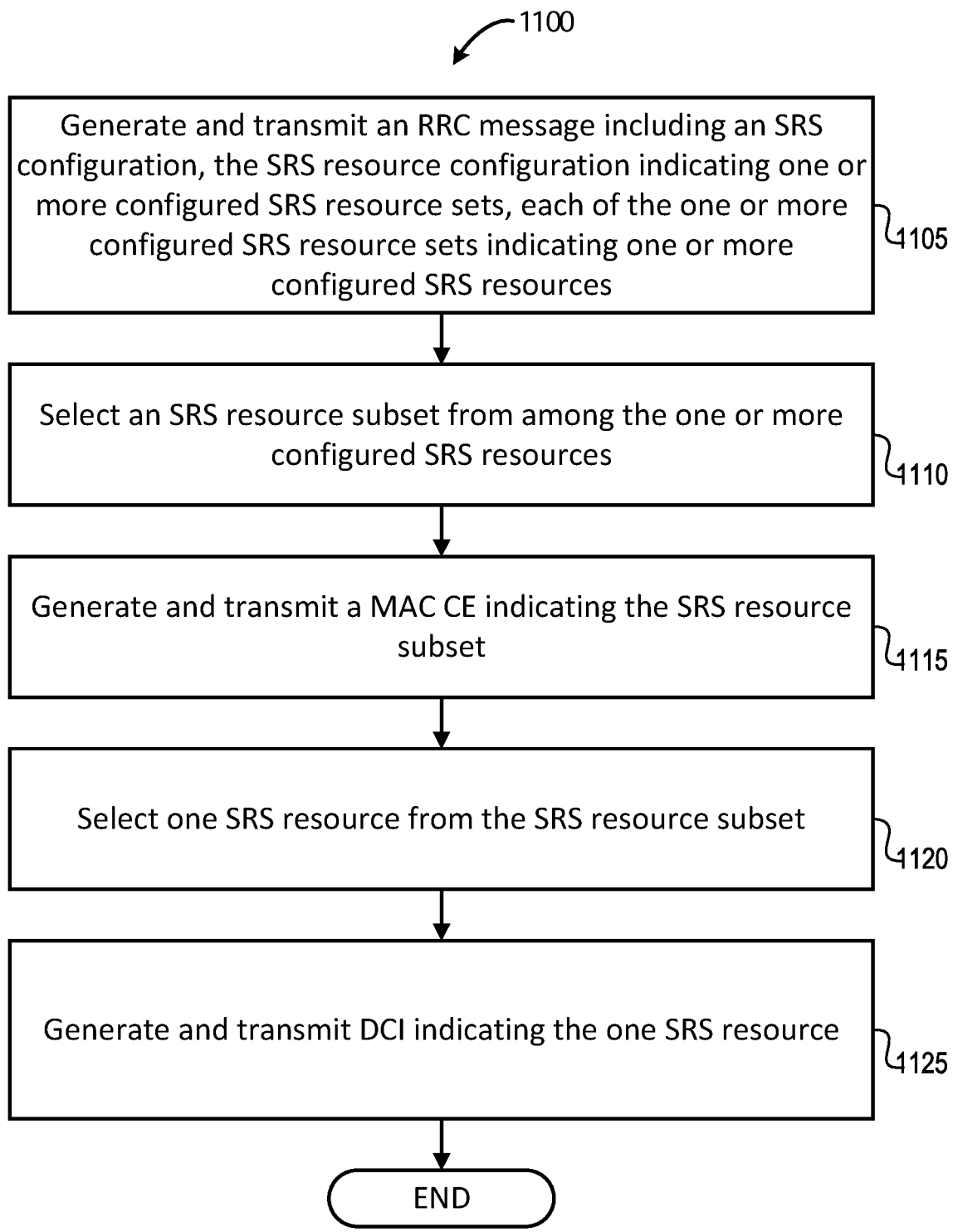

In an example, the instructions provided via the memory circuitry 420 and/or the persistent storage circuitry are embodied as one or more non-transitory computer readable storage media including program code, a computer program product (or data to create the computer program) with the computer program or data, to direct the application circuitry 405 of platform 400 to perform electronic operations in the platform 400, and/or to perform a specific sequence or flow of actions, for example, as described with respect to the flowchart(s) and block diagram(s) of operations and functionality depicted infra (see e.g., FIGS. 10-11). The application circuitry 405 accesses the one or more non-transitory computer readable storage media over the IX 406.

Although the instructions and/or computational logic have been described as code blocks included in the memory circuitry 420 and/or code blocks in the persistent storage circuitry, it should be understood that any of the code blocks may be replaced with hardwired circuits, for example, built into an FPGA, ASIC, or some other suitable circuitry. For example, where application circuitry 405 includes (e.g., FPGA based) hardware accelerators as well as processor cores, the hardware accelerators (e.g., the FPGA cells) may be pre-configured (e.g., with appropriate bit streams) with the aforementioned computational logic to perform some or all of the functions discussed previously (in lieu of employment of programming instructions to be executed by the processor core(s)).

The platform 400 may also include interface circuitry (not shown) that is used to connect external devices with the platform 400. The external devices connected to the platform 400 via the interface circuitry include sensor circuitry 421 and actuators 422, as well as removable memory devices coupled to removable memory circuitry 423.

The sensor circuitry 421 include devices, modules, or subsystems whose purpose is to detect events or changes in its environment and send the information (sensor data) about the detected events to some other a device, module, subsystem, etc. Examples of such sensors include, inter alia, inertia measurement units (IMUS) comprising accelerometers, gyroscopes, and/or magnetometers; microelectromechanical systems (MEMS) or nanoelectromechanical systems (NEMS) comprising 3-axis accelerometers, 3-axis gyroscopes, and/or magnetometers; level sensors; flow sensors; temperature sensors (e.g., thermistors); pressure sensors; barometric pressure sensors; gravimeters; altimeters; image capture devices (e.g., cameras or lensless apertures); light detection and ranging (LiDAR) sensors; proximity sensors (e.g., infrared radiation detector and the like), depth sensors, ambient light sensors, ultrasonic transceivers; microphones or other like audio capture devices; etc.

Actuators 422 include devices, modules, or subsystems whose purpose is to enable platform 400 to change its state, position, and/or orientation, or move or control a mechanism or (sub)system. The actuators 422 comprise electrical and/or mechanical devices for moving or controlling a mechanism or system, and converts energy (e.g., electric current or moving air and/or liquid) into some kind of motion. The actuators 422 may include one or more electronic (or electrochemical) devices, such as piezoelectric biomorphs, solid state actuators, solid state relays (SSRs), shape-memory alloy-based actuators, electroactive polymer-based actuators, relay driver integrated circuits (ICs), and/or the like. The actuators 422 may include one or more electromechanical devices such as pneumatic actuators, hydraulic actuators, electromechanical switches including electromechanical relays (EMRs), motors (e.g., DC motors, stepper motors, servomechanisms, etc.), wheels, thrusters, propellers, claws, clamps, hooks, an audible sound generator, and/or other like electromechanical components. The platform 1000 may be configured to operate one or more actuators 422 based on one or more captured events and/or instructions or control signals received from a service provider and/or various client systems.

In some implementations, the interface circuitry may connect the platform 400 with positioning circuitry 445. The positioning circuitry 445 includes circuitry to receive and decode signals transmitted/broadcasted by a positioning network of a GNSS. Examples of navigation satellite constellations (or GNSS) include United States' GPS, Russia's GLONASS, the European Union's Galileo system, China's BeiDou Navigation Satellite System, a regional navigation system or GNSS augmentation system (e.g., NAVIC), Japan's QZSS, France's DORIS, etc.), or the like. The positioning circuitry 445 comprises various hardware elements (e.g., including hardware devices such as switches, filters, amplifiers, antenna elements, and the like to facilitate OTA communications) to communicate with components of a positioning network, such as navigation satellite constellation nodes. In some embodiments, the positioning circuitry 445 may include a Micro-PNT IC that uses a master timing clock to perform position tracking/estimation without GNSS assistance. The positioning circuitry 445 may also be part of, or interact with, the baseband circuitry 410 and/or RFEMs 415 to communicate with the nodes and components of the positioning network. The positioning circuitry 445 may also provide position data and/or time data to the application circuitry 405, which may use the data to synchronize operations with various infrastructure (e.g., radio base stations), for turn-by-turn navigation applications, or the like In some implementations, the interface circuitry may connect the platform 400 with Near-Field Communication (NFC) circuitry 440. NFC circuitry 440 is configured to provide contactless, short-range communications based on radio frequency identification (RFID) standards, wherein magnetic field induction is used to enable communication between NFC circuitry 440 and NFC-enabled devices external to the platform 400 (e.g., an "NFC touchpoint"). NFC circuitry 440 comprises an NFC controller coupled with an antenna element and a processor coupled with the NFC controller. The NFC controller may be a chip/IC providing NFC functionalities to the NFC circuitry 440 by executing NFC controller firmware and an NFC stack. The NFC stack may be executed by the processor to control the NFC controller, and the NFC controller firmware may be executed by the NFC controller to control the antenna element to emit short-range RF signals. The RF signals may power a passive NFC tag (e.g., a microchip embedded in a sticker or wristband) to transmit stored data to the NFC circuitry 440, or initiate data transfer between the NFC circuitry 440 and another active NFC device (e.g., a smartphone or an NFC-enabled POS terminal) that is proximate to the platform 400.

The driver circuitry 446 may include software and hardware elements that operate to control particular devices that are embedded in the platform 400, attached to the platform 400, or otherwise communicatively coupled with the platform 400. The driver circuitry 446 may include individual drivers allowing other components of the platform 400 to interact with or control various input/output (I/O) devices that may be present within, or connected to, the platform 400. For example, driver circuitry 446 may include a display driver to control and allow access to a display device, a touchscreen driver to control and allow access to a touchscreen interface of the platform 400, sensor drivers to obtain sensor readings of sensor circuitry 421 and control and allow access to sensor circuitry 421, actuator drivers to obtain actuator positions of the actuators 422 and/or control and allow access to the actuators 422, a camera driver to control and allow access to an embedded image capture device, audio drivers to control and allow access to one or more audio devices.

The PMIC 425 (also referred to as "power management circuitry 425") may manage power provided to various components of the platform 400. In particular, with respect to the baseband circuitry 410, the PMIC 425 may control power-source selection, voltage scaling, battery charging, or DC-to-DC conversion. The PMIC 425 may often be included when the platform 400 is capable of being powered by a battery 430, for example, when the device is included in a UE 101.

In some embodiments, the PMIC 425 may control, or otherwise be part of, various power saving mechanisms of the platform 400. For example, if the platform 400 is in an RRC Connected state, where it is still connected to the RAN node as it expects to receive traffic shortly, then it may enter a state known as DRX after a period of inactivity. During this state, the platform 400 may power down for brief intervals of time and thus save power. If there is no data traffic activity for an extended period of time, then the platform 400 may transition off to an RRC Idle state, where it disconnects from the network and does not perform operations such as channel quality feedback, handover, etc. The platform 400 goes into a very low power state and it performs paging where again it periodically wakes up to listen to the network and then powers down again. The platform 400 may not receive data in this state; in order to receive data, it must transition back to RRC Connected state. An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

A battery 430 may power the platform 400, although in some examples the platform 400 may be mounted deployed in a fixed location, and may have a power supply coupled to an electrical grid. The battery 430 may be a lithium ion battery, a metal-air battery, such as a zinc-air battery, an aluminum-air battery, a lithium-air battery, and the like. In some implementations, such as in V2X applications, the battery 430 may be a typical lead-acid automotive battery.

In some implementations, the battery 430 may be a "smart battery," which includes or is coupled with a Battery Management System (BMS) or battery monitoring integrated circuitry. The BMS may be included in the platform 400 to track the state of charge (SoCh) of the battery 430. The BMS may be used to monitor other parameters of the battery 430 to provide failure predictions, such as the state of health (SoH) and the state of function (SoF) of the battery 430. The BMS may communicate the information of the battery 430 to the application circuitry 405 or other components of the platform 400. The BMS may also include an analog-to-digital (ADC) convertor that allows the application circuitry 405 to directly monitor the voltage of the battery 430 or the current flow from the battery 430. The battery parameters may be used to determine actions that the platform 400 may perform, such as transmission frequency, network operation, sensing frequency, and the like.

A power block, or other power supply coupled to an electrical grid may be coupled with the BMS to charge the battery 430. In some examples, the power block XS30 may be replaced with a wireless power receiver to obtain the power wirelessly, for example, through a loop antenna in the computer platform 400. In these examples, a wireless battery charging circuit may be included in the BMS. The specific charging circuits chosen may depend on the size of the battery 430, and thus, the current required. The charging may be performed using the Airfuel standard promulgated by the Airfuel Alliance, the Qi wireless charging standard promulgated by the Wireless Power Consortium, or the Rezence charging standard promulgated by the Alliance for Wireless Power, among others.

User interface circuitry 450 includes various input/output (I/O) devices present within, or connected to, the platform 400, and includes one or more user interfaces designed to enable user interaction with the platform 400 and/or peripheral component interfaces designed to enable peripheral component interaction with the platform 400. The user interface circuitry 450 includes input device circuitry and output device circuitry. Input device circuitry includes any physical or virtual means for accepting an input including, inter alia, one or more physical or virtual buttons (e.g., a reset button), a physical keyboard, keypad, mouse, touchpad, touchscreen, microphones, scanner, headset, and/or the like. The output device circuitry includes any physical or virtual means for showing information or otherwise conveying information, such as sensor readings, actuator position(s), or other like information. Output device circuitry may include any number and/or combinations of audio or visual display, including, inter alia, one or more simple visual outputs/indicators (e.g., binary status indicators (e.g., light emitting diodes (LEDs)) and multi-character visual outputs, or more complex outputs such as display devices or touchscreens (e.g., Liquid Chrystal Displays (LCD), LED displays, quantum dot displays, projectors, etc.), with the output of characters, graphics, multimedia objects, and the like being generated or produced from the operation of the platform 400. The output device circuitry may also include speakers or other audio emitting devices, printer(s), and/or the like. In some embodiments, the sensor circuitry 421 may be used as the input device circuitry (e.g., an image capture device, motion capture device, or the like) and one or more actuators 422 may be used as the output device circuitry (e.g., an actuator to provide haptic feedback or the like). In another example, NFC circuitry comprising an NFC controller coupled with an antenna element and a processing device may be included to read electronic tags and/or connect with another NFC-enabled device. Peripheral component interfaces may include, but are not limited to, a non-volatile memory port, a USB port, an audio jack, a power supply interface, etc.

The components shown by FIG. 4 communicate with one another using interface circuitry, which may include interconnect (IX) 406. The IX 406 may include any number of bus and/or IX technologies such as ISA, EISA, I²C, SPI, point-to-point interfaces, PMBus, PCI) PCIe, Intel® UPI, IAL, CAPI, Intel® QPI, UPI, Intel® OPA IX, RapidIO™ system IXs, CCIA, Gen-Z Consortium IXs, OpenCAPI IX, a HyperTransport interconnect, Time-Trigger Protocol (TTP) system, a FlexRay system, and/or any number of other IX technologies. The IX technology may be a proprietary bus, for example, used in an SoC based system.

Figure 5:
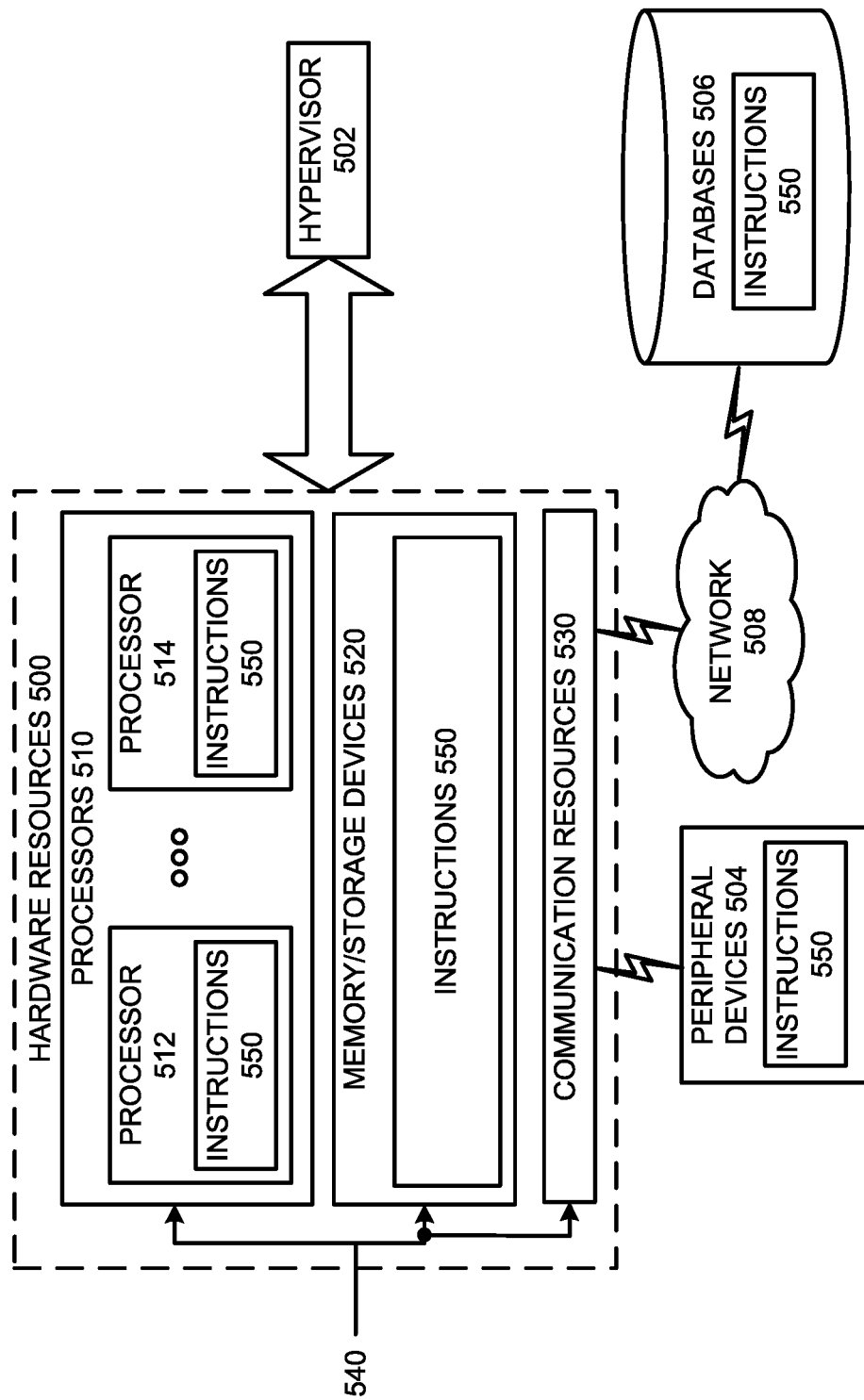
FIG. 5 depicts a block diagram illustrating components, according to some example embodiments, able to read instructions from a machine-readable or computer-readable medium (e.g., a non-transitory machine-readable storage medium) and perform any one or more of the methodologies discussed herein.

FIG. 5 illustrates components, according to some example embodiments, able to read instructions from a machine-readable or computer-readable medium (e.g., a non-transitory machine-readable storage medium) and perform any one or more of the methodologies discussed herein. Specifically, FIG. 5 shows a diagrammatic representation of hardware resources 500 including one or more processors (or processor cores) 510, one or more memory/storage devices 520, and one or more communication resources 530, each of which may be communicatively coupled via a bus 540. For embodiments where node virtualization (e.g., NFV) is utilized, a hypervisor 502 may be executed to provide an execution environment for one or more network slices/sub-slices to utilize the hardware resources 500.

The processors 510 may include, for example, a processor 512 and a processor 514. The processor(s) 510 may be, for example, a CPU, a reduced instruction set computing (RISC) processor, a CISC processor, a GPU, a DSP such as a baseband processor, an ASIC, an FPGA, a RFIC, another processor (including those discussed herein), or any suitable combination thereof. The memory/storage devices 520 may include main memory, disk storage, or any suitable combination thereof. The memory/storage devices 520 may include, but are not limited to, any type of volatile or nonvolatile memory such as DRAM, SRAM, EPROM, EEPROM, Flash memory, solid-state storage, etc.

The communication resources 530 may include interconnection or network interface components or other suitable devices to communicate with one or more peripheral devices 504 or one or more databases 506 via a network 508. In embodiments, the network 508 may correspond to the DN/DNN 130 and/or CN 120 of FIG. 1. For example, the communication resources 530 may include wired communication components (e.g., for coupling via USB), cellular communication components, NFC components, Bluetooth® (or Bluetooth® Low Energy) components, Wi-Fi® components, and other communication components, such as those discussed herein.

Instructions 550 may comprise software, a program, an application, an applet, an app, or other executable code for causing at least any of the processors 510 to perform any one or more of the methodologies discussed herein. The instructions 550 may reside, completely or partially, within at least one of the processors 510 (e.g., within the processor's cache memory), the memory/storage devices 520, or any suitable combination thereof. Furthermore, any portion of the instructions 550 may be transferred to the hardware resources 500 from any combination of the peripheral devices 504 or the databases 506. Accordingly, the memory of processors 510, the memory/storage devices 520, the peripheral devices 504, and the databases 506 are examples of computer-readable and machine-readable media.

Figure 6:
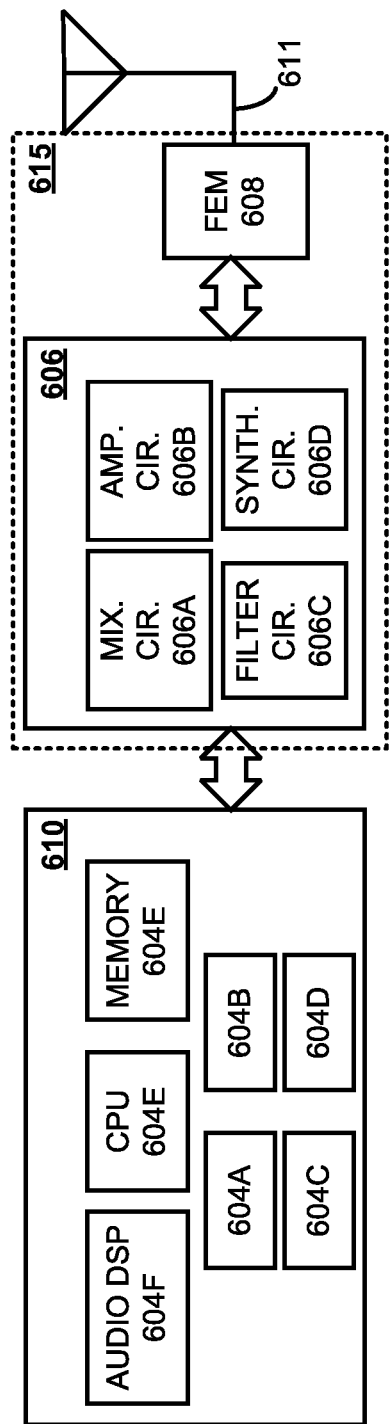
FIG. 6 depicts example components of baseband circuitry and radio frequency circuitry in accordance with various embodiments.

FIG. 6 illustrates example components of baseband circuitry 610 and radio front end modules (RFEM) 615 in accordance with various embodiments. The baseband circuitry 610 corresponds to the baseband circuitry 310 and 410 of FIGS. 3 and 4, respectively. The RFEM 615 corresponds to the RFEM 315 and 415 of FIGS. 3 and 4, respectively. As shown, the RFEMs 615 may include Radio Frequency (RF) circuitry 606, front-end module (FEM) circuitry 608, antenna array 611 coupled together at least as shown.

The baseband circuitry 610 includes circuitry and/or control logic configured to carry out various radio/network protocol and radio control functions that enable communication with one or more radio networks via the RF circuitry 606. The radio control functions may include, but are not limited to, signal modulation/demodulation, encoding/decoding, radio frequency shifting, etc. In some embodiments, modulation/demodulation circuitry of the baseband circuitry 610 may include Fast-Fourier Transform (FFT), precoding, or constellation mapping/demapping functionality. In some embodiments, encoding/decoding circuitry of the baseband circuitry 610 may include convolution, tail-biting convolution, turbo, Viterbi, LDPC, and/or polar code encoder/decoder functionality. Embodiments of modulation/demodulation and encoder/decoder functionality are not limited to these examples and may include other suitable functionality in other embodiments. The baseband circuitry 610 is configured to process baseband signals received from a receive signal path of the RF circuitry 606 and to generate baseband signals for a transmit signal path of the RF circuitry 606. The baseband circuitry 610 is configured to interface with application circuitry 305/405 (see FIGS. 3 and 4) for generation and processing of the baseband signals and for controlling operations of the RF circuitry 606. The baseband circuitry 610 may handle various radio control functions.

The aforementioned circuitry and/or control logic of the baseband circuitry 610 may include one or more single or multi-core processors. For example, the one or more processors may include a 3G baseband processor 604A, a 4G/LTE baseband processor 604B, a 5G/NR baseband processor 604C, or some other baseband processor(s) 604D for other existing generations, generations in development or to be developed in the future (e.g., 6G, etc.). In other embodiments, some or all of the functionality of baseband processors 604A-D may be included in modules stored in the memory 604G and executed via a CPU 604E. In other embodiments, some or all of the functionality of baseband processors 604A-D may be provided as hardware accelerators (e.g., FPGAs, ASICs, etc.) loaded with the appropriate bit streams or logic blocks stored in respective memory cells. In various embodiments, the memory 604G may store program code of a real-time OS (RTOS), which when executed by the CPU 604E (or other baseband processor), is to cause the CPU 604E (or other baseband processor) to manage resources of the baseband circuitry 610, schedule tasks, etc. Examples of the RTOS may include Operating System Embedded (OSE)™ provided by Enea®, Nucleus RTOS™ provided by Mentor Graphics®, Versatile Real-Time Executive (VRTX) provided by Mentor Graphics®, ThreadX™ provided by Express Logic®, FreeRTOS, REX OS provided by Qualcomm®, OKL4 provided by Open Kernel (OK) Labs®, or any other suitable RTOS, such as those discussed herein. In addition, the baseband circuitry 610 includes one or more audio DSPs 604F. The audio DSP(s) 604F include elements for compression/decompression and echo cancellation and may include other suitable processing elements in other embodiments.

In some embodiments, each of the processors 604A-604E include respective memory interfaces to send/receive data to/from the memory 604G. The baseband circuitry 610 may further include one or more interfaces to communicatively couple to other circuitries/devices, such as an interface to send/receive data to/from memory external to the baseband circuitry 610; an application circuitry interface to send/receive data to/from the application circuitry 305/405 of FIGS. 3 and 4); an RF circuitry interface to send/receive data to/from RF circuitry 606 of FIG. 6; a wireless hardware connectivity interface to send/receive data to/from one or more wireless hardware elements (e.g., NFC components, Bluetooth®/Bluetooth® Low Energy components, Wi-Fi® components, and/or the like); and a power management interface to send/receive power or control signals to/from the PMIC 425.

In alternate embodiments (which may be combined with the above described embodiments), baseband circuitry 610 comprises one or more digital baseband systems, which are coupled with one another via an interconnect subsystem and to a CPU subsystem, an audio subsystem, and an interface subsystem. The digital baseband subsystems may also be coupled to a digital baseband interface and a mixed-signal baseband subsystem via another interconnect subsystem. Each of the interconnect subsystems may include a bus system, point-to-point connections, network-on-chip (NOC) structures, and/or some other suitable bus or interconnect technology, such as those discussed herein. The audio subsystem may include DSP circuitry, buffer memory, program memory, speech processing accelerator circuitry, data converter circuitry such as analog-to-digital and digital-to-analog converter circuitry, analog circuitry including one or more of amplifiers and filters, and/or other like components. In an aspect of the present disclosure, baseband circuitry 610 may include protocol processing circuitry with one or more instances of control circuitry (not shown) to provide control functions for the digital baseband circuitry and/or radio frequency circuitry (e.g., the radio front end modules 615).

Although not shown by FIG. 6, in some embodiments, the baseband circuitry 610 includes individual processing device(s) to operate one or more wireless communication protocols (e.g., a "multi-protocol baseband processor" or "protocol processing circuitry") and individual processing device(s) to implement PHY layer functions. In these embodiments, the PHY layer functions include the aforementioned radio control functions. In these embodiments, the protocol processing circuitry operates or implements various protocol layers/entities of one or more wireless communication protocols. In a first example, the protocol processing circuitry may operate LTE protocol entities and/or 5G/NR protocol entities when the baseband circuitry 610 and/or RF circuitry 606 are part of mmWave communication circuitry or some other suitable cellular communication circuitry. In the first example, the protocol processing circuitry would operate MAC, RLC, PDCP, SDAP, RRC, and NAS functions. In a second example, the protocol processing circuitry may operate one or more IEEE-based protocols when the baseband circuitry 610 and/or RF circuitry 606 are part of a Wi-Fi communication system. In the second example, the protocol processing circuitry would operate Wi-Fi MAC and logical link control (LLC) functions. The protocol processing circuitry may include one or more memory structures (e.g., 604G) to store program code and data for operating the protocol functions, as well as one or more processing cores to execute the program code and perform various operations using the data. The baseband circuitry 610 may also support radio communications for more than one wireless protocol.

The various hardware elements of the baseband circuitry 610 discussed herein may be implemented, for example, as a solder-down substrate including one or more integrated circuits (ICs), a single packaged IC soldered to a main circuit board or a multi-chip module containing two or more ICs. In one example, the components of the baseband circuitry 610 may be suitably combined in a single chip or chipset, or disposed on a same circuit board. In another example, some or all of the constituent components of the baseband circuitry 610 and RF circuitry 606 may be implemented together such as, for example, a system on a chip (SoC) or System-in-Package (SiP). In another example, some or all of the constituent components of the baseband circuitry 610 may be implemented as a separate SoC that is communicatively coupled with and RF circuitry 606 (or multiple instances of RF circuitry 606). In yet another example, some or all of the constituent components of the baseband circuitry 610 and the application circuitry 305/405 may be implemented together as individual SoCs mounted to a same circuit board (e.g., a "multi-chip package").

In some embodiments, the baseband circuitry 610 may provide for communication compatible with one or more radio technologies. For example, in some embodiments, the baseband circuitry 610 may support communication with an E-UTRAN or other WMAN, a WLAN, a WPAN. Embodiments in which the baseband circuitry 610 is configured to support radio communications of more than one wireless protocol may be referred to as multi-mode baseband circuitry.

RF circuitry 606 may enable communication with wireless networks using modulated electromagnetic radiation through a non-solid medium. In various embodiments, the RF circuitry 606 may include switches, filters, amplifiers, etc. to facilitate the communication with the wireless network. RF circuitry 606 may include a receive signal path, which may include circuitry to down-convert RF signals received from the FEM circuitry 608 and provide baseband signals to the baseband circuitry 610. RF circuitry 606 may also include a transmit signal path, which may include circuitry to up-convert baseband signals provided by the baseband circuitry 610 and provide RF output signals to the FEM circuitry 608 for transmission.

In some embodiments, the receive signal path of the RF circuitry 606 may include mixer circuitry 606a, amplifier circuitry 606b and filter circuitry 606c. In some embodiments, the transmit signal path of the RF circuitry 606 may include filter circuitry 606c and mixer circuitry 606a. RF circuitry 606 may also include synthesizer circuitry 606d for synthesizing a frequency for use by the mixer circuitry 606a of the receive signal path and the transmit signal path. In some embodiments, the mixer circuitry 606a of the receive signal path may be configured to down-convert RF signals received from the FEM circuitry 608 based on the synthesized frequency provided by synthesizer circuitry 606d. The amplifier circuitry 606b may be configured to amplify the down-converted signals and the filter circuitry 606c may be a low-pass filter (LPF) or band-pass filter (BPF) configured to remove unwanted signals from the down-converted signals to generate output baseband signals. Output baseband signals may be provided to the baseband circuitry 610 for further processing. In some embodiments, the output baseband signals may be zero-frequency baseband signals, although this is not a requirement. In some embodiments, mixer circuitry 606a of the receive signal path may comprise passive mixers, although the scope of the embodiments is not limited in this respect.

In some embodiments, the mixer circuitry 606a of the transmit signal path may be configured to up-convert input baseband signals based on the synthesized frequency provided by the synthesizer circuitry 606d to generate RF output signals for the FEM circuitry 608. The baseband signals may be provided by the baseband circuitry 610 and may be filtered by filter circuitry 606c.

In some embodiments, the mixer circuitry 606a of the receive signal path and the mixer circuitry 606a of the transmit signal path may include two or more mixers and may be arranged for quadrature downconversion and upconversion, respectively. In some embodiments, the mixer circuitry 606a of the receive signal path and the mixer circuitry 606a of the transmit signal path may include two or more mixers and may be arranged for image rejection (e.g., Hartley image rejection). In some embodiments, the mixer circuitry 606a of the receive signal path and the mixer circuitry 606a of the transmit signal path may be arranged for direct downconversion and direct upconversion, respectively. In some embodiments, the mixer circuitry 606a of the receive signal path and the mixer circuitry 606a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 606 may include analog-to-digital converter (ADC) and digital-to-analog converter (DAC) circuitry and the baseband circuitry 610 may include a digital baseband interface to communicate with the RF circuitry 606.

In some dual-mode embodiments, a separate radio IC circuitry may be provided for processing signals for each spectrum, although the scope of the embodiments is not limited in this respect.

In some embodiments, the synthesizer circuitry 606d may be a fractional-N synthesizer or a fractional N/N+1 synthesizer, although the scope of the embodiments is not limited in this respect as other types of frequency synthesizers may be suitable. For example, synthesizer circuitry 606d may be a delta-sigma synthesizer, a frequency multiplier, or a synthesizer comprising a phase-locked loop with a frequency divider.

The synthesizer circuitry 606d may be configured to synthesize an output frequency for use by the mixer circuitry 606a of the RF circuitry 606 based on a frequency input and a divider control input. In some embodiments, the synthesizer circuitry 606d may be a fractional N/N+1 synthesizer.

In some embodiments, frequency input may be provided by a voltage controlled oscillator (VCO), although that is not a requirement. Divider control input may be provided by either the baseband circuitry 610 or the application circuitry 305/405 depending on the desired output frequency. In some embodiments, a divider control input (e.g., N) may be determined from a look-up table based on a channel indicated by the application circuitry 305/405.

Synthesizer circuitry 606d of the RF circuitry 606 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 606d may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 606 may include an IQ/polar converter.

FEM circuitry 608 may include a receive signal path, which may include circuitry configured to operate on RF signals received from antenna array 611, amplify the received signals and provide the amplified versions of the received signals to the RF circuitry 606 for further processing. FEM circuitry 608 may also include a transmit signal path, which may include circuitry configured to amplify signals for transmission provided by the RF circuitry 606 for transmission by one or more of antenna elements of antenna array 611. In various embodiments, the amplification through the transmit or receive signal paths may be done solely in the RF circuitry 606, solely in the FEM circuitry 608, or in both the RF circuitry 606 and the FEM circuitry 608.

In some embodiments, the FEM circuitry 608 may include a TX/RX switch to switch between transmit mode and receive mode operation. The FEM circuitry 608 may include a receive signal path and a transmit signal path. The receive signal path of the FEM circuitry 608 may include an LNA to amplify received RF signals and provide the amplified received RF signals as an output (e.g., to the RF circuitry 606). The transmit signal path of the FEM circuitry 608 may include a power amplifier (PA) to amplify input RF signals (e.g., provided by RF circuitry 606), and one or more filters to generate RF signals for subsequent transmission by one or more antenna elements of the antenna array 611.

The antenna array 611 comprises one or more antenna elements, each of which is configured convert electrical signals into radio waves to travel through the air and to convert received radio waves into electrical signals. For example, digital baseband signals provided by the baseband circuitry 610 is converted into analog RF signals (e.g., modulated waveform) that will be amplified and transmitted via the antenna elements of the antenna array 611 including one or more antenna elements (not shown). The antenna elements may be omnidirectional, direction, or a combination thereof. The antenna elements may be formed in a multitude of arranges as are known and/or discussed herein. The antenna array 611 may comprise microstrip antennas or printed antennas that are fabricated on the surface of one or more printed circuit boards. The antenna array 611 may be formed in as a patch of metal foil (e.g., a patch antenna) in a variety of shapes, and may be coupled with the RF circuitry 606 and/or FEM circuitry 608 using metal transmission lines or the like.

Processors of the application circuitry 305/405 and processors of the baseband circuitry 610 may be used to execute elements of one or more instances of a protocol stack. For example, processors of the baseband circuitry 610, alone or in combination, may be used execute Layer 3, Layer 2, or Layer 1 functionality, while processors of the application circuitry 305/405 may utilize data (e.g., packet data) received from these layers and further execute Layer 4 functionality (e.g., TCP and UDP layers). As referred to herein, Layer 3 may comprise a RRC layer, described in further detail below. As referred to herein, Layer 2 may comprise a MAC layer, an RLC layer, and a PDCP layer, described in further detail below. As referred to herein, Layer 1 may comprise a PHY layer of a UE/RAN node, described in further detail infra.

Figure 7:
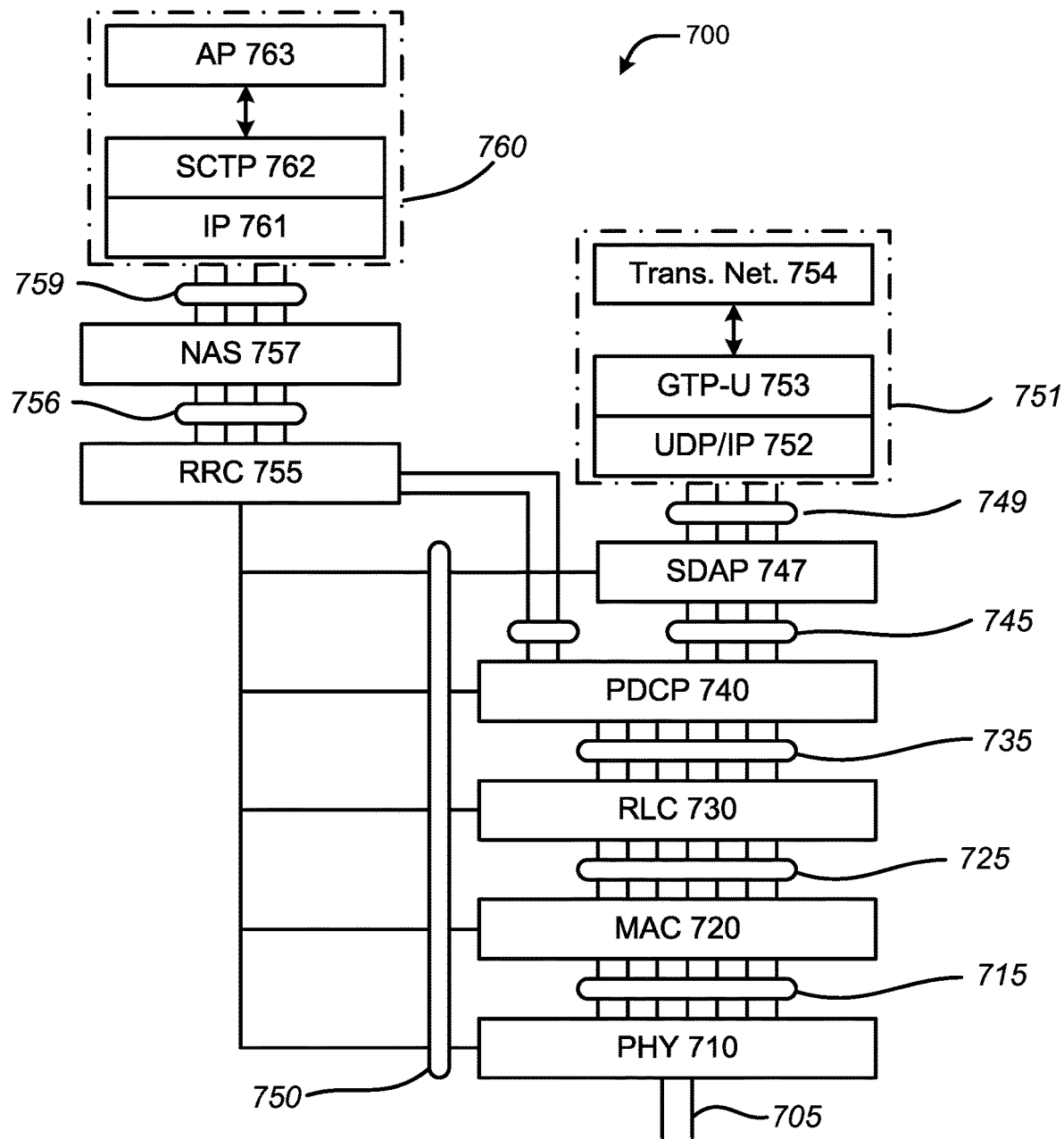
FIG. 7 is an illustration of various protocol functions that may be used for various protocol stacks in accordance with various embodiments.

FIG. 7 illustrates various protocol functions that may be implemented in a wireless communication device according to various embodiments. In particular, FIG. 7 includes an arrangement 700 showing interconnections between various protocol layers/entities. The following description of FIG. 7 is provided for various protocol layers/entities that operate in conjunction with the 5G/NR system standards and LTE system standards, but some or all of the aspects of FIG. 7 may be applicable to other wireless communication network systems as well.

The protocol layers of arrangement 700 may include one or more of PHY 710, MAC 720, RLC 730, PDCP 740, SDAP 747, RRC 755, and NAS layer 757, in addition to other higher layer functions not illustrated. The protocol layers may include one or more service access points (e.g., items 1159, 1156, 750, 749, 745, 735, 725, and 715 in FIG. 7) that may provide communication between two or more protocol layers.

The PHY 710 may transmit and receive physical layer signals 705 that may be received from or transmitted to one or more other communication devices. The physical layer signals 705 may comprise one or more physical channels, such as those discussed herein. The PHY 710 may further perform link adaptation or adaptive modulation and coding (AMC), power control, cell search (e.g., for initial synchronization and handover purposes), and other measurements used by higher layers, such as the RRC 755. The PHY 710 may still further perform error detection on the transport channels, forward error correction (FEC) coding/decoding of the transport channels, modulation/demodulation of physical channels, interleaving, rate matching, mapping onto physical channels, and MIMO antenna processing. In embodiments, an instance of PHY 710 may process requests from and provide indications to an instance of MAC 720 via one or more PHY-SAP 715. According to some embodiments, requests and indications communicated via PHY-SAP 715 may comprise one or more transport channels.

Instance(s) of MAC 720 may process requests from, and provide indications to, an instance of RLC 730 via one or more MAC-SAPs 725. These requests and indications communicated via the MAC-SAP 725 may comprise one or more logical channels. The MAC 720 may perform mapping between the logical channels and transport channels, multiplexing of MAC SDUs from one or more logical channels onto TBs to be delivered to PHY 710 via the transport channels, de-multiplexing MAC SDUs to one or more logical channels from TBs delivered from the PHY 710 via transport channels, multiplexing MAC SDUs onto TBs, scheduling information reporting, error correction through HARQ, and logical channel prioritization.

The MAC 720 conveys MAC PDUs and/or MAC SDUs to upper and/or lower layers. A MAC PDU includes one or more MAC subPDUs, where each MAC subPDU includes a MAC subheader only (with or without padding), a MAC subheader and a MAC SDU, or a MAC subheader and MAC CE. Each MAC subheader corresponds to either a MAC SDU, a MAC CE, or padding. A MAC subheader except for fixed sized MAC CE, padding, and a MAC SDU containing UL CCCH includes four header fields R/F/LCID/L as shown by MAC subheaders 801, 802, and 803 of FIG. 8.

Figure 8:
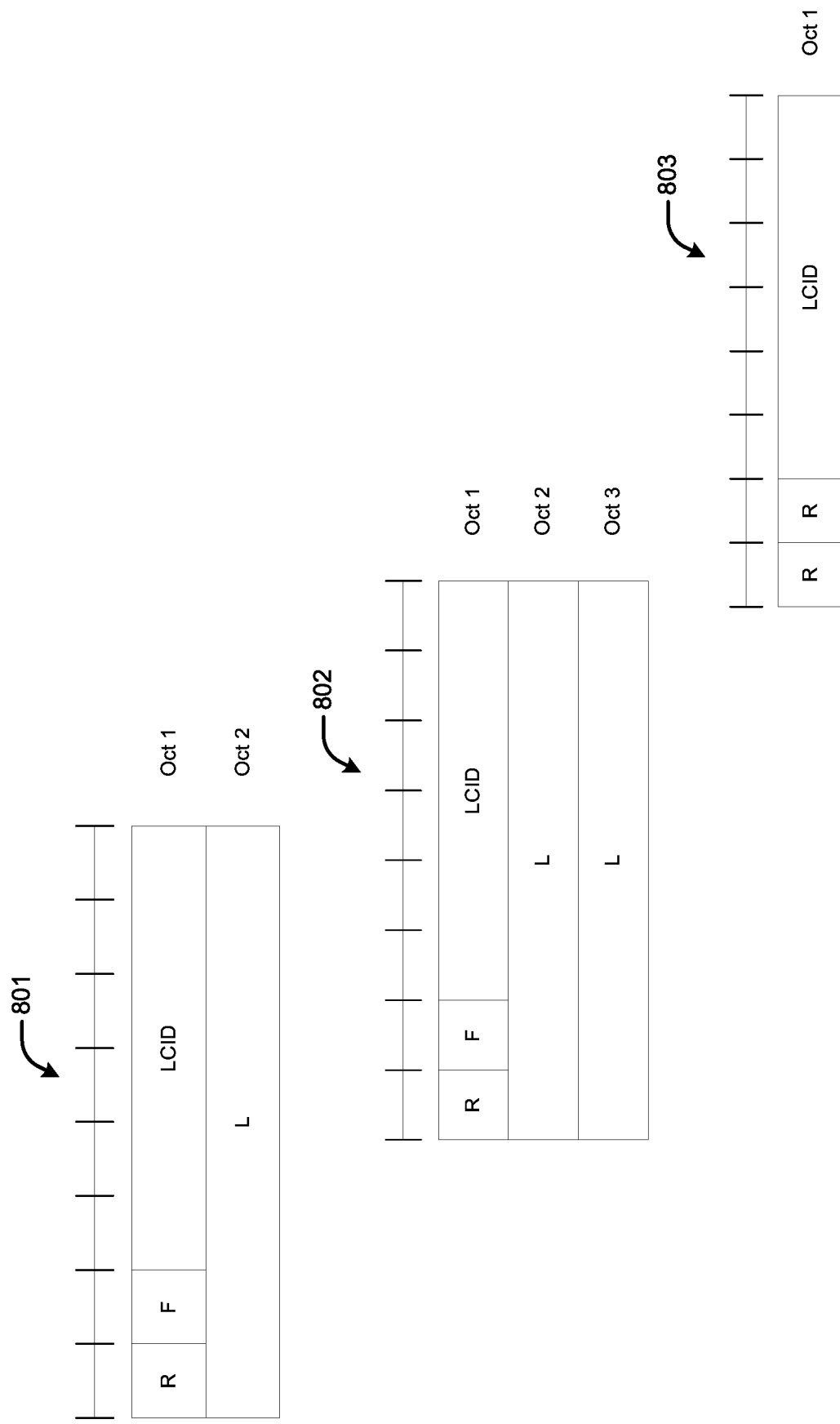
FIG. 8 depicts example MAC subheaders according to various embodiments.
Figure 9:
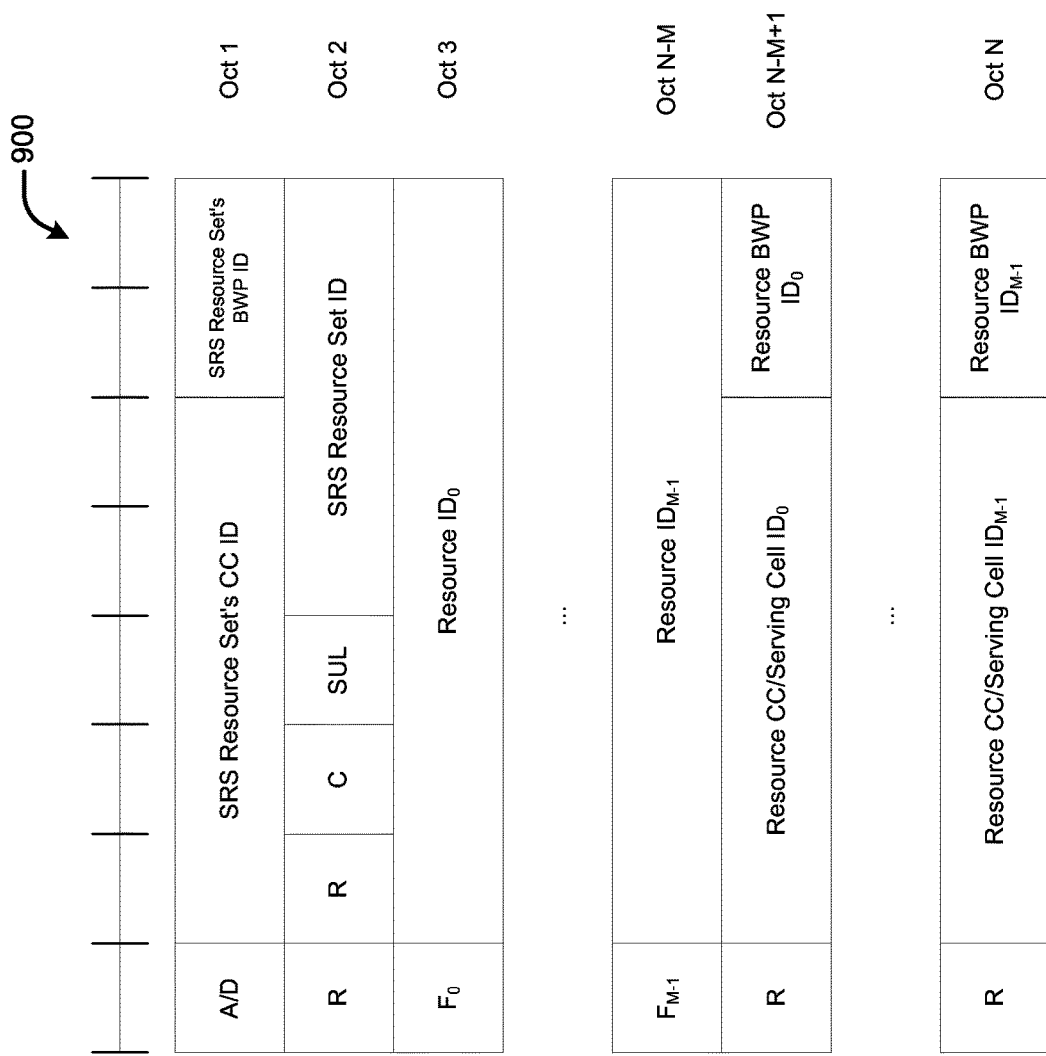
FIG. 9 depicts an example SRS beam Activation/Deactivation MAC CE according to various embodiments

A MAC PDU is a bit string that is byte aligned (e.g., multiple of 8 bits) in length. In FIGS. 8-10, bit strings are represented by tables in which the most significant bit is the leftmost bit of the first line of the table, the least significant bit is the rightmost bit on the last line of the table, and more generally the bit string is to be read from left to right and then in the reading order of the lines. The bit order of each parameter field within a MAC PDU is represented with the first and most significant bit in the leftmost bit and the last and least significant bit in the rightmost bit. A MAC CE is a bit string that is byte aligned (e.g., multiple of 8 bits) in length.

FIG. 8 shows example MAC subheaders 801, 802, and 803 according to various embodiments. In FIG. 8, MAC subheader 801 is an R/F/LCID/L MAC subheader with 8-bit L field, MAC subheader 802 is an R/F/LCID/L MAC subheader with 16-bit L field, and MAC subheader 803 is a R/LCID MAC subheader. MAC CEs are placed together. DL MAC subPDU(s) with MAC CE(s) is/are placed before any MAC subPDU with MAC SDU and MAC subPDU with padding. UL MAC subPDU(s) with MAC CE(s) is placed after all the MAC subPDU(s) with MAC SDU and before the MAC subPDU with padding in the MAC. The size of padding can be zero.

According to various embodiments, instance(s) of MAC 720 may also activate or deactivate individual beams of configured SRS resource(s). In these embodiments, the NW (e.g., a RAN node 111) may update, activate or deactivate beams or BWPs of one or more configured SRS resource sets by sending a suitable MAC CE. In some embodiments, the configured SRS resource sets are initially deactivated upon configuration and/or after a handover. When the MAC 720 entity receives the MAC CE on a Serving Cell, the MAC 720 entity indicates, to lower layers, the information regarding the SRS beam activation/deactivation as indicated by the MAC CE. Examples of such MAC CEs are shown and described with respect to FIG. 9.

FIG. 9 depicts an example SRS beam Activation/Deactivation MAC CE 900 according to various embodiments. The SRS beam Activation/Deactivation MAC CE 900 is identified by a MAC subheader with a suitable LCD value and has a variable size with following fields.

The A/D field has a length of 1 bit and indicates whether to activate or deactivate indicated periodic and/or aperiodic SRS resource set. The field is set to 1 to indicate activation, otherwise it indicates deactivation. The SRS Resource Set's CC ID field has a length of 5 bits and indicates the identity of the component carrier that contains the activated/deactivated SRS Resource Set. If the C field is set to 0, this field also indicates the identity of the component carrier that contains all resources indicated by the SRS Resource $ID_i$ fields. The R fields contain reserved bits, and are set to 0.

The SRS Resource Set's BWP ID field has a length of 2 bits and indicates a UL BWP as a codepoint of the DCI bandwidth part indicator field as discussed herein and as specified in 3GPP TS 38.212 v15.1.1 (2018-04), which contains the activated/deactivated SRS Resource Set. If the C field is set to 0, this field also indicates the identity of the BWP that contains all resources indicated by the SRS Resource $ID_i$ fields. The SRS Resource Set ID field has a length of 4 bits and indicates the SRS Resource Set ID identified by SRS-ResourceSetId as discussed herein and as specified in 3GPP TS 38.331 v15.1.0 (2018-04), which is to be activated or deactivated.

The C field indicates whether the octets containing Resource CC/Serving Cell ID field(s) and Resource BWP ID field(s) are present. If this field is set to 1, the octets containing Resource CC/Serving Cell ID field(s) and Resource BWP ID field(s) are present, otherwise they are not present. The SUL field indicates whether the MAC CE applies to the NUL carrier or SUL carrier configuration. This field is set to 1 to indicate that it applies to the SUL carrier configuration, and it is set to 0 to indicate that it applies to the NUL carrier configuration.

The $F_i$ This field has a length of 1 bit and indicates the type of a resource used as a spatial relationship for SRS resource within periodic and/or aperiodic SRS Resource Set indicated with periodic and/or aperiodic SRS Resource Set ID field. $F_0$ refers to the first SRS resource within the resource set, $F_1$ to the second one and so on. As an example, this field is set to 1 to indicate NZP CSI-RS resource index is used, and is set to 0 to indicate that either an SSB index or SRS resource index is used. This field is only present if MAC CE is used for activation, for example, when the A/D field is set to 1.

The Resource $ID_i$ field has a length of 7 bits and contains an identifier of the resource used for spatial relationship derivation for SRS resource i. Resource $ID_0$ refers to the first SRS resource within the resource set, Resource $ID_1$ to the second one, and so forth. If $F_i$ is set to 0, and the first bit of this field is set to 1, the remainder of this field contains SSB-Index as specified in 3GPP TS 38.331 v15.1.0 (2018-04). If $F_i$ is set to 0, and the first bit of this field is set to 0, the remainder of this field contains SRS-ResourceId as specified in 3GPP TS 38.331 v15.1.0 (2018-04). This field is only present if MAC CE is used for activation, for example, when the A/D field is set to 1.

The Resource CC/Serving Cell $ID_i$ field has a length of 5 bits and indicates the identity of the CC or the Serving Cell on which the resource used for spatial relationship derivation for SRS resource i is located. The Resource BWP $ID_i$ field has a length of 2 bits indicates a UL BWP as the codepoint of the DCI bandwidth part indicator field as discussed herein and as specified in 3GPP TS 38.212 v15.1.1 (2018-04), on which the resource used for spatial relationship derivation for SRS resource i is located.

Instance(s) of RLC 730 may process requests from and provide indications to an instance of PDCP 740 via one or more radio link control service access points (RLC-SAP) 735. These requests and indications communicated via RLC-SAP 735 may comprise one or more RLC channels. The RLC 730 may operate in a plurality of modes of operation, including: Transparent Mode (TM), Unacknowledged Mode (UM), and Acknowledged Mode (AM). The RLC 730 may execute transfer of upper layer protocol data units (PDUs), error correction through automatic repeat request (ARQ) for AM data transfers, and concatenation, segmentation and reassembly of RLC SDUs for UM and AM data transfers. The RLC 730 may also execute re-segmentation of RLC data PDUs for AM data transfers, reorder RLC data PDUs for UM and AM data transfers, detect duplicate data for UM and AM data transfers, discard RLC SDUs for UM and AM data transfers, detect protocol errors for AM data transfers, and perform RLC re-establishment.

Instance(s) of PDCP 740 may process requests from and provide indications to instance(s) of RRC 755 and/or instance(s) of SDAP 747 via one or more packet data convergence protocol service access points (PDCP-SAP) 745. These requests and indications communicated via PDCP-SAP 745 may comprise one or more radio bearers. The PDCP 740 may execute header compression and decompression of IP data, maintain PDCP Sequence Numbers (SNs), perform in-sequence delivery of upper layer PDUs at re-establishment of lower layers, eliminate duplicates of lower layer SDUs at re-establishment of lower layers for radio bearers mapped on RLC AM, cipher and decipher control plane data, perform integrity protection and integrity verification of control plane data, control timer-based discard of data, and perform security operations (e.g., ciphering, deciphering, integrity protection, integrity verification, etc.).

Instance(s) of SDAP 747 may process requests from and provide indications to one or more higher layer protocol entities via one or more SDAP-SAP 749. These requests and indications communicated via SDAP-SAP 749 may comprise one or more QoS flows. The SDAP 747 may map QoS flows to DRBs, and vice versa, and may also mark QFIs in DL and UL packets. A single SDAP entity 747 may be configured for an individual PDU session. In the UL direction, the NG-RAN 110 may control the mapping of QoS Flows to DRB(s) in two different ways, reflective mapping or explicit mapping. For reflective mapping, the SDAP 747 of a UE 101 may monitor the QFIs of the DL packets for each DRB, and may apply the same mapping for packets flowing in the UL direction. For a DRB, the SDAP 747 of the UE 101 may map the UL packets belonging to the QoS flows(s) corresponding to the QoS flow ID(s) and PDU session observed in the DL packets for that DRB. To enable reflective mapping, the NG-RAN 610 may mark DL packets over the Uu interface with a QoS flow ID. The explicit mapping may involve the RRC 755 configuring the SDAP 747 with an explicit QoS flow to DRB mapping rule, which may be stored and followed by the SDAP 747. In embodiments, the SDAP 747 may only be used in NR implementations and may not be used in LTE implementations.

The RRC 755 may configure, via one or more management service access points (M-SAP), aspects of one or more protocol layers, which may include one or more instances of PHY 710, MAC 720, RLC 730, PDCP 740 and SDAP 747. In embodiments, an instance of RRC 755 may process requests from and provide indications to one or more NAS entities 757 via one or more RRC-SAPS 1156. The main services and functions of the RRC 755 may include broadcast of system information (e.g., included in MIBs or SIBS related to the NAS), broadcast of system information related to the access stratum (AS), paging, establishment, maintenance and release of an RRC connection between the UE 101 and RAN 110 (e.g., RRC connection paging, RRC connection establishment, RRC connection modification, and RRC connection release), establishment, configuration, maintenance and release of point to point Radio Bearers, security functions including key management, inter-RAT mobility, and measurement configuration for UE measurement reporting. The MIBs and SIBS may comprise one or more IEs, which may each comprise individual data fields or data structures.

According to various embodiments, RRC 755 is used to configure the UE 101 with specific parameters, such as specific PUSCH parameters, SRS parameters, and/or other like parameters. For example, the RRC 755 of a RAN node 111 may transmit a suitable RRC message (e.g., an RRC connection establishment message, RRC connection reconfiguration message, or the like) to the UE 101, where the RRC message includes one or more IEs, which is a structural element containing one or more fields where each field includes parameters, content, and/or data. The parameters, content, and/or data included in the one or more fields of the IEs are used to configure the UE 101 to operate in a particular manner. In some embodiments, one or more PUSCH configuration (PUSCH-Config) IEs are included in such an RRC message, which are used to configure UE specific PUSCH parameters applicable to a particular BWP. An example PUSCH-Config IE is shown by table 2, and table 3 shows field descriptions for the fields of the PUSCH-Config IE.

TABLE 2

PUSCH-Config information element

```
-- ASN1START
-- TAG-PUSCH-CONFIG-START
PUSCH-Config ::=                                        SEQUENCE {
    dataScramblingIdentityPUSCH                             INTEGER (0..1023)
OPTIONAL, -- Need S
    txConfig                                                ENUMERATED {codebook,
nonCodebook}                                                OPTIONAL, -- Need S
    dmrs-UplinkForPUSCH-MappingTypeA                        SetupRelease { DMRS-UplinkConfig
}                                                       OPTIONAL, -- Need M
    dmrs-UplinkForPUSCH-MappingTypeB                        SetupRelease { DMRS-UplinkConfig
}                                                       OPTIONAL, -- Need M
    pusch-PowerControl                                      PUSCH-PowerControl
OPTIONAL, -- Need M
    frequencyHopping                                        ENUMERATED {intraSlot,
interSlot}                                                  OPTIONAL, -- Need S
    frequencyHoppingOffsetLists                             SEQUENCE (SIZE (1..4) ) OF
INTEGER (1.. maxNrofPhysicalResourceBlocks-1)               OPTIONAL, -- Need M
    resourceAllocation                                      ENUMERATED {
resourceAllocationType0, resourceAllocationType1, dynamicSwitch},
    pusch-TimeDomainAllocationList                          SetupRelease { PUSCH-
TimeDomainResourceAllocationList }                          OPTIONAL, -- Need M
    pusch-AggregationFactor                                 ENUMERATED { n2, n4, n8 }
OPTIONAL, -- Need S
    mcs-Table                                               ENUMERATED {qam256, qam64LowSE}
OPTIONAL, -- Need S
    mcs-TableTransformPrecoder                              ENUMERATED {qam256, qam64LowSE}
OPTIONAL, -- Need S
    transformPrecoder                                       ENUMERATED {enabled, disabled}
OPTIONAL, -- Need S
    codebookSubset                                          ENUMERATED
{fullyAndPartialAndNonCoherent, partialAndNonCoherent,
                                                                    nonCoherent}
OPTIONAL, -- Cond codebookBased
    maxRank                                                 INTEGER (1..4)
OPTIONAL, -- Cond codebookBased
    rbg-Size                                                ENUMERATED { config2}
OPTIONAL, -- Need S
    uci-OnPUSCH                                             SetupRelease { UCI-OnPUSCH}
OPTIONAL, -- Need M
    tp-pi2BPSK                                              ENUMERATED {enabled}
OPTIONAL, -- Need S
    ...
}
UCI-OnPUSCH ::=                                         SEQUENCE {
    betaOffsets                                             CHOICE {
        dynamic                                                 SEQUENCE (SIZE (4) ) OF
BetaOffsets,
        semiStatic                                              BetaOffsets
}
```

TABLE 2-continued

| PUSCH-Config information element |
|---|
| OPTIONAL, -- Need M |
| scaling                                         ENUMERATED { f0p5, f0p65, f0p8, f1 } |
| } |
| -- TAG-PUSCH-CONFIG-STOP |
| -- ASN1STOP |

TABLE 3

| PUSCH-Config field descriptions |
|---|
| codebookSubset |
| Subset of PMIs addressed by TPMI, where PMIs are those supported by UEs with maximum coherence capabilities (see TS 38.214 [19], clause 6.1.1.1). |
| dataScramblingIdentityPUSCH |
| Identifier used to initalite data scrambling (c_init) for PUSCH. If the field is absent, the UE applies the physical cell ID. (see TS 38.211 [16], clause 6.3.1.1). |
| dmrs-UplinkForPUSCH-MappingTypeA |
| DMRS configuration for PUSCH transmissions using PUSCH mapping type A (chosen dynamically via PUSCH-TimeDomainResourceAllocation). Only the fields dmrs-Type, dmrs-AdditionalPosition and maxLength may be set differently for mapping type A and B. |
| dmrs-UplinkForPUSCH-MappingTypeB |
| DMRS configuration for PUSCH transmissions using PUSCH mapping type B (chosen dynamically via PUSCH-TimeDomainResourceAllocation). Only the fields dmrs-Type, dmrs-AdditionalPosition and maxLength may be set differently for mapping type A and B. |
| frequencyHopping |
| The value intraSlot enables 'Intra-slot frequency hopping' and the value interSlot enables 'Inter-slot frequency hopping'. If the field is absent, frequency hopping is not configured (see TS 38.214 [19], clause 6.3). |
| frequencyHoppingOffsetLists |
| Set of frequency hopping offsets used when frequency hopping is enabled for granted transmission (not msg3) and type 2 (see TS 38.214 [19], clause 6.3). |
| maxRank |
| Subset of PMIs addressed by TRIs from 1 to ULmaxRank (see TS 38.214 [19], clause 6.1.1.1). |
| mcs-Table |
| Indicates which MCS table the UE shall use for PUSCH without transform precoder (see TS 38.214 [19], clause 6.1.4.1). If the field is absent the UE applies the value 64QAM |
| mcs-TableTransformPrecoder |
| Indicates which MCS table the UE shall use for PUSCH with transform precoding (see TS 38.214 [19], clause 6.1.4.1) If the field is absent the UE applies the value 64QAM |
| UCI-OnPUSCH field descriptions |
| betaOffsets |
| Selection between and configuration of dynamic and semi-static beta-offset. If the field is absent or released, the UE applies the value 'semiStatic' and the BetaOffsets according to FFS [BetaOffsets and/or clause 9.x.x) (see TS 38.213 [13], clause 9.3). |
| scaling |
| Indicates a scaling factor to limit the number of resource elements assigned to UCI on PUSCH. Value f0p5 corresponds to 0.5, value f0p65 corresponds to 0.65, and so on. The value configured herein is applicable for PUSCH with configured grant (see TS 38.212 [17], clause 6.3). |

In various embodiments, the RRC message may also include a PUSCH power control configuration (PUSCH-PowerControl) IE, which is used to configure UE specific power control parameter for PUSCH. An example PUSCH-PowerControl IE is shown by table 4, and field descriptions for the PUSCH-PowerControl are shown by table 5.

TABLE 4

| PUSCH-PowerControl information element |
|---|
| -- ASN1START |
| -- TAG-PUSCH-POWERCONTROL-START |
| PUSCH-PowerControl ::=                          SEQUENCE { |
| tpc-Accumulation                                ENUMERATED { disabled } |
| OPTIONAL, -- Need S |
| msg3-Alpha                                      Alpha |
| OPTIONAL, -- Need S |
| p0-NominalWithoutGrant                          INTEGER (−202..24) |
| OPTIONAL, -- Need M |
| p0-AlphaSets                                    SEQUENCE (SIZE (1..maxNrofP0-PUSCH- |
| AlphaSets) ) OF P0-PUSCH-AlphaSet                 OPTIONAL, -- Need M |
| pathlossReferenceRSToAddModList                 SEQUENCE (SIZE (1..maxNrofPUSCH- |

TABLE 4-continued

| PUSCH-PowerControl information element | |
|---|---|
| PathlossReferenceRSs) ) OF PUSCH-PathlossReferenceRS OPTIONAL, -- Need N | |
| pathlossReferenceRSToReleaseList | SEQUENCE (SIZE (1..maxNrofPUSCH- |
| PathlossReferenceRSs) ) OF PUSCH-PathlossReferenceRS-Id OPTIONAL, -- Need N | |
| twoPUSCH-PC-AdjustmentStates OPTIONAL, -- Need S | ENUMERATED {twoStates} |
| deltaMCS OPTIONAL, -- Need S | ENUMERATED {enabled} |
| sri-PUSCH-MappingToAddModList Mappings) ) OF SRI-PUSCH-PowerControl | SEQUENCE (SIZE (1..maxNrofSRI-PUSCH- OPTIONAL, -- Need N |
| sri-PUSCH-MappingToReleaseList Mappings) ) OF SRI-PUSCH-PowerControlId | SEQUENCE (SIZE (1..maxNrofSRI-PUSCH- OPTIONAL -- Need N |
| } | |
| P0-PUSCH-AlphaSet ::= | SEQUENCE { |
| p0-PUSCH-AlphaSetId | P0-PUSCH-AlphaSetId, |
| p0 OPTIONAL, -- Need S | INTEGER (-16..15) |
| alpha OPTIONAL -- Need S | Alpha |
| } | |
| P0-PUSCH-AlphaSetId ::= | INTEGER (0..maxNrofP0-PUSCH-AlphaSets-1) |
| PUSCH-PathlossReferenceRS ::= | SEQUENCE { |
| pusch-PathlossReferenceRS-Id | PUSCH-PathlossReferenceRS-Id, |
| referenceSignal | CHOICE { |
| ssb-Index | SSB-Index, |
| csi-RS-Index | NZP-CSI-RS-ResourceId |
| } | |
| } | |
| PUSCH-PathlossReferenceRS-Id ::= PathlossReferenceRSs-1) | INTEGER (0..maxNrofPUSCH- |
| SRI-PUSCH-PowerControl ::= | SEQUENCE { |
| sri-PUSCH-PowerControlId | SRI-PUSCH-PowerControlId, |
| sri-PUSCH-PathlossReferenceRS-Id | PUSCH-PathlossReferenceRS-Id, |
| sri-P0-PUSCH-AlphaSetId | P0-PUSCH-AlphaSetId, |
| sri-PUSCH-ClosedLoopIndex | ENUMERATED { i0, i1 } |
| } | |
| SRI-PUSCH-PowerControlId ::= | INTEGER (0..maxNrofSRI-PUSCH-Mappings-1) |
| BetaOffsets ::= | SEQUENCE { |
| betaOffsetACK-Index1 OPTIONAL, -- Need S | INTEGER (0..31) |
| betaOffsetACK-Index2 OPTIONAL, -- Need S | INTEGER (0..31) |
| betaOffsetACK-Index3 OPTIONAL, -- Need S | INTEGER (0..31) |
| betaOffsetCSI-Part1-Index1 OPTIONAL, -- Need S | INTEGER (0..31) |
| betaOffsetCSI-Part1-Index2 OPTIONAL, -- Need S | INTEGER (0..31) |
| betaOffsetCSI-Part2-Index1 OPTIONAL, -- Need S | INTEGER (0..31) |
| betaOffsetCSI-Part2-Index2 OPTIONAL -- Need S | INTEGER (0..31) |
| } | |
| -- TAG-PUSCH-POWERCONTROL-STOP -- ASN1STOP | |

TABLE 5

| PUSCH-PowerControl field descriptions |
|---|
| BetaOffsets field descriptions |
| betaOffsetACK-Index1 Up to 2 bits HARQ-ACK (see 3GPP TS 38.213, clause 9.3) When the field is absent the UE applies the value 11 |
| betaOffsetACK-Index2 Up to 11 bits HARQ-ACK (see 3GPP TS 38.213, clause 9.3) When the field is absent the UE applies the value 11 |
| betaOffsetACK-Index3 Above 11 bits HARQ-ACK (see 3GPP TS 38.213, clause 9.3) When the field is absent the UE applies the value 11 |
| betaOffsetCSI-Part1-Index1 Up to 11 bits of CSI part 1 bits (see 3GPP TS 38.213, clause 9.3) When the field is absent the UE applies the value 13 |

TABLE 5-continued

| PUSCH-PowerControl field descriptions |
|---|
| betaOffsetCSI-Part1-Index2 |
| Above 11 bits of CSI part 1 bits (see 3GPP TS 38.213, clause 9.3) When the field is absent the UE applies the value 13 |
| betaOffsetCSI-Part2-Index1 |
| Up to 11 bits of CSI part 2 bits (see 3GPP TS 38.213, clause 9.3) When the field is absent the UE applies the value 13 |
| betaOffsetCSI-Part2-Index2 |
| Above 11 bits of CSI part 2 bits (see 3GPP TS 38.213, clause 9.3) When the field is absent the UE applies the value 13 |
| P0-PUSCH-AlphaSet field descriptions |
| alpha |
| alpha value for PUSCH with grant (except msg3) (see 3GPP TS 38.213, clause 7.1) When the field is absent the UE applies the value 1 |
| p0 |
| P0 value for PUSCH with grant (except msg3) in steps of 1dB (see 3GPP TS 38.213, clause 7.1) |
| PUSCH-PowerControl field descriptions |
| deltaMCS |
| Indicates whether to apply delta MCS. When the field is absent, the UE applies Ks = 0 in delta_TFC formula for PUSCH (see 3GPP TS 38.213, clause 7.1) |
| msg3-Alpha |
| Dedicated alpha value for msg3 PUSCH (see 3GPP TS 38.213, clause 7.1). When the field is absent the UE applies the value 1. |
| p0-AlphaSets |
| configuration {p0-pusch, alpha} sets for PUSCH (except msg3), i.e., {{p0, alpha, index1}, {p0, alpha, index2}, . . .} (see 3GPP TS 38.213, clause 7.1). When no set is configured, the UE uses the P0-nominal for msg3 PUSCH, P0-UE is set to 0 and alpha is set according to msg3-Alpha configured for msg3 PUSCH. |
| p0-NominalWithoutGrant |
| P0 value for UL grant-free/SPS based PUSCH. Value in dBm. Only even values (step size 2) allowed (see 3GPP TS 38.213, clause 7.1) |
| pathlossReferenceRSToAddModList |
| A set of Reference Signals (e.g. a CSI-RS config or a SS block) to be used for PUSCH path loss estimation. Up to maxNrofPUSCH-PathlossReferenceRSs may be configured (see 3GPP TS 38.213, clause 7.1) |
| sri-PUSCH-MappingToAddModList |
| A list of SRI-PUSCH-PowerControl elements among which one is selected by the SRI field in DCI (see 3GPP TS 38.213, clause 7.1) |
| tpc-Accumulation |
| If enabled, UE applies TPC commands via accumulation. If not enabled, UE applies the TPC command without accumulation. If the field is absent, TPC accumulation is enabled (see 3GPP TS 38.213, clause 7.1) |
| twoPUSCH-PC-AdjustmentStates |
| Number of PUSCH power control adjustment states maintained by the UE (i.e., fc(i)). If the field is present (n2) the UE maintains two power control states (i.e., fc(i, 0) and fc(i, 1)). If the field is absent, it maintains one power control state (i.e., fc(i, 0)) (see 3GPP TS 38.213, clause 7.1) |
| SRI-PUSCH-PowerControl field descriptions |
| sri-P0-PUSCH-AlphaSetId |
| The ID of a P0-PUSCH-AlphaSet as configured in p0-AlphaSets in PUSCH-PowerControl. |
| sri-PUSCH-ClosedLoopIndex |
| The index of the closed power control loop associated with this SRI-PUSCH-PowerControl |
| sri-PUSCH-PathlossReferenceRS-Id |
| The ID of PUSCH-PathlossReferenceRS as configured in the pathlossReferenceRSToAddModList in PUSCH-PowerControl. |
| sri-PUSCH-PowerControlId |
| The ID of this SRI-PUSCH-PowerControl configuration. It is used as the codepoint (payload) in the SRI DCI field. |

In various embodiments, the RRC message may also include an SRS configuration (SRS-Config) IE, which is used to configure sounding reference signal transmissions. The SRS-Config defines a list of SRS resources (SRS-Resources) and a list of SRS resource sets (SRS-ResourceSets). Each resource set defines a set of SRS-Resources. In embodiments, the network (e.g., a RAN node 111) triggers the transmission of the set of SRS-Resources using a configured aperiodicSRS-ResourceTrigger (L1 DCI). An example SRS-Config IE is shown by table 6, and field descriptions for the SRS-Config are shown by table 7.

TABLE 6

| SRS-Config information element |
|---|
| -- ASN1START |
| -- TAG-SRS-CONFIG-START |
| SRS-Config ::=                              SEQUENCE { |

TABLE 6-continued

| SRS-Config information element | |
|---|---|
| srs-ResourceSetToReleaseList ResourceSets) ) OF SRS-ResourceSetId | SEQUENCE (SIZE(1..maxNrofSRS-OPTIONAL, -- Need N |
| srs-ResourceSetToAddModList ResourceSets) ) OF SRS-ResourceSet | SEQUENCE (SIZE(1..maxNrofSRS-OPTIONAL, -- Need N |
| srs-ResourceToReleaseList Resources) ) OF SRS-ResourceId | SEQUENCE (SIZE(1..maxNrofSRS-OPTIONAL, -- Need N |
| srs-ResourceToAddModList Resources) ) OF SRS-Resource | SEQUENCE (SIZE(1..maxNrofSRS-OPTIONAL, -- Need N |
| tpc-Accumulation OPTIONAL, -- Need S | ENUMERATED {disabled} |
| ... } SRS-ResourceSet ::= | SEQUENCE { |
| srs-ResourceSetId | SRS-ResourceSetId, |
| srs-ResourceIdList ResourcesPerSet) ) OF SRS-ResourceId | SEQUENCE (SIZE(1..maxNrofSRS-OPTIONAL, -- Cond Setup |
| resourceType | CHOICE { |
| aperiodic | SEQUENCE { |
| aperiodicSRS-ResourceTrigger TriggerStates-1), | INTEGER (1..maxNrofSRS- |
| csi-RS OPTIONAL, -- Cond NonCodebook | NZP-CSI-RS-ResourceId |
| slotOffset OPTIONAL, -- Need S ..., [ [ | INTEGER (1..32) |
| aperiodicSRS-ResourceTriggerList-v1530 (SIZE(1..maxNrofSRS-TriggerStates-2) ) (1..maxNrofSRS-TriggerStates-1) ] ] }, | SEQUENCE OF INTEGER OPTIONAL -- Need M |
| semi-persistent | SEQUENCE { |
| associatedCSI-RS OPTIONAL, -- Cond NonCodebook ... }, | NZP-CSI-RS-ResourceId |
| periodic | SEQUENCE { |
| associatedCSI-RS OPTIONAL, -- Cond NonCodebook ... } }, | NZP-CSI-RS-ResourceId |
| usage codebook, nonCodebook, antennaSwitching}, | ENUMERATED {beamManagement, |
| alpha OPTIONAL, -- Need S | Alpha |
| p0 OPTIONAL, -- Cond Setup | INTEGER (−202..24) |
| pathlossReferenceRS | CHOICE { |
| ssb-Index | SSB-Index, |
| csi-RS-Index } OPTIONAL, -- Need M | NZP-CSI-RS-ResourceId |
| srs-PowerControlAdjustmentStates separateClosedLoop} ... } | ENUMERATED { sameAsFci2, OPTIONAL, -- Need S |
| SRS-ResourceSetId ::= 1) | INTEGER (0..maxNrofSRS-ResourceSets- |
| SRS-Resource :: = | SEQUENCE { |
| srs-ResourceId | SRS-ResourceId, |
| nrofSRS-Ports ports4}, | ENUMERATED {port1, ports2, |
| ptrs-PortIndex OPTIONAL, -- Need R | ENUMERATED {n0, n1 } |
| transmissionComb | CHOICE { |
| n2 | SEQUENCE { |
| combOffset-n2 | INTEGER (0..1), |
| cyclicShift-n2 }, | INTEGER (0..7) |
| n4 | SEQUENCE { |
| combOffset-n4 | INTEGER (0..3), |
| cyclicShift-n4 } }, | INTEGER (0..11) |
| resourceMapping | SEQUENCE { |
| startPosition | INTEGER (0..5), |

TABLE 6-continued

| SRS-Config information element | |
|---|---|
|     nrofSymbols | ENUMERATED {n1, n2, n4}, |
|     repetitionFactor | ENUMERATED {n1, n2, n4} |
|   }, | |
|   freqDomainPosition | INTEGER (0..67), |
|   freqDomainShift | INTEGER (0..268), |
|   freqHopping | SEQUENCE { |
|     c-SRS | INTEGER (0..63), |
|     b-SRS | INTEGER (0..3), |
|     b-hop | INTEGER (0..3) |
|   }, | |
|   groupOrSequenceHopping | ENUMERATED { neither, |
| groupHopping, sequenceHopping }, | |
|   resourceType | CHOICE { |
|     aperiodic | SEQUENCE { |
|       ... | |
|     }, | |
|     semi-persistent | SEQUENCE { |
|       periodicityAndOffset-sp | SRS- |
| PeriodicityAndOffset, | |
|       ... | |
|     }, | |
|     periodic | SEQUENCE { |
|       periodicityAndOffset-p | SRS- |
| PeriodicityAndOffset, | |
|       ... | |
|     } | |
|   }, | |
|   sequenceId | INTEGER (0..1023), |
|   spatialRelationInfo | SRS-SpatialRelationInfo |
| OPTIONAL, -- Need R | |
|   ... | |
| } | |
| SRS-SpatialRelationInfo ::= SEQUENCE { | |
|   servingCellId | ServCellIndex |
| OPTIONAL, -- Need S | |
|   referenceSignal | CHOICE { |
|     ssb-Index | SSB-Index, |
|     csi-RS-Index | NZP-CSI-RS-ResourceId, |
|     srs | SEQUENCE { |
|       resourceId | SRS-ResourceId, |
|       uplinkBWP | BWP-Id |
|     } | |
|   } | |
| } | |
| SRS-ResourceId ::= | INTEGER (0..maxNrofSRS-Resources-1) |
| SRS-PeriodicityAndOffset ::= | CHOICE { |
|   sl1 | NULL, |
|   sl2 | INTEGER(0..1), |
|   sl4 | INTEGER(0..3), |
|   sl5 | INTEGER(0..4), |
|   sl8 | INTEGER(0..7), |
|   sl10 | INTEGER(0..9), |
|   sl16 | INTEGER(0..15), |
|   sl20 | INTEGER(0..19), |
|   sl32 | INTEGER(0..31), |
|   sl40 | INTEGER(0..39), |
|   sl64 | INTEGER(0..63), |
|   sl80 | INTEGER(0..79), |
|   sl160 | INTEGER(0..159), |
|   sl320 | INTEGER(0..319), |
|   sl640 | INTEGER(0..639), |
|   sl1280 | INTEGER(0..1279), |
|   sl2560 | INTEGER(0..2559) |
| } | |
| -- TAG-SRS-CONFIG-STOP | |
| -- ASN1STOP | |

TABLE 7

| SRS-Config field descriptions |
|---|
| SRS-Resource field descriptions |
| tpc-Accumulation<br>If the field is absent, UE applies TPC commands via accumulation. If disabled, UE applies the TPC command without accumulation (this applies to SRS when a separate closed loop is configured for SRS). |
| SRS-Resource field descriptions |
| cyclicShift-n2<br>Cyclic shift configuration<br>cyclicShift-n4<br>Cyclic shift configuration<br>freqHopping<br>Includes parameters capturing SRS frequency hopping<br>groupOrSequenceHopping<br>Parameter(s) for configuring group or sequence hopping<br>periodicityAndOffset-p<br>Periodicity and slot offset for this SRS resource. All values in "number of slots" sl1 corresponds to a periodicity of 1 slot, value sl2 corresponds to a periodicity of 2 slots, and so on. For each periodicity the corresponding offset is given in number of slots. For periodicity sl1 the offset is 0 slots<br>periodicityAndOffset-sp<br>Periodicity and slot offset for this SRS resource. All values in "number of slots". sl1 corresponds to a periodicity of 1 slot, value sl2 corresponds to a periodicity of 2 slots, and so on. For each periodicity the corresponding offset is given in number of slots. For periodicity sl1 the offset is 0 slots<br>ptrs-PortIndex<br>The PTRS port index for this SRS resource for non-codebook based UL MIMO. This is only applicable when the corresponding PTRS-UplinkConfig is set to CP-OFDM. The ptrs-PortIndex configured here must be smaller than or equal to the maxNnrofPorts configured in the PTRS-UplinkConfig<br>resourceMapping<br>OFDM symbol location of the SRS resource within a slot including number of OFDM symbols (N = 1, 2 or 4 per SRS resource), startPosition (SRSSymbolStartPosition = 0 . . . 5; "0" refers to the last symbol, "1" refers to the second last symbol) and RepetitionFactor (r = 1, 2 or 4). The configured SRS resource does not exceed the slot boundary.<br>resourceType<br>Periodicity and offset for semi-persistent and periodic SRS resource<br>sequenceId<br>Sequence ID used to initialize pseudo random group and sequence hopping<br>spatialRelationInfo<br>Configuration of the spatial relation between a reference RS and the target SRS. Reference RS can be SSB/CSI-RS/SRS<br>transmissionComb<br>Comb value (2 or 4) and comb offset (0 . . . combValue-1) |
| SRS-ResourceSet field descriptions |
| alpha<br>alpha value for SRS power control. When the field is absent the UE applies the value 1.<br>aperiodicSRS-ResourceTriggerList<br>An additional list of DCI "code points" upon which the UE shall transmit SRS according to this SRS resource set configuration.<br>aperiodicSRS-ResourceTrigger<br>The DCI "code point" upon which the UE shall transmit SRS according to this SRS resource set configuration.<br>associatedCSI-RS<br>ID of CSI-RS resource associated with this SRS resource set in non-codebook based operation.<br>csi-RS<br>ID of CSI-RS resource associated with this SRS resource set.<br>p0<br>P0 value for SRS power control. The value is in dBm. Only even values (step size 2) are allowed.<br>pathlossReferenceRS<br>A reference signal (e.g. a CSI-RS config or a SS block) to be used for SRS path loss estimation.<br>resourceType<br>Time domain behavior of SRS resource configuration. Corresponds to L1 parameter 'SRS-ResourceConfigType'. The network configures SRS resources in the same resource set with the same time domain behavior on periodic, aperiodic and semi-persistent SRS.<br>slotOffset<br>An offset in number of slots between the triggering DCI and the actual transmission of this SRS-ResourceSet. If the field is absent the UE applies no offset (value 0).<br>srs-PowerControlAdjustmentStates<br>Indicates whether hsrs, c(i) = fc(i, 1) or hsrs, c(i) = fc(i, 2) (if twoPUSCH-PC-AdjustmentStates are configured) or serarate close loop is configured for SRS. This parameter is applicable only for UIs on which UE also transmits PUSCH. If absent or release, the UE applies the value sameAs-Fci1.<br>srs-ResourceIdList<br>The IDs of the SRS-Resources used in this SRS-ResourceSet. If this SRS-ResourceSet is configured with usage set to codebook, the srs-ResourceIdList contains at most 2 entries. If this SRS-ResourceSet is configured with usage set to nonCodebook, the srs-ResourceIdList contains at most 4 entries. |

TABLE 7-continued

SRS-Config field descriptions srs-ResourceSetId
The ID of this resource set. It is unique in the context of the BWP in which the parent SRS-Config is defined.
usage
Indicates if the SRS resource set is used for beam management, codebook based or non-codebook based transmission or antenna switching.

As shown by the examples of tables 6 and 7, the SRS-Config IE includes one or more SRS-ResourceSet IE, which may include one or more SRS-Resource IEs that configures the UE 101 with one or more SRS resources. Each SRS-Resource IE may include a resource Type parameter and a spatialRelationInfo parameter with an SRS-SpatialRelationInfo value, which indicates or is a configuration of the spatial relation between a reference RS and a target SRS. For codebook based transmission, the UE 101 may be configured with a single SRS-ResourceSet set to 'codebook' and only one SRS resource can be indicated based on the SRI from within the SRS resource set. For UL codebook based transmissions, if the SRS-Resource IE has a resource Type parameter configured with a value "semi-persistent," the UE 101 expects the SRS resource(s) indicated by the SRS-Resource IE to be activated (e.g., by a suitable DCI) and uses a same spatial domain filter to transmit a PUSCH as an activated SRS resource for codebook based transmission. If such SRS resource(s) are not activated (e.g., by a suitable DCI), the UE 101 applies the same spatial domain filter to transmit the PUSCH as the parameter SRS-SpatialRelationInfo configured for the indicated SRS. Additionally or alternatively, the PUSCH beam may be the same as the beam used for a particular PUCCH resource or a particular SRS resource for beam management. Furthermore, in various embodiments, each SRS-ResourceSet may also be associated with an SRS power control (SRS-PowerControl) IE similar to the PUSCH-PowerControl IE of tables 4-5.

The NAS 757 may form the highest stratum of the control plane between the UE 101 and the AMF. The NAS 757 may support the mobility of the UEs 101 and the session management procedures to establish and maintain IP connectivity between the UE 101 and a P-GW in LTE systems.

According to various embodiments, one or more protocol entities of arrangement 700 may be implemented in UEs 101, RAN nodes 111, AMF in NR implementations or MME in LTE implementations, UPF 602 in NR implementations or S-GW and P-GW in LTE implementations, or the like to be used for control plane or user plane communications protocol stack between the aforementioned devices. In such embodiments, one or more protocol entities that may be implemented in one or more of UE 101, gNB 111, AMF, etc. may communicate with a respective peer protocol entity that may be implemented in or on another device using the services of respective lower layer protocol entities to perform such communication. In some embodiments, a gNB-CU of the gNB 111 may host the RRC 755, SDAP 747, and PDCP 740 of the gNB that controls the operation of one or more gNB-DUs, and the gNB-DUs of the gNB 111 may each host the RLC 730, MAC 720, and PHY 710 of the gNB 111.

In a first example, a control plane protocol stack may comprise, in order from highest layer to lowest layer, NAS 757, RRC 755, PDCP 740, RLC 730, MAC 720, and PHY 710. In this example, upper layers 760 may be built on top of the NAS 857, which includes an IP layer 761, an SCTP 762, and an application layer signaling protocol (AP) 763.

In NR implementations, the AP 763 may be an NG application protocol layer (NGAP or NG-AP) 763 for the NG interface 113 defined between the NG-RAN node 111 and the AMF 621, or the AP 763 may be an Xn application protocol layer (XnAP or Xn-AP) 763 for the Xn interface 112 that is defined between two or more RAN nodes 111.

The NG-AP 763 may support the functions of the NG interface 113 and may comprise Elementary Procedures (EPs). An NG-AP EP may be a unit of interaction between the NG-RAN node 111 and the AMF. The NG-AP 763 services may comprise two groups: UE-associated services (e.g., services related to a UE 101) and non-UE-associated services (e.g., services related to the whole NG interface instance between the NG-RAN node 111 and AMF). These services may include functions including, but not limited to: a paging function for the sending of paging requests to NG-RAN nodes 111 involved in a particular paging area; a UE context management function for allowing the AMF 621 to establish, modify, and/or release a UE context in the AMF 621 and the NG-RAN node 111; a mobility function for UEs 101 in ECM-CONNECTED mode for intra-system HOs to support mobility within NG-RAN and inter-system HOs to support mobility from/to EPS systems; a NAS Signaling Transport function for transporting or rerouting NAS messages between UE 101 and AMF 621; a NAS node selection function for determining an association between the AMF 621 and the UE 101; NG interface management function(s) for setting up the NG interface and monitoring for errors over the NG interface; a warning message transmission function for providing means to transfer warning messages via NG interface or cancel ongoing broadcast of warning messages; a Configuration Transfer function for requesting and transferring of RAN configuration information (e.g., SON information, performance measurement (PM) data, etc.) between two RAN nodes 111 via CN 120; and/or other like functions.

The XnAP 763 may support the functions of the Xn interface 112 and may comprise XnAP basic mobility procedures and XnAP global procedures. The XnAP basic mobility procedures may comprise procedures used to handle UE mobility within the NG RAN 111 (or E-UTRAN 510), such as handover preparation and cancellation procedures, SN Status Transfer procedures, UE context retrieval and UE context release procedures, RAN paging procedures, dual connectivity related procedures, and the like. The XnAP global procedures may comprise procedures that are not related to a specific UE 101, such as Xn interface setup and reset procedures, NG-RAN update procedures, cell activation procedures, and the like.

In LTE implementations, the AP 763 may be an S1 Application Protocol layer (S1-AP) 763 for the S1 interface 113 defined between an E-UTRAN node 111 and an MME, or the AP 763 may be an X2 application protocol layer (X2AP or X2-AP) 763 for the X2 interface 112 that is defined between two or more E-UTRAN nodes 111.

The S1 Application Protocol layer (S1-AP) 763 may support the functions of the S1 interface, and similar to the NG-AP discussed previously, the S1-AP may comprise S1-AP EPs. An S1-AP EP may be a unit of interaction between the E-UTRAN node 111 and an MME within an LTE CN 120. The S1-AP 763 services may comprise two groups: UE-associated services and non UE-associated services. These services perform functions including, but not limited to: E-UTRAN Radio Access Bearer (E-RAB) management, UE capability indication, mobility, NAS signaling transport, RAN Information Management (RIM), and configuration transfer.

The X2AP 763 may support the functions of the X2 interface 112 and may comprise X2AP basic mobility procedures and X2AP global procedures. The X2AP basic mobility procedures may comprise procedures used to handle UE mobility within the E-UTRAN 120, such as handover preparation and cancellation procedures, SN Status Transfer procedures, UE context retrieval and UE context release procedures, RAN paging procedures, dual connectivity related procedures, and the like. The X2AP global procedures may comprise procedures that are not related to a specific UE 101, such as X2 interface setup and reset procedures, load indication procedures, error indication procedures, cell activation procedures, and the like.

The SCTP layer (alternatively referred to as the SCTP/IP layer) 762 may provide guaranteed delivery of application layer messages (e.g., NGAP or XnAP messages in NR implementations, or S1-AP or X2AP messages in LTE implementations). The SCTP 762 may ensure reliable delivery of signaling messages between the RAN node 111 and the AMF/MME based, in part, on the IP protocol, supported by the IP 761. The Internet Protocol layer (IP) 761 may be used to perform packet addressing and routing functionality. In some implementations the IP layer 761 may use point-to-point transmission to deliver and convey PDUs. In this regard, the RAN node 111 may comprise L2 and L1 layer communication links (e.g., wired or wireless) with the MME/AMF to exchange information.

In a second example, a user plane protocol stack may comprise, in order from highest layer to lowest layer, SDAP 747, PDCP 740, RLC 730, MAC 820, and PHY 810. The user plane protocol stack may be used for communication between the UE 101, the RAN node 111, and UPF 602 in NR implementations or an S-GW 522 and P-GW 523 in LTE implementations. In this example, upper layers 751 may be built on top of the SDAP 747, and may include a UDP and IP security layer (UDP/IP) 1152, a GPRS Tunneling Protocol for the user plane layer (GTP-U) 753, and a User Plane PDU layer (UP PDU) 763.

The transport network layer 754 (also referred to as a "transport layer") may be built on IP transport, and the GTP-U 753 may be used on top of the UDP/IP layer 1152 (comprising a UDP layer and IP layer) to carry user plane PDUs (UP-PDUs). The IP layer (also referred to as the "Internet layer") may be used to perform packet addressing and routing functionality. The IP layer may assign IP addresses to user data packets in any of IPv4, IPv6, or PPP formats, for example.

The GTP-U 753 may be used for carrying user data within the GPRS core network and between the radio access network and the core network. The user data transported can be packets in any of IPv4, IPv6, or PPP formats, for example. The UDP/IP 1152 may provide checksums for data integrity, port numbers for addressing different functions at the source and destination, and encryption and authentication on the selected data flows. The RAN node 111 and the S-GW may utilize an S1-U interface to exchange user plane data via a protocol stack comprising an L1 layer (e.g., PHY 710), an L2 layer (e.g., MAC 720, RLC 730, PDCP 740, and/or SDAP 747), the UDP/IP layer 752, and the GTP-U 753. The S-GW and the P-GW may utilize an S5/S8a interface to exchange user plane data via a protocol stack comprising an L1 layer, an L2 layer, the UDP/IP layer 752, and the GTP-U 753. As discussed previously, NAS protocols may support the mobility of the UE 101 and the session management procedures to establish and maintain IP connectivity between the UE 101 and the P-GW.

Moreover, although not shown by FIG. 7, an application layer may be present above the AP 763 and/or the transport network layer 754. The application layer may be a layer in which a user of the UE 101, RAN node 111, or other network element interacts with software applications being executed, for example, by application circuitry 305 or application circuitry 405, respectively. The application layer may also provide one or more interfaces for software applications to interact with communications systems of the UE 101 or RAN node 111, such as the baseband circuitry 610. In some implementations the IP layer and/or the application layer may provide the same or similar functionality as layers 5-7, or portions thereof, of the Open Systems Interconnection (OSI) model (e.g., OSI Layer 7—the application layer, OSI Layer 6—the presentation layer, and OSI Layer 5—the session layer).

FIGS. 10-11 show example procedures 1000-1100, respectively, in accordance with various embodiments. For illustrative purposes, the various operations of processes 1000-1100 is described as being performed by UEs 101 of FIG. 1 or elements thereof (e.g., components discussed with regard to platform 400 of FIG. 4), or a RAN node 111 of FIG. 1 or elements thereof (e.g., components discussed with regard to infrastructure equipment 300 of FIG. 3). Additionally, the various messages/signaling communicated between the UE 101 and RAN node 111 may be sent/received over the various interfaces discussed herein with respect to FIGS. 1-7, and using the various mechanisms discussed herein including those discussed herein with respect to FIGS. 1-9. While particular examples and orders of operations are illustrated FIGS. 10-11, the depicted orders of operations should not be construed to limit the scope of the embodiments in any way. Rather, the depicted operations may be re-ordered, broken into additional operations, combined, and/or omitted altogether while remaining within the spirit and scope of the present disclosure.

FIG. 10 shows a process 1000 for generating and transmitting an SRS according to various embodiments. Process 1000 may be performed by the UE 101. Process 1000 begins at operation 1005 where the UE 101 receives an RRC message including an SRS resource configuration. The SRS resource configuration indicates one or more configured SRS resource sets, and the one or more configured SRS resource sets indicate one or more configured SRS resources for a configured transmission scheme (e.g., a codebook transmission scheme or a non-codebook transmission scheme. At operation 1010, the UE 101 receives a MAC CE message (e.g., MAC CE 900 of FIG. 9), which indicates a subset of the configured SRS resources. In some embodiments, the MAC CE indicates or includes a CC index and a BWP ID. At operation 1015, the UE 101 receives (or attempts to decode) DCI, which indicates an SRS resource in the subset of the configured SRS resources. At operation 1020, the UE 101 generates and transmit a PUSCH transmission or an SRS in the SRS resource indicated by the DCI.

In some embodiments where the transmission is the SRS, the MAC CE further indicates an SRS resource ID for each SRS resource in the subset of the configured SRS resources and spatial relation information for each SRS resource of the subset of the configured SRS resources. In other embodiments where the transmission is the SRS, the MAC CE further indicates an SRS resource set ID of an individual SRS resource set of the one or more SRS resource sets, and spatial relation information for each SRS resource in the individual SRS resource set. In other embodiments where the transmission is the SRS, the RRC message further includes a power control parameter set for each SRS resource set, and the MAC CE further indicates an SRS resource set ID of an individual SRS resource set of the one or more SRS resource sets, a P0 and alpha set ID of a power control parameter set corresponding to the individual SRS resource set, a pathloss reference signal ID of the power control parameter set corresponding to the individual SRS resource set, and a closed-loop index of the power control parameter set corresponding to the individual SRS resource set.

In some embodiments where the transmission is the PUSCH transmission, the MAC CE further indicates an SRS resource ID for each SRS resource in the subset of the configured SRS resources. In other embodiments where the transmission is the PUSCH transmission, the MAC CE further indicates spatial relation information for a corresponding SRI for each SRS resource in the subset of the configured SRS resources. In some embodiments where the transmission is the PUSCH transmission, the spatial relation information is based on an SSB, a CSI-RS, or the SRS. In some embodiments where the transmission is the PUSCH transmission, the DCI includes an SRS resource indicator field, and a value in the SRS resource indicator field is selected from the subset of the configured SRS resources.

FIG. 11 depicts an example process 1100 for configuring SRS resources according to various embodiments. Process 1400 may be performed by the RAN node 111. Process 1100 begins at operation 1105 where the RAN node 111 generates and transmits an RRC message, which includes an SRS configuration that includes one or more configured SRS resource sets. Each of the one or more configured SRS resource sets include one or more SRS resources. Sometime later at operation 1110, the RAN node 111 selects an SRS resource subset from among the one or more configure SRS resources, and at operation 1115, the RAN node 111 generates and transmits a MAC CE (e.g., MAC CE 900 of FIG. 9) indicating the SRS resource subset to a UE 101. Sometime later, the RAN node 111 at operation 1120 selects one SRS resource from the SRS resource subset, and at operation 1125, the RAN node 111 generates and transmits the DCI to the UE 101 to indicate the one SRS resource.

In some embodiments, at operation 1115 the RAN node 111 generates the MAC CE to indicate a CC index, a BWP ID, an SRS resource ID for each SRS resource in the subset of the configured SRS resources, and spatial relation information for each SRS resource of the subset of the configured SRS resources.

In some embodiments, at operation 1115 the RAN node 111 generates the MAC CE to indicate a CC index, a BWP ID, an SRS resource set ID of an individual SRS resource set of the one or more SRS resource sets, and spatial relation information for each SRS resource in the individual SRS resource set.

In some embodiments, at operation 1105 the RAN node 111 generates the RRC message to include a power control parameter set for each SRS resource set; and at operation 1115 generates the MAC CE to indicate a CC index, a BWP ID, an SRS resource set ID of an individual SRS resource set of the one or more SRS resource sets, a P0 and alpha set ID of a power control parameter set corresponding to the individual SRS resource set, a pathloss reference signal ID of the power control parameter set corresponding to the individual SRS resource set, and a closed-loop index of the power control parameter set corresponding to the individual SRS resource set.

In some embodiments, at operation 1105 the RAN node 111 generates the MAC CE to indicate a CC index, a BWP ID, and spatial relation information for a corresponding SRI for each SRS resource in the subset of the configured SRS resources.

Some non-limiting examples are as follows. The following examples pertain to further embodiments, and specifics in the examples may be used anywhere in one or more embodiments discussed previously. Any of the following examples may be combined with any other example or any embodiment discussed herein.

Example 1 includes a comprising: generating or causing to generate a sounding reference signal (SRS) beam for transmission in a configured SRS resource indicated by received Downlink Control Information (DCI) when the UE is configured with one or more SRS resources for a configured transmission scheme via higher layer signaling and a subset of the one or more SRS resources are reconfigured via a received Media Access Control (MAC) Control Element (CE); and transmitting or causing to transmit the SRS beam.

Example 2 includes the method of example 1 and/or some other example(s) herein, wherein the MAC CE is to indicate a component carrier (CC) index and a bandwidth part identifier (ID).

Example 3 includes the method of example 2 and/or some other example(s) herein, wherein the one or more SRS resources are configured with a periodic time domain behavior or an aperiodic time domain behavior, and wherein the MAC CE is to update a beam of each SRS resource of the subset of the one or more SRS resources, and the MAC CE is to further indicate an SRS resource ID for each SRS resource and spatial relation information for each SRS resource.

Example 4 includes the method of example 2 and/or some other example(s) herein, wherein the one or more SRS resource sets are configured via the higher layer signaling, and the one or more SRS resource sets comprise the one or more SRS resources.

Example 5 includes the method of example 4 and/or some other example(s) herein, wherein the one or more SRS resources are configured with a periodic time domain behavior or an aperiodic time domain behavior, and wherein the MAC CE is to update beams of all SRS resources in an individual SRS resource set of the one or more SRS resource sets, and the MAC CE is to further indicate an SRS resource set ID for the individual SRS resource set and spatial relation information for each SRS resource in the individual SRS resource set.

Example 6 includes the method of example 4 and/or some other example(s) herein, wherein the MAC CE is to update a power control parameter set for an individual SRS resource set of the one or more SRS resource sets, and the MAC CE is to further indicate an SRS resource set ID for the individual SRS resource set, a P0 and alpha set ID, a pathloss reference signal ID, and a closed-loop index.

Example 7 includes the method of example 1 and/or some other example(s) herein, further comprising: generating or causing to generate a physical uplink shared channel (PUSCH) beam for transmission in the configured SRS resource indicated by the received DCI when the MAC CE indicates M number of candidate SRS resources; and transmitting or causing to transmit the PUSCH beam.

Example 8 includes the method of example 7 and/or some other example(s) herein, wherein the MAC CE is to include a CC index, a BWP ID, and an SRS resource ID for each of the M number of candidate SRS resources.

Example 9 includes the method of example 7 and/or some other example(s) herein, wherein the MAC CE is to include a CC index, a BWP ID, and spatial relation information for a corresponding SRS resource indicator (SRI) of the M number of candidate SRS resources.

Example 10 includes the method of example 7 and/or some other example(s) herein, wherein the DCI includes an SRS resource indicator field, and a value in the SRS resource indicator field is selected from the M number of candidate SRS resources.

Example 11 includes the method of example 1 and/or some other example(s) herein, wherein the configured transmission scheme is a codebook based transmission scheme or a non-codebook based transmission scheme.

Example 12 includes a method comprising: receiving a Radio Resource Control (RRC) message including a Sounding Reference Signal (SRS) resource configuration, the SRS resource configuration to indicate one or more configured SRS resource sets, and the one or more configured SRS resource sets to indicate one or more configured SRS resources; receiving a Media Access Control (MAC) Control Element (CE) message, the MAC CE message to indicate a subset of the configured SRS resources; receiving Downlink Control Information (DCI), the DCI to indicate an SRS resource in the subset of the configured SRS resources; and transmitting or causing to transmit a Physical Uplink Shared Channel (PUSCH) transmission or an SRS in the SRS resource indicated by the DCI.

Example 13 includes the method of example 12 and/or some other example(s) herein, wherein the MAC CE is to indicate a component carrier (CC) index and a bandwidth part identifier (ID).

Example 14 includes the method of example 13 and/or some other example(s) herein, wherein the one or more configured SRS resources are configured with a periodic time domain behavior or an aperiodic time domain behavior, and wherein, when the transmission is the SRS, the MAC CE is to further indicate an SRS resource ID for each SRS resource in the subset of the configured SRS resources and spatial relation information for each SRS resource of the subset of the configured SRS resources.

Example 15 includes the method of example 13 and/or some other example(s) herein, wherein the one or more configured SRS resources are configured with a periodic time domain behavior or an aperiodic time domain behavior, and wherein, when the transmission is the SRS, the MAC CE is to further indicate an SRS resource set ID of an individual SRS resource set of the one or more SRS resource sets, and spatial relation information for each SRS resource in the individual SRS resource set.

Example 16 includes the method of example 13 and/or some other example(s) herein, wherein, when the transmission is the SRS, the RRC message is to further include a power control parameter set for each SRS resource set, and the MAC CE is to further indicate an SRS resource set ID of an individual SRS resource set of the one or more SRS resource sets, a P0 and alpha set ID of a power control parameter set corresponding to the individual SRS resource set, a pathloss reference signal ID of the power control parameter set corresponding to the individual SRS resource set, and a closed-loop index of the power control parameter set corresponding to the individual SRS resource set.

Example 17 includes the method of example 13 and/or some other example(s) herein, wherein, when the transmission is the PUSCH transmission, the MAC CE is to further indicate an SRS resource ID for each SRS resource in the subset of the configured SRS resources.

Example 18 includes the method of example 13 and/or some other example(s) herein, wherein, when the transmission is the PUSCH transmission, the MAC CE is to further indicate spatial relation information for a corresponding SRS resource indicator (SRI) for each SRS resource in the subset of the configured SRS resources.

Example 19 includes the method of example 18 and/or some other example(s) herein, wherein, when the transmission is the PUSCH transmission, the spatial relation information is based on a synchronization signal block (SSB), a Chanel State Information Reference Signal (CSI-RS), or the SRS.

Example 20 includes the method of example 18 and/or some other example(s) herein, wherein, when the transmission is the PUSCH transmission, the DCI includes an SRS resource indicator field, and a value in the SRS resource indicator field is selected from the subset of the configured SRS resources.

Example 21 includes a method comprising: generating or causing to generate a Radio Resource Control (RRC) message to include a Sounding Reference Signal (SRS) resource configuration, the SRS resource configuration to indicate one or more configured SRS resource sets, and the one or more configured SRS resource sets to indicate one or more configured SRS resources; transmitting or causing to transmit the RRC message to a user equipment (UE); selecting or causing to select a subset of the one or more configured SRS resources; generating or causing to generate a Media Access Control (MAC) Control Element (CE) message to indicate the subset of the one or more configured SRS resources; transmitting or causing to transmit the MAC CE to the UE; selecting or causing to select a single SRS resource from the subset of the configured SRS resources; generating or causing to generate Downlink Control Information (DCI) to indicate the selected single SRS resource; and transmitting or causing to transmit the DCI to the UE.

Example 22 includes the method of example 21 and/or some other example(s) herein, wherein the processor circuitry is to generate the MAC CE to indicate a component carrier (CC) index, a bandwidth part identifier (ID), an SRS resource ID for each SRS resource in the subset of the configured SRS resources, and spatial relation information for each SRS resource of the subset of the configured SRS resources.

Example 23 includes the method of example 21 and/or some other example(s) herein, wherein the processor circuitry is to generate the MAC CE to indicate a CC index, a BWP ID, an SRS resource set ID of an individual SRS resource set of the one or more SRS resource sets, and spatial relation information for each SRS resource in the individual SRS resource set.

Example 24 includes the method of example 21 and/or some other example(s) herein, wherein the processor circuitry is to generate the RRC message to include a power control parameter set for each SRS resource set; and generate the MAC CE to indicate a CC index, a BWP ID, an SRS resource set ID of an individual SRS resource set of the one or more SRS resource sets, a P0 and alpha set ID of a power control parameter set corresponding to the individual SRS resource set, a pathloss reference signal ID of the power control parameter set corresponding to the individual SRS resource set, and a closed-loop index of the power control parameter set corresponding to the individual SRS resource set.

Example 25 includes the method of example 21 and/or some other example(s) herein, wherein the processor circuitry is to generate the MAC CE to indicate a CC index, a BWP ID, and spatial relation information for a corresponding SRS resource indicator (SRI) for each SRS resource in the subset of the configured SRS resources.

Example 26 includes the method of example 21 and/or some other example(s) herein, wherein the one or more configured SRS resource sets are configured with a periodic time domain behavior or an aperiodic time domain behavior.

Example 27 includes the method of examples 21-26 and/or some other example(s) herein, wherein the method is to be performed by an apparatus to be implemented in a Radio Access Network (RAN) node. Example 28 includes the method of examples 1-20 and/or some other example(s) herein, wherein the method is to be performed by a System-on-Chip (SoC) to be implemented in a user equipment (UE).

Example 29 may include an apparatus comprising means to perform one or more elements of a method described in or related to any of examples 1-28, or any other method or process described herein. Example 30 may include one or more non-transitory computer-readable media comprising instructions to cause an electronic device, upon execution of the instructions by one or more processors of the electronic device, to perform one or more elements of a method described in or related to any of examples 1-28, or any other method or process described herein. Example 31 may include an apparatus comprising logic, modules, or circuitry to perform one or more elements of a method described in or related to any of examples 1-28, or any other method or process described herein. Example 32 may include a method, technique, or process as described in or related to any of examples 1-28, or portions or parts thereof. Example 33 may include an apparatus comprising: one or more processors and one or more computer-readable media comprising instructions that, when executed by the one or more processors, cause the one or more processors to perform the method, techniques, or process as described in or related to any of examples 1-28, or portions thereof. Example 34 may include a signal as described in or related to any of examples 1-28, or portions or parts thereof. Example 35 includes a packet, frame, segment, protocol data unit (PDU), or message as described in or related to any of examples 1-28, or portions or parts thereof, or otherwise described in the present disclosure. Example 36 may include a signal in a wireless network as shown and described herein. Example 37 may include a method of communicating in a wireless network as shown and described herein. Example 38 may include a system for providing wireless communication as shown and described herein. Example 39 may include a device for providing wireless communication as shown and described herein.

Any of the above-described examples may be combined with any other example (or combination of examples), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

The present disclosure has been described with reference to flowchart illustrations and/or block diagrams of methods, apparatus (systems), and/or computer program products according to embodiments of the present disclosure. In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a," "an" and "the" are intended to include plural forms as well, unless the context clearly indicates otherwise. It will be further understood that the terms "comprises" and/or "comprising," when used in this specification, specific the presence of stated features, integers, steps, operations, elements, and/or components, but do not preclude the presence or addition of one or more other features, integers, steps, operation, elements, components, and/or groups thereof.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C). The description may use the phrases "in an embodiment," or "In some embodiments," which may each refer to one or more of the same or different embodiments. Furthermore, the terms "comprising," "including," "having," and the like, as used with respect to embodiments of the present disclosure, are synonymous.

The terms "coupled," "communicatively coupled," along with derivatives thereof are used herein. The term "coupled" may mean two or more elements are in direct physical or electrical contact with one another, may mean that two or more elements indirectly contact each other but still cooperate or interact with each other, and/or may mean that one or more other elements are coupled or connected between the elements that are said to be coupled with each other. The term "directly coupled" may mean that two or more elements are in direct contact with one another. The term "communicatively coupled" may mean that two or more elements may be in contact with one another by a means of communication including through a wire or other interconnect connection, through a wireless communication channel or ink, and/or the like.

As used herein, the term "circuitry" refers to a circuit or system of multiple circuits configured to perform a particular function in an electronic device. The circuit or system of circuits may be part of, or include one or more hardware components, such as a logic circuit, a processor (shared, dedicated, or group) and/or memory (shared, dedicated, or group), ASICs, FPDs (e.g., FPGAs, PLDs, CPLDs, HCPLDs, a structured ASICs, or a programmable SoCs, DSPs, etc., that are configured to provide the described functionality. In addition, the term "circuitry" may also refer to a combination of one or more hardware elements with the program code used to carry out the functionality of that program code. Some types of circuitry may execute one or more software or firmware programs to provide at least some of the described functionality. Such a combination of hardware elements and program code may be referred to as a particular type of circuitry.

As used herein, the term "processor circuitry" refers to, is part of, or includes circuitry capable of sequentially and automatically carrying out a sequence of arithmetic or logical operations, or recording, storing, and/or transferring digital data. and/or any other device capable of executing or otherwise operating computer-executable instructions, such as program code, software modules, and/or functional processes.

As used herein, the term "module" refers to one or more independent electronic circuits packaged onto a circuit board, SoC, SiP, etc., configured to provide a basic function within a computer system.

As used herein, the term "module" refers to, be part of, or include an FPD, ASIC, a processor (shared, dedicated, or group) and/or memory (shared, dedicated, or group), etc., that execute one or more software or firmware programs, a combinational logic circuit, and/or other suitable components that provide the described functionality.

As used herein, the term "interface circuitry" refers to, is part of, or includes circuitry providing for the exchange of information between two or more components or devices. The term "interface circuitry" refers to one or more hardware interfaces, for example, buses, input/output (I/O) interfaces, peripheral component interfaces, network interface cards, and/or the like.

As used herein, the term "device" refers to a physical entity embedded inside, or attached to, another physical entity in its vicinity, with capabilities to convey digital information from or to that physical entity. As used herein, the term "element" refers to a unit that is indivisible at a given level of abstraction and has a clearly defined boundary, wherein an element may be any type of entity. As used herein, the term "controller" refers to an element or entity that has the capability to affect a physical entity, such as by changing its state or causing the physical entity to move. As used herein, the term "entity" refers to (1) a distinct component of an architecture or device, or (2) information transferred as a payload. The term "network element" as used herein refers to physical or virtualized equipment and/or infrastructure used to provide wired or wireless communication network services. The term "network element" may be considered synonymous to and/or referred to as a networked computer, networking hardware, network equipment, network node, router, switch, hub, bridge, radio network controller, RAN device, RAN node, gateway, server, virtualized VNF, NFVI, and/or the like.

As used herein, the term "computer system" refers to any type interconnected electronic devices, computer devices, or components thereof. Additionally, the term "computer system" and/or "system" refers to various components of a computer that are communicatively coupled with one another, or otherwise organized to accomplish one or more functions. Furthermore, the term "computer system" and/or "system" refers to multiple computer devices and/or multiple computing systems that are communicatively coupled with one another and configured to share computing and/or networking resources.

As used herein, the term "architecture" refers to a fundamental organization of a system embodied in its components, their relationships to one another, and to an environment, as well as to the principles guiding its design and evolution.

As used herein, the term "appliance," "computer appliance," or the like, refers to a discrete hardware device with integrated program code (e.g., software or firmware) that is specifically or specially designed to provide a specific computing resource. A "virtual appliance" is a virtual machine image to be implemented by a hypervisor-equipped device that virtualizes or emulates a computer appliance or otherwise is dedicated to provide a specific computing resource.

As used herein, the term "user equipment" or "UE" as used herein refers to a device with radio communication capabilities and may describe a remote user of network resources in a communications network. The term "user equipment" or "UE" may be considered synonymous to, and may be referred to as, client, mobile, mobile device, mobile terminal, user terminal, mobile unit, mobile station, mobile user, subscriber, user, remote station, access agent, user agent, receiver, radio equipment, reconfigurable radio equipment, reconfigurable mobile device, etc. Furthermore, the term "user equipment" or "UE" may include any type of wireless/wired device or any computing device including a wireless communications interface.

As used herein, the term "channel" as used herein refers to any transmission medium, either tangible or intangible, which is used to communicate data or a data stream. The term "channel" may be synonymous with and/or equivalent to "communications channel," "data communications channel," "transmission channel," "data transmission channel," "access channel," "data access channel," "link," "data link," "carrier," "radiofrequency carrier," and/or any other like term denoting a pathway or medium through which data is communicated. Additionally, the term "link" as used herein refers to a connection between two devices through a RAT for the purpose of transmitting and receiving information.

As used herein, the terms "instantiate," "instantiation," and the like refers to the creation of an instance, and an "instance" refers to a concrete occurrence of an object, which may occur, for example, during execution of program code.

As used herein, a "database object", "data object", or the like refers to any representation of information in a database that is in the form of an object, attribute-value pair (AVP), key-value pair (KVP), tuple, etc., and may include variables, data structures, functions, methods, classes, database records, database fields, database entities, associations between data and database entities (also referred to as a "relation"), and the like.

As used herein, the term "resource" refers to a physical or virtual device, a physical or virtual component within a computing environment, and/or a physical or virtual component within a particular device, such as computer devices, mechanical devices, memory space, processor/CPU time, processor/CPU usage, processor and accelerator loads, hardware time or usage, electrical power, input/output operations, ports or network sockets, channel/link allocation, throughput, memory usage, storage, network, database and applications, workload units, and/or the like. The term "network resource" refers to a resource hosted by a remote entity (e.g., a cloud computing service) and accessible over a network. The term "on-device resource" refers to a resource hosted inside a device and enabling access to the device, and thus, to the related physical entity. System resources may be considered as a set of coherent functions, network data objects or services, accessible through a server where such system resources reside on a single host or multiple hosts and are clearly identifiable. Additionally, a "virtualized resource" refers to compute, storage, and/or network resources provided by virtualization infrastructure to an application, such as a multi-access edge applications. The term "information element" refers to a structural element containing one or more fields. The term "field" refers to individual contents of an information element, or a data element that contains content.

For the purposes of the present document, the abbreviations listed in table 8 may apply to the examples and embodiments discussed herein.

TABLE 8

| | |
|---|---|
| 3GPP | Third Generation Partnership Project |
| 4G | Fourth Generation |
| 5G | Fifth Generation |
| 5GC | 5G Core network |
| ACK | Acknowledgement |
| AF | Application Function |
| AM | Acknowledged Mode |
| AMF | Access and Mobility Management Function |
| AN | Access Network |
| ANR | Automatic Neighbor Relation |
| AP | Application Protocol, Antenna Port, Access Point |
| API | Application Programming Interface |
| APN | Access Point Name |
| ARP | Allocation and Retention Priority |
| ARQ | Automatic Repeat Request |
| AS | Access Stratum |
| ASN.1 | Abstract Syntax Notation One |
| AUSF | Authentication Server Function |
| AWGN | Additive White Gaussian Noise |
| BCH | Broadcast Channel |
| BER | Bit Error Ratio |
| BLER | Block Error Rate |
| BPSK | Binary Phase Shift Keying |
| BRAS | Broadband Remote Access Server |
| BSS | Business Support System |
| BS | Base Station |
| BSR | Buffer Status Report |
| BW | Bandwidth |
| BWP | Bandwidth Part |
| C-RNTI | Cell Radio Network Temporary Identity |
| CA | Carrier Aggregation, Certification Authority |
| CAPEX | CAPital EXpenditure |
| CBRA | Contention Based Random Access |
| CC | Component Carrier, Country Code, Cryptographic Checksum |
| CCA | Clear Channel Assessment |
| CCE | Control Channel Element |
| CCCH | Common Control Channel |
| CE | Coverage Enhancement |
| CDM | Content Delivery Network |
| CDMA | Code-Division Multiple Access |
| CFRA | Contention Free Random Access |
| CG | Cell Group |
| CI | Cell Identity |
| CID | Cell-ID (e.g., positioning method) |
| CIM | Common Information Model |
| CIR | Carrier to Interference Ratio |
| CK | Cipher Key |
| CM | Connection Management, Conditional Mandatory |
| CMAS | Commercial Mobile Alert Service |
| CMD | Command |
| CMS | Cloud Management System |
| CO | Conditional Optional |
| CoMP | Coordinated Multi-Point |
| CORESET | Control Resource Set |
| COTS | Commercial Off-The-Shelf |
| CP | Control Plane, Cyclic Prefix, Connection Point |
| CPD | Connection Point Descriptor |
| CPE | Customer Premise Equipment |
| CPICH | Common Pilot Channel |
| CQI | Channel Quality Indicator |
| CPU | CSI processing unit, Central Processing Unit |
| C/R | Command/Response field bit |

TABLE 8-continued

| | |
|---|---|
| CRAN | Cloud Radio Access Network, Cloud RAN |
| CRB | Common Resource Block |
| CRC | Cyclic Redundancy Check |
| CRI | Channel-State Information Resource Indicator, CSI-RS Resource Indicator |
| C-RNTI | Cell RNTI |
| CS | Circuit Switched |
| CSAR | Cloud Service Archive |
| CSI | Channel-State Information |
| CSI-IM | CSI Interference Measurement |
| CSI-RS | CSI Reference Signal |
| CSI-RSRP | CSI reference signal received power |
| CSI-RSRQ | CSI reference signal received quality |
| CSI-SINR | CSI signal-to-noise and interference ratio |
| CSMA | Carrier Sense Multiple Access |
| CSMA/CA | CSMA with collision avoidance |
| CSS | Common Search Space, Cell-specific Search Space |
| CTS | Clear-to-Send |
| CW | Codeword |
| CWS | Contention Window Size |
| D2D | Device-to-Device |
| DC | Dual Connectivity, Direct Current |
| DCI | Downlink Control Information |
| DF | Deployment Flavour |
| DL | Downlink |
| DMTF | Distributed Management Task Force |
| DPDK | Data Plane Development Kit |
| DM-RS, DMRS | Demodulation Reference Signal |
| DN | Data network |
| DRB | Data Radio Bearer |
| DRS | Discovery Reference Signal |
| DRX | Discontinuous Reception |
| DSL | Domain Specific Language. Digital Subscriber Line |
| DSLAM | DSL Access Multiplexer |
| DwPTS | Downlink Pilot Time Slot |
| E-LAN | Ethernet Local Area Network |
| E2E | End-to-End |
| ECCA | extended clear channel assessment, extended CCA |
| ECCE | Enhanced Control Channel Element, Enhanced CCE |
| ED | Energy Detection |
| EDGE | Enhanced Datarates for GSM Evolution (GSM Evolution) |
| EGMF | Exposure Governance Management Function |
| EGPRS | Enhanced GPRS |
| EIR | Equipment Identity Register |
| eLAA | enhanced Licensed Assisted Access, enhanced LAA |
| EM | Element Manager |
| eMBB | enhanced Mobile Broadband |
| eMBMS | Evolved MBMS |
| EMS | Element Management System |
| eNB | evolved NodeB, E-UTRAN Node B |
| EN-DC | E-UTRA-NR Dual Connectivity |
| EPC | Evolved Packet Core |
| EPDCCH | enhanced PDCCH, enhanced Physical Downlink Control Cannel |
| EPRE | Energy per resource element |
| EPS | Evolved Packet System |
| EREG | enhanced REG, enhanced resource element groups |
| ETSI | European Telecommunications Standards Institute |
| ETWS | Earthquake and Tsunami Warning System |
| eUICC | embedded UICC, embedded Universal Integrated Circuit Card |
| E-UTRA | Evolved UTRA |
| E-UTRAN | Evolved UTRAN |
| FCC | Federal Communications Commission |
| FDD | Frequency Division Duplex |
| FDM | Frequency Division Multiplex |
| FDMA | Frequency Division Multiple Access |
| FEC | Forward Error Correction |
| FFS | For Further Study |
| FFT | Fast Fourier Transformation |
| feLAA | further enhanced LAA |
| FN | Frame Number |
| FPGA | Field-Programmable Gate Array |
| FR | Frequency Range |
| G-RNTI | GERAN Radio Network Temporary Identity |
| GERAN | GSM EDGE RAN, GSM EDGE Radio Access Network |
| GGSN | Gateway GPRS Support Node |
| GLONASS | GLObal'naya NAvigatsionnaya Sputnikovaya Sistema (Engl.: Global Navigation Satellite System) |
| gNB | Next Generation NodeB |
| gNB-CU | gNB-centralized unit |
| gNB-DU | gNB-distributed unit |
| GNSS | Global Navigation Satellite System |

TABLE 8-continued

| | |
|---|---|
| GPRS | General Packet Radio Service |
| GSM | Global System for Mobile Communications, Groupe Spécial Mobile |
| GTP | GPRS Tunneling Protocol |
| GTP-U | GPRS Tunnelling Protocol for User Plane |
| GUMMEI | Globally Unique MME Identifier |
| GUTI | Globally Unique Temporary UE Identity |
| HARQ | Hybrid ARQ, Hybrid Automatic Repeat Request |
| HANDO, HO | Handover |
| HFN | HyperFrame Number |
| HHO | Hard Handover |
| HLR | Home Location Register |
| HN | Home Network |
| HPLMN | Home Public Land Mobile Network |
| HSDPA | High Speed Downlink Packet Access |
| HSN | Hopping Sequence Number |
| HSPA | High Speed Packet Access |
| HSS | Home Subscriber Server |
| HSUPA | High Speed Uplink Packet Access |
| HTTP | Hyper Text Transfer Protocol |
| HTTPS | Hyper Text Transfer Protocol Secure (https is http/1.1 over SSL, i.e. port 443) |
| I-Block | Information Block |
| ICCID | Integrated Circuit Card Identification |
| ICIC | Inter-Cell Interference Coordination |
| ID | Identity, identifier |
| IDFT | Inverse Discrete Fourier Transform |
| IE | Information element |
| IEEE | Institute of Electrical and Electronics Engineers |
| IEI | Information Element Identifier |
| IEIDL | Information Element Identifier Data Length |
| IETF | Internet Engineering Task Force |
| IM | Interference Measurement, Intermodulation, IP Multimedia |
| IOT | Internet of Things |
| IP | Internet Protocol |
| IR | Infrared |
| ISO | International Organisation for Standardisation |
| ISP | Internet Service Provider |
| IWF | Interworking-Function |
| K | Constraint length of the convolutional code, USIM Individual key |
| KB | Kilobyte (1000 bytes) |
| kbps | kilo-bits per second |
| Kc | Ciphering key |
| Ki | Individual subscriber authentication key |
| KPI | Key Performance Indicator |
| KQI | Key Quality Indicator |
| KSI | Key Set Identifier |
| ksps | kilo-symbols per second |
| KVM | Kernel Virtual Machine |
| L1 | Layer 1 (physical layer) |
| L1-RSRP | Layer 1 reference signal received power |
| L2 | Layer 2 (data link layer) |
| L3 | Layer 3 (network layer) |
| LAA | Licensed Assisted Access |
| LAN | Local Area Network |
| LBT | Listen Before Talk |
| LCM | LifeCycle Management |
| LCR | Low Chip Rate |
| LCS | Location Services |
| LI | Layer Indicator |
| LLC | Logical Link Control, Low Layer Compatibility |
| LPLMN | Local PLMN |
| LPP | LTE Positioning Protocol |
| LSB | Least Significant Bit |
| LTE | Long Term Evolution |
| LWA | LTE-WLAN aggregation |
| LWIP | LTE/WLAN Radio Level Integration with IPsec Tunnel |
| M2M | Machine-to-Machine |
| MAC | Medium Access Control (protocol layering context) |
| MAC | Message authentication code (security/encryption context) |
| MBMS | Multimedia Broadcast and Multicast Service |
| MBSFN | Multimedia Broadcast multicast service Single Frequency Network |
| MCG | Master Cell Group |
| MCOT | Maximum Channel Occupancy Time |
| MCS | Modulation and coding scheme |
| ME | Mobile Equipment |
| MeNB | master eNB |
| MER | Message Error Ratio |
| MGL | Measurement Gap Length |
| MGRP | Measurement Gap Repetition Period |
| MIB | Master Information Block, Management Information Base |

TABLE 8-continued

| | |
|---|---|
| MIMO | Multiple Input Multiple Output |
| MM | Mobility Management |
| MME | Mobility Management Entity |
| MN | Master Node |
| MO | Measurement Object, Mobile Originated |
| MPLS | MultiProtocol Label Switching |
| MS | Mobile Station |
| MSB | Most Significant Bit |
| MT | Mobile Terminated, Mobile Termination |
| MTC | Machine-Type Communications |
| mMTC | massive MTC, massive Machine-Type Communications |
| MU-MIMO | Multi User MIMO |
| NACK | Negative Acknowledgement |
| NAS | Non-Access Stratum, Non-Access Stratum layer |
| NEC | Network Capability Exposure |
| NE-DC | NR-E-UTRA Dual Connectivity |
| NEF | Network Exposure Function |
| NF | Network Function |
| NFP | Network Forwarding Path |
| NFPD | Network Forwarding Path Descriptor |
| NFV | Network Functions Virtualization |
| NFVI | NFV Infrastructure |
| NFVO | NFV Orchestrator |
| NG | Next Generation, Next Gen |
| NGEN-DC | NG-RAN E-UTRA-NR Dual Connectivity |
| NM | Network Manager |
| NMS | Network Management System |
| N-POP | Network Point of Presence |
| NMIB, N-MIB | Narrowband MIB |
| NPBCH | Narrowband Physical Broadcast CHannel |
| NPDCCH | Narrowband Physical Downlink Control CHannel |
| NPDSCH | Narrowband Physical Downlink Shared CHannel |
| NPRACH | Narrowband Physical Random Access CHannel |
| NPUSCH | Narrowband Physical Uplink Shared CHannel |
| NPSS | Narrowband Primary Synchronization Signal |
| NSSS | Narrowband Secondary Synchronization Signal |
| NR | New Radio, Neighbour Relation |
| NRF | NF Repository Function |
| NRS | Narrowband Reference Signal |
| NS | Network Service |
| NSA | Non-Standalone operation mode |
| NSD | Network Service Descriptor |
| NSR | Network Service Record |
| NSSAI | Network Slice Selection Assistance Information |
| S-NNSAI | Single-NSSAI |
| NSSF | Network Slice Selection Function |
| NW | Network |
| NZP | Non-Zero Power |
| O&M | Operation and Maintenance |
| OFDM | Orthogonal Frequency Division Multiplexing |
| OFDMA | Orthogonal Frequency Division Multiple Access |
| OOB | Out-of-band |
| OPEX | OPerating EXpense |
| OTA | over-the-air |
| PAPR | Peak-to-Average Power Ratio |
| PAR | Peak to Average Ratio |
| PBCH | Physical Broadcast Channel |
| PC | Power Control, Personal Computer |
| PCC | Primary Component Carrier, Primary CC |
| PCell | Primary Cell |
| PCI | Physical Cell ID, Physical Cell Identity |
| PCEF | Policy and Charging Enforcement Function |
| PCF | Policy Control Function |
| PCRF | Policy Control and Charging Rules Function |
| PDCP | Packet Data Convergence Protocol, Packet Data Convergence Protocol layer |
| PDCCH | Physical Downlink Control Channel |
| PDCP | Packet Data Convergence Protocol |
| PDN | Packet Data Network, Public Data Network |
| PDSCH | Physical Downlink Shared Channel |
| PDU | Protocol Data Unit |
| P-GW | PDN Gateway |
| PHY | Physical layer |
| PLMN | Public Land Mobile Network |
| PMI | Precoding Matrix Indicator |
| POC | PTT over Cellular |
| PP, PTP | Point-to-Point |
| PPP | Point-to-Point Protocol |
| PRACH | Physical RACH |
| PRB | Physical resource block |
| PRG | Physical resource block group |

TABLE 8-continued

| | |
|---|---|
| ProSe | Proximity Services, Proximity-Based Service |
| PSBCH | Physical Sidelink Broadcast Channel |
| PSDCH | Physical Sidelink Downlink Channel |
| PSCCH | Physical Sidelink Control Channel |
| PSSCH | Physical Sidelink Shared Channel |
| PSCell | Primary SCell |
| PSS | Primary Synchronization Signal |
| PSTN | Public Switched Telephone Network |
| PT-RS | Phase-tracking reference signal |
| PTT | Push-to-Talk |
| PUCCH | Physical Uplink Control Channel |
| PUSCH | Physical Uplink Shared Channel |
| QAM | Quadrature Amplitude Modulation |
| QCI | QOS class of identifier |
| QCL | Quasi co-location |
| QFI | QOS Flow ID, QoS Flow Identifier |
| QoS | Quality of Service |
| QPSK | Quadrature (Quaternary) Phase Shift Keying |
| QZSS | Quasi-Zenith Satellite System |
| RA-RNTI | Random Access RNTI |
| RAB | Radio Access Bearer, Random Access Burst |
| RACH | Random Access Channel |
| RADIUS | Remote Authentication Dial In User Service |
| RAN | Radio Access Network |
| RAT | Radio Access Technology |
| RB | Resource block, Radio Bearer |
| RBG | Resource block group |
| REG | Resource Element Group |
| Rel | Release |
| RF | Radio Frequency |
| RI | Rank Indicator |
| RL | Radio Link |
| RLC | Radio Link Control, Radio Link Control layer |
| RLF | Radio Link Failure |
| RLM | Radio Link Monitoring |
| RM | Registration Management |
| RN | Relay Node |
| RNC | Radio Network Controller |
| RNL | Radio Network Layer |
| RNTI | Radio Network Temporary Identifier |
| RRC | Radio Resource Control, Radio Resource Control layer |
| RRM | Radio Resource Management |
| RS | Reference Signal |
| RSRP | Reference Signal Received Power |
| RSRQ | Reference Signal Received Quality |
| RSSI | Received Signal Strength Indicator |
| RSU | Road Side Unit |
| RTP | Real Time Protocol |
| RTS | Ready-To-Send |
| RTT | Round Trip Time |
| Rx | Reception, Receiving, Receiver |
| S1AP | S1 Application Protocol |
| S1-MME | S1 for the control plane |
| S1-U | S1 for the user plane |
| S-GW | Serving Gateway |
| S-RNTI | SRNC Radio Network Temporary Identity |
| S-TMSI | SAE Temporary Mobile Station Identifier |
| SA | Standalone operation mode |
| SAE | System Architecture Evolution |
| SAP | Service Access Point |
| SCC | Secondary Component Carrier, Secondary CC |
| SCell | Secondary Cell |
| SC-FDMA | Single Carrier Frequency Division Multiple Access |
| SCG | Secondary Cell Group |
| SCM | Security Context Management |
| SCS | Subcarrier Spacing |
| SCTP | Stream Control Transmission Protocol |
| SDAP | Service Data Adaptation Protocol, Service Data Adaptation Protocol layer |
| SDNF | Structured Data Storage Network Function |
| SDSF | Structured Data Storage Function |
| SDU | Service Data Unit |
| SEAF | Security Anchor Function |
| SeNB | secondary eNB |
| SEPP | Security Edge Protection Proxy |
| SFTD | Space-Frequency Time Diversity, SFN and frame timing difference |
| SFN | System Frame Number |
| SgNB | Secondary gNB |
| SGSN | Serving GPRS Support Node |
| S-GW | Serving Gateway |
| SI | System Information |

TABLE 8-continued

| | |
|---|---|
| SIB | System Information Block |
| SIM | Subscriber Identity Module |
| SIP | Session Initiated Protocol |
| SiP | System in Package |
| SL | Sidelink |
| SLA | Service Level Agreement |
| SM | Session Management |
| SMF | Session Management Function |
| SMS | Short Message Service |
| SMTC | SSB-based Measurement Timing Configuration |
| SN | Secondary Node, Sequence Number |
| SoC | System on Chip |
| SON | Self-Organizing Network |
| SP | Semi-Persistent |
| SpCell | Special Cell |
| SPS | Semi-Persistent Scheduling |
| SR | Scheduling Request |
| SRI | SRS Resource Indicator |
| SRB | Signaling Radio Bearer |
| SRS | Sounding Reference Signal |
| SS | Synchronization Signal |
| SSB | Synchronization Signal Block, SS/PBCH Block |
| SSBRI | SS/PBCH Block Resource Indicator, Synchronization Signal Block Resource Indicator |
| SS-RSRP | Synchronization Signal based Reference Signal Received Power |
| SS-RSRQ | Synchronization Signal based Reference Signal Received Quality |
| SS-SINR | Synchronization Signal based Signal to Noise and Interference Ratio |
| SSS | Secondary Synchronization Signal |
| SU-MIMO | Single User MIMO |
| TA | Timing Advance, Tracking Area |
| TB | Transport Block |
| TBS | Transport Block Size |
| TBD | To Be Defined |
| TCP | Transmission Communication Protocol |
| TDD | Time Division Duplex |
| TDM | Time Division Multiplexing |
| TDMA | Time Division Multiple Access |
| TE | Terminal Equipment |
| TEID | Tunnel End Point Identifier |
| TMSI | Temporary Mobile Subscriber Identity |
| TNL | Transport Network Layer |
| TPC | Transmit Power Control |
| TR | Technical Report |
| TRP, TRxP | Transmission Reception Point |
| TRS | Tracking Reference Signal |
| TRx | Transceiver |
| TS | Technical Specifications, Technical Standard |
| TTI | Transmission Time Interval |
| Tx | Transmission, Transmitting, Transmitter |
| UART | Universal Asynchronous Receiver and Transmitter |
| UCI | Uplink Control Information |
| UE | User Equipment |
| UDM | Unified Data Management |
| UDP | User Datagram Protocol |
| UDSF | Unstructured Data Storage Network Function |
| UICC | Universal Integrated Circuit Card |
| UL | Uplink |
| UL-SCH | Uplink Shared Channel |
| UM | Unacknowledged Mode |
| UML | Unified Modelling Language |
| UMTS | Universal Mobile Telecommunications System |
| UP | User Plane |
| UPF | User Plane Function |
| URI | Uniform Resource Identifier |
| URL | Uniform Resource Locator |
| URLLC | Ultra-Reliable and Low Latency |
| USB | Universal Serial Bus |
| USIM | Universal Subscriber Identity Module |
| USS | UE-specific search space |
| UTRA | UMTS Terrestrial Radio Access |
| UTRAN | Universal Terrestrial Radio Access Network |
| UwPTS | Uplink Pilot Time Slot |
| V2X | Vehicle-to-everything |
| VIM | Virtualized Infrastructure Manager |
| VL | Virtual Link, |
| VLAN | Virtual LAN, Virtual Local Area Network |
| VM | Virtual Machine |
| VNF | Virtualized Network Function |
| VNFFG | VNF Forwarding Graph |
| VNFFGD | VNF Forwarding Graph Descriptor |

TABLE 8-continued

| | |
|---|---|
| VNFM | VNF Manager |
| VoIP | Voice-over-IP, Voice-over-Internet Protocol |
| VPLMN | Visited Public Land Mobile Network |
| VPN | Virtual Private Network |
| VRB | Virtual Resource Block |
| WiMAX | Worldwide Interoperability for Microwave Access |
| WLAN | Wireless Local Area Network |
| WMAN | Wireless Metropolitan Area Network |
| WPAN | Wireless Personal Area Network |
| X2-C | X2-Control plane |
| X2-U | X2-User plane |
| XML | extensible Markup Language |
| ZC | Zadoff-Chu |
| ZP | Zero Power |

The foregoing description provides illustration and description of various example embodiments, but is not intended to be exhaustive or to limit the scope of embodiments to the precise forms disclosed. Modifications and variations are possible in light of the above teachings or may be acquired from practice of various embodiments. Where specific details are set forth in order to describe example embodiments of the disclosure, it should be apparent to one skilled in the art that the disclosure can be practiced without, or with variation of, these specific details. It should be understood, however, that there is no intent to limit the concepts of the present disclosure to the particular forms disclosed, but on the contrary, the intention is to cover all modifications, equivalents, and alternatives consistent with the present disclosure and the appended claims.

The invention claimed is:

1. A base station comprising:
radio frequency (RF) circuitry; and
baseband circuitry coupled with the RF circuitry, the baseband circuitry to:
generate a higher layer signaling that configures a user equipment (UE) with sounding reference signal (SRS) resources for a configured transmission scheme;
generate a Media Access Control (MAC) Control Element (CE) that configures the UE with a subset of the SRS resources;
generate a Downlink Control Information (DCI) that configures the UE with an SRS resource of the subset of the SRS resources for a SRS beam transmission; and
transmit, via the RF circuitry, the higher layer signaling, the MAC CE, and the DCI to the UE.

2. The base station of claim 1, wherein the MAC CE is to indicate a component carrier (CC) index and a bandwidth part identifier (ID).

3. The base station of claim 1, wherein the SRS resources are configured with a periodic time domain behavior or an aperiodic time domain behavior, and wherein the MAC CE is to update a beam of each SRS resource of the subset of the SRS resources, and the MAC CE is to further indicate an SRS resource ID for each SRS resource and spatial relation information for each SRS resource.

4. The base station of claim 1, wherein the higher layer signaling further configures the UE with one or more SRS resource sets that comprise the SRS resources.

5. The base station of claim 1, wherein the SRS resources are configured with a periodic time domain behavior or an aperiodic time domain behavior, and wherein the MAC CE is to update beams of all SRS resources in an individual SRS resource set of one or more SRS resource sets, and the MAC CE is to further indicate an SRS resource set ID for the individual SRS resource set and spatial relation information for each SRS resource in the individual SRS resource set.

6. The base station of claim 1, wherein the MAC CE is to update a power control parameter set for an individual SRS resource set of one or more SRS resource sets, and the MAC CE is to further indicate an SRS resource set ID for the individual SRS resource set, a P0 and alpha set ID, a pathloss reference signal ID, and a closed-loop index.

7. The base station of claim 1, wherein the baseband circuitry is configured further to:
receive a physical uplink shared channel (PUSCH) beam transmission in the SRS resource from the UE when the MAC CE indicates M number of candidate SRS resources.

8. The base station of claim 7, wherein the MAC CE is to include a CC index, a BWP ID, and an SRS resource ID for each of the M number of candidate SRS resources.

9. The base station of claim 7, wherein the MAC CE is to include a CC index, a BWP ID, and spatial relation information for a corresponding SRS resource indicator (SRI) of the M number of candidate SRS resources.

10. The base station of claim 7, wherein the DCI includes an SRS resource indicator field, and a value in the SRS resource indicator field is selected from the M number of candidate SRS resources.

11. The base station of claim 1, wherein the configured transmission scheme is a codebook based transmission scheme or a non-codebook based transmission scheme.

12. A method of operating a base station, comprising:
generating a higher layer signaling that configures a user equipment (UE) with sounding reference signal (SRS) resources for a configured transmission scheme;
generating a Media Access Control (MAC) Control Element (CE) that configures the UE with a subset of the SRS resources;
generating a Downlink Control Information (DCI) that configures the UE with an SRS resource of the subset of the SRS resources for a SRS beam transmission; and
transmitting the higher layer signaling, the MAC CE, and the DCI to the UE.

13. The method of claim 12, wherein the MAC CE is to indicate a component carrier (CC) index and a bandwidth part identifier (ID).

14. The method of claim 12, wherein the SRS resources are configured with a periodic time domain behavior or an aperiodic time domain behavior, and wherein the MAC CE is to update a beam of each SRS resource of the subset of the SRS resources, and the MAC CE is to further indicate an SRS resource ID for each SRS resource and spatial relation information for each SRS resource.

15. The method of claim 12, wherein the higher layer signaling further configures the UE with one or more SRS resource sets that comprise the SRS resources.

16. The method of claim 12, wherein the SRS resources are configured with a periodic time domain behavior or an aperiodic time domain behavior, and wherein the MAC CE is to update beams of all SRS resources in an individual SRS resource set of one or more SRS resource sets, and the MAC CE is to further indicate an SRS resource set ID for the individual SRS resource set and spatial relation information for each SRS resource in the individual SRS resource set.

17. The method of claim 12, wherein the MAC CE is to update a power control parameter set for an individual SRS resource set of one or more SRS resource sets, and the MAC CE is to further indicate an SRS resource set ID for the individual SRS resource set, a P0 and alpha set ID, a pathloss reference signal ID, and a closed-loop index.

18. The method of claim 12, further comprising:
receiving a physical uplink shared channel (PUSCH) beam transmission in the SRS resource from the UE when the MAC CE indicates M number of candidate SRS resources.

19. A non-transitory computer-readable medium (CRM) comprising instructions to, upon execution of the instructions by one or more processors of a base station, cause the base station to perform operations, the operations comprising:
generating a higher layer signaling that configures a user equipment (UE) with sounding reference signal (SRS) resources for a configured transmission scheme;
generating a Media Access Control (MAC) Control Element (CE) that configures the UE with a subset of the SRS resources;
generating a Downlink Control Information (DCI) that configures the UE with an SRS resource of the subset of the SRS resources for a SRS beam transmission; and
transmitting the higher layer signaling, the MAC CE, and the DCI to the UE.

20. The non-transitory CRM of claim 19, wherein the operations further comprise:
receiving a physical uplink shared channel (PUSCH) beam transmission in the SRS resource from the UE when the MAC CE indicates M number of candidate SRS resources.

* * * * *